United States Patent
Modzelesky et al.

(10) Patent No.: US 6,529,731 B2
(45) Date of Patent: *Mar. 4, 2003

(54) NETWORK CONTROL CENTER FOR SATELLITE COMMUNICATION SYSTEM

(75) Inventors: Edward J. Modzelesky, Leesburg, VA (US); William R. Tisdale, Purcellville, VA (US)

(73) Assignee: Mobile Satellite Ventures LP, Reston, VA (US)

( * ) Notice: Subject to any disclaimer, the term of this patent is extended or adjusted under 35 U.S.C. 154(b) by 17 days.

This patent is subject to a terminal disclaimer.

(21) Appl. No.: 09/796,647

(22) Filed: Mar. 2, 2001

(65) Prior Publication Data

US 2001/0012775 A1 Aug. 9, 2001

Related U.S. Application Data

(63) Continuation of application No. 09/133,687, filed on Aug. 13, 1998, which is a continuation of application No. 08/728,227, filed on Oct. 10, 1996, now Pat. No. 5,842,125.
(60) Provisional application No. 60/007,749, filed on Nov. 30, 1995.

(51) Int. Cl.$^7$ .............................................. H04B 7/185
(52) U.S. Cl. ..................................................... 455/427
(58) Field of Search ............................... 455/12.1, 13.1, 455/427, 428, 429, 430, 426, 450, 452, 62, 67.1

(56) References Cited

U.S. PATENT DOCUMENTS

| | | | |
|---|---|---|---|
| 5,392,355 A | 2/1995 | Khurana et al. | |
| 5,526,404 A | 6/1996 | Wideman et al. | |
| 5,586,165 A | 12/1996 | Wideman | |
| 5,590,395 A | 12/1996 | Diekelman | |
| 5,594,740 A | 1/1997 | Ladue | |
| 5,594,780 A | 1/1997 | Wideman et al. | |
| 5,659,878 A | 8/1997 | Uchida et al. | |
| 5,842,125 A | * 11/1998 | Modzelesky et al. | ....... 455/426 |

OTHER PUBLICATIONS

"Feederlink Earth Station to Provide Mobile Satellite Services in North America." Robert H. McCauley, et al., American Institute of Aeronautics and Astronautics, Jan./Feb. 1994, pp. 1–9.

"Radio Transmission in the American Mobile Satellite System." Charles Kittiver, American Institute of Aeronautics and Astronautics, Inc., pp. 280–294/.

"Summary of the AMSC Mobile Telephone System." Gary A. Johnason, et al. American Institute of Aeronautics and Astronautics, Inc. pp. 1–11.

"Implementation of a System to Provide Mobile Satellite Services in North American." Gary A. Johnanson, et al, presented at International Mobile Satellite Conference '93. Jun. 16–18, 1993.

"The American Mobile Satellite Corporation Space Segment." David J. Whalen, et al. pp. 294–404.

(List continued on next page.)

Primary Examiner—Thanh Cong Le
(74) Attorney, Agent, or Firm—Irah H. Donner; Hale and Dorr LLP

(57) ABSTRACT

A mobile satellite system including a satellite communication switching office and network system having a satellite antenna for receiving and transmitting a satellite message via a satellite to and from a mobile earth station including a mobile communication system, a satellite interface system, a central controller receiving and transmitting the satellite message from the mobile earth station to and from the satellite communication switching office via the satellite and the satellite interface system. The mobile communication system includes a user interface system providing a user interface through which a user has access to services supported by the mobile satellite system and an antenna system which provides an interface between the mobile communication system and the mobile satellite system via the satellite interface system.

38 Claims, 44 Drawing Sheets

OTHER PUBLICATIONS

"North American Mobile Satellite System Signaling Architecture." Lawrence White, et al. American Institute of Aeronautics and Astronautics, Inc. pp. 427–439.

The AMSC/TMI Mobile Satellite Services (MSS) System Ground Segment Architecture. J. Lunsford, et al. American Institute of Aeronautics and Astronautics, Inc. pp. 405–426.

"Call Control in the AMSC Mobile Satellite Service System." William R.H.Tisdale, et al. Pre–Publication Review Copy. American Institute of Aeronautics and Astronautics. Mar. 1, 1994, pp. 1–13.

"Westinghouse MSAT Mobile Terminal Channel Emulator." A. Fasulo, et al. American Institute of Aeronautics and Astronautics, Inc. pp. 256–260.

"MSAT Network Communications Controller and Network Operations Center." Tony Harvey, et al. American Institute of Aeronautics and Astronautics, Inc. pp. 270–279.

"MSAT and Cellular Hybrid Networking." Patrick W. Baranowsky II. Westinghouse Electric Corporation. Jun. 1993. pp. 1–7.

* cited by examiner

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2

| MODES/FUNCTIONS | | |
| --- | --- | --- |
| MODE | REGISTRATION | OPERATION |
| SATELLITE ONLY | POWER ON REGISTRATION IN MSS ONLY, IF AVAILABLE. SYSTEM MAY NOT RE-REGISTER IS PRIOR REGISTRATION WAS IN MSS. | MET USES MSS ONLY. IF SATELLITE COVERAGE IS UNAVAILABLE, SERVICE IS DISALLOWED. NO REQUIREMENT FOR HANDOFF. |
| AUTOMATIC ROAMING, SATELLITE PRIORITY | POWER ON REGISTRATION IN MSS, UNLESS UNAVAILABLE, IN WHICH CASE MET REGISTERS IN CMC SYSTEM. MOBILE WILL RETURN REGISTRATION TO MSS WHENEVER POSSIBLE. | MET USES MSS IF AVAILABLE. CELLULAR COMMUNICATION IS USED AS LAST RESORT. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| AUTOMATIC ROAMING, CELLULAR PRIORITY | POWER ON REGISTRATION IN CMC SYSTEM, EITHER HOMED OR AS VISITOR. IF CELLULAR COVERAGE IS UNAVAILABLE., MET WILL REGISTER IN MSS. MET WILL RETURN REGISTRATION TO CMC WHENEVER POSSIBLE. | MET USES CELLULAR CARRIER IF AVAILABLE. SATELLITE COMMUNICATION IS USED AS LAST RESORT. LIVE CALL HANDOFF FROM SERVING CMC IS TO ADJACENT CMC IS POSSIBLE, OTHERWISE TO MSS. HANDOFF FROM MSS TO CELLULAR IS NOT |
| AUTOMATIC ROAMING, CELLULAR PRIORITY, HOME CMC ONLY | POWER ON REGISTRATION IN CMC SYSTEM, IF AVAILABLE. IF HOME CELLULAR COVERAGE IS UNAVAILABLE, MET WILL REGISTER AS A ROAMER IN MSS. MET WILL RETURN REGISTRATION TO HOME CMC WHENEVER POSSIBLE. | MET USES HOME CELLULAR CARRIER IF AVAILABLE, AND ROAMS ONLY TO MSS. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| CELLULAR ONLY | POWER ON REGISTRATION IN HOME CMC IF AVAILABLE, OR AS ROAMER IN VISITED CMC. REGISTRATION FOLLOWS NORMAL CELLULAR PROCEDURES. REGISTRATION AS ROAMER IN MSS IS DISALLOWED. | MET USES HOME CELLULAR CARRIER IF AVAILABLE, AND ROAMS ONLY TO OTHER CMCs. LIVE CALL HANDOFF FROM SERVING CMC IS TO ADJACENT CMC IF POSSIBLE. HANDOFF TO MSS IS DISALLOWED. |

FIG. 16

NETWORK CONTROL CENTER FOR SATELLITE COMMUNICATION SYSTEM

RELATED APPLICATIONS

This application is a continuation of U.S. patent application Ser. No. 09/133,687, filed Aug. 13, 1998, which is a continuation of U.S. patent application Ser. No. 08/728,227, filed Oct. 10, 1996, now U.S. Pat. No. 5,842,125, which claims priority from U.S. Provisional Patent Application No. 60/007,749, filed Nov. 30, 1995, all of which are incorporated herein by reference.

TECHNICAL FIELD

The present invention relates generally to a satellite communication system and more particularly to an improved network control for a satellite communication system using a network control center (NCC) and group controller (GC) arrangement for satellite communication providing voice, data, and facsimile transmission between mobile earth terminals (METs or MTs) and feederlink earth stations (FESs) that act as gateways to public networks or base stations associated with private networks.

BACKGROUND ART

An overview of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. When the mobile terminal is within range of the cellular system, calls are serviced by the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

NET Radio (NR). This service provides point-to-multipoint circuit switched connections between mobile terminal subscriber stations and a central base station. Mobile users are able to listen to two-way conversations and to transmit using a push-to-talk mode of operation.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signaling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system illustrating these entities and their respective interfaces. The three major classes of entities are defined as user of communications services, external organizations requiring coordination, and a network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC): The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

Network Operations Center (NOC): The NOC manages and controls the resources of the Mobile Satellite Services (MSS) system, including all MSS elements and transmission facilities, and carries out the administrative functions associated with management of the total MSS system. The NOC consists of computer facilities, the necessary management protocols, and man-machine interfaces to human operators. The NOC communicates with the various internal and external entities via a LAN/WAN based MSS Internetwork or dial-up lines.

The satellite network system interfaces with the satellites located therein via the NOC for a variety of operational reasons including message delivery and coordination.

Independent NOCs: The satellite network system interfaces with outside organizations which lease resources on satellite network satellites and which are responsible for managing and allocating these resources in a manner suited to their own needs.

Other System NOCs: This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System: This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering: This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering: This entity engineers the subsystems, equipment and software which is needed to expand capacity to meet increases in traffic demands and to provide new features and services which become marketable to subscribers.

The satellite network system comprises a number of system elements and their interconnecting communications links as illustrated in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC.

The NOC manages and controls the resources of the satellite network system and carries out the administrative functions associated with the management of the total satellite network system. The NOC communicates with the various internal and external entities via a local area network (LAN) /wide area network (WAN) based satellite network Internetwork and dial-up lines.

NCC.

The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES.

The FES supports communications links between METs, the PSTN, private networks, and other MTs. Once a channel is established with an MT, call completion and service feature management is accomplished via In-Band signaling over the communication channel. Two types of FESs have been defined for the satellite network system; Gateway FESs and Base FESs. Gateway FESs provide MTS and MTCRS services. Base FESs provide MRS and NR services.

MET.

The MET provides the mobile user access to the communications channels and services provided by the satellite network system. A range of terminal types has been defined for the satellite network system.

RMS.

The RMS monitors L-band RF spectrum and transmission performance in specific L-band beams. An RMS is nominally located in each L-band beam. Each RMS interfaces with the NOC via either a satellite or terrestrial link.

STS.

The STS provides an L-band network access capability to support FES commissioning tests and network service diagnostic tests. The STS is collocated with, and interfaced to, the NOC.

Communications channels transport voice transmissions between METs and FESs via the satellite. Connectivity for MET-to-MET calls is accomplished by double hopping the communications channels via equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, D.C. (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration includes: processing equipment, communications equipment, mass storage equipment, man-machine interface equipment, and optional secure MT Access Security Key (ASK) storage equipment. The Processing Equipment consists of one or more digital processors that provide overall NCC control, NCS call processing, network access processing and internetwork is communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MT ASK storage Equipment provides a physically secure facility for protecting and distributing MT Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services. Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

There is a general need for an integrated mobile telephone that can be used to transmit to, and receive from, a satellite. In particular, an integrated mobile communication device is needed that provides the ability to roam between a satellite network and a terrestrial based network. The mobile communication device should include the ability to transmit and receive data and facsimile communications. In this connection, there are certain communication delays between the mobile communication device and the satellite that adversely affect the ability to accomplish the above functions and require compensation to effectively and efficiently effectuate transmissions between the mobile communication device and the satellite network.

SUMMARY OF THE INVENTION

There is a general need for an integrated mobile satellite communication system having a control arrangement capable of effectively and efficiently administering and managing the operation of the system for communication.

Accordingly, it is desirable to provide a satellite communications network control and administration system that effectively and efficiently manages the satelllite communications network.

To achieve these and other features and advantages of the present invention, a control and administration system for a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, and a demultiplexer for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIG. 16 is a diagram of the multiple operating modes of the mobile earth terminal (MET);

BEST MODE FOR CARRYING OUT THE INVENTION

The architecture and functioning of the NCC and GC are best described in the context of the arrangement and operation of the satellite network system.

Figure 1:
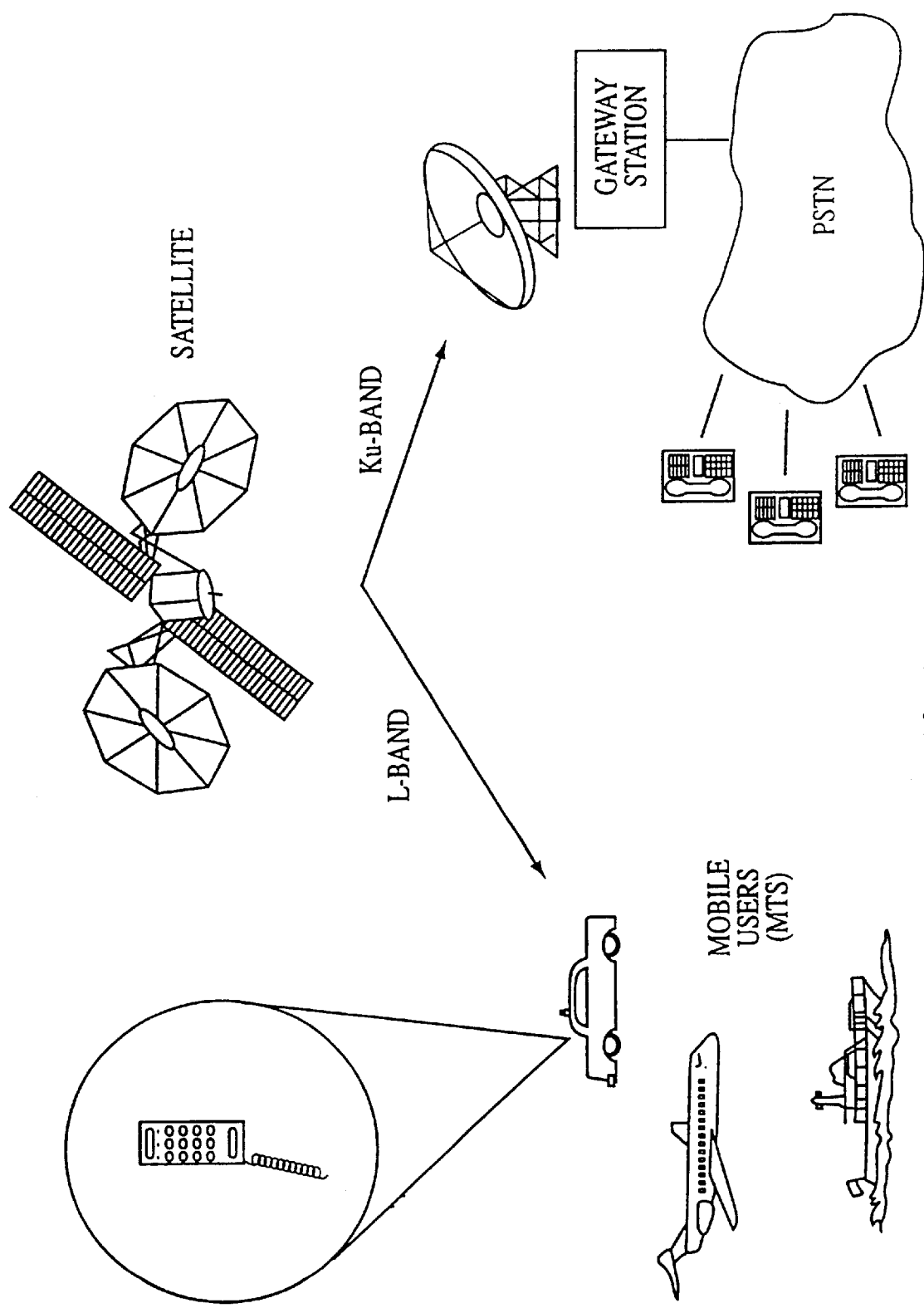
FIG. 1 is a diagram illustrating an overview of the satellite network system.
Figure 3:
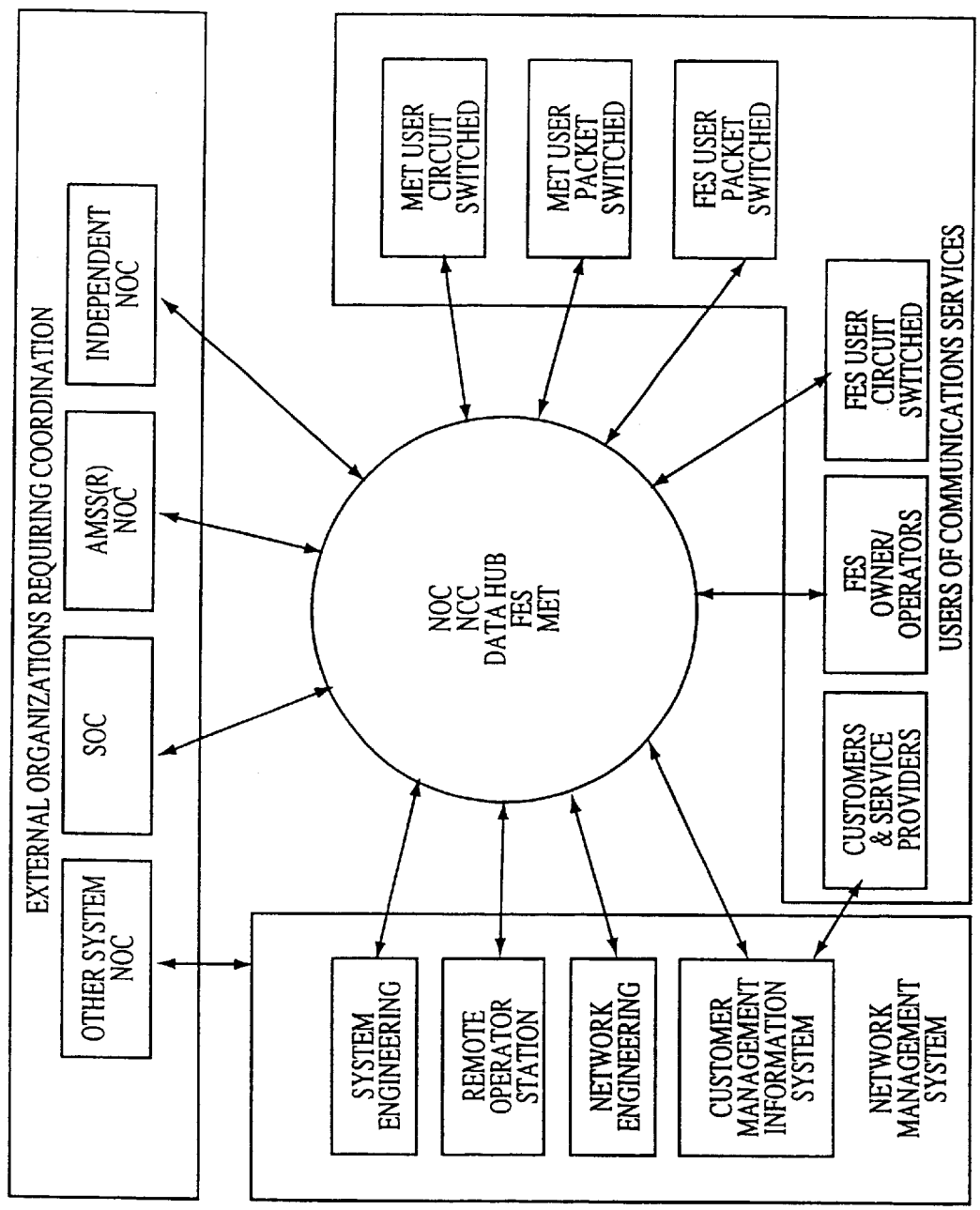
FIG. 3 is a diagram of the satellite network system illustrating components and respective interfaces.
Figure 4:
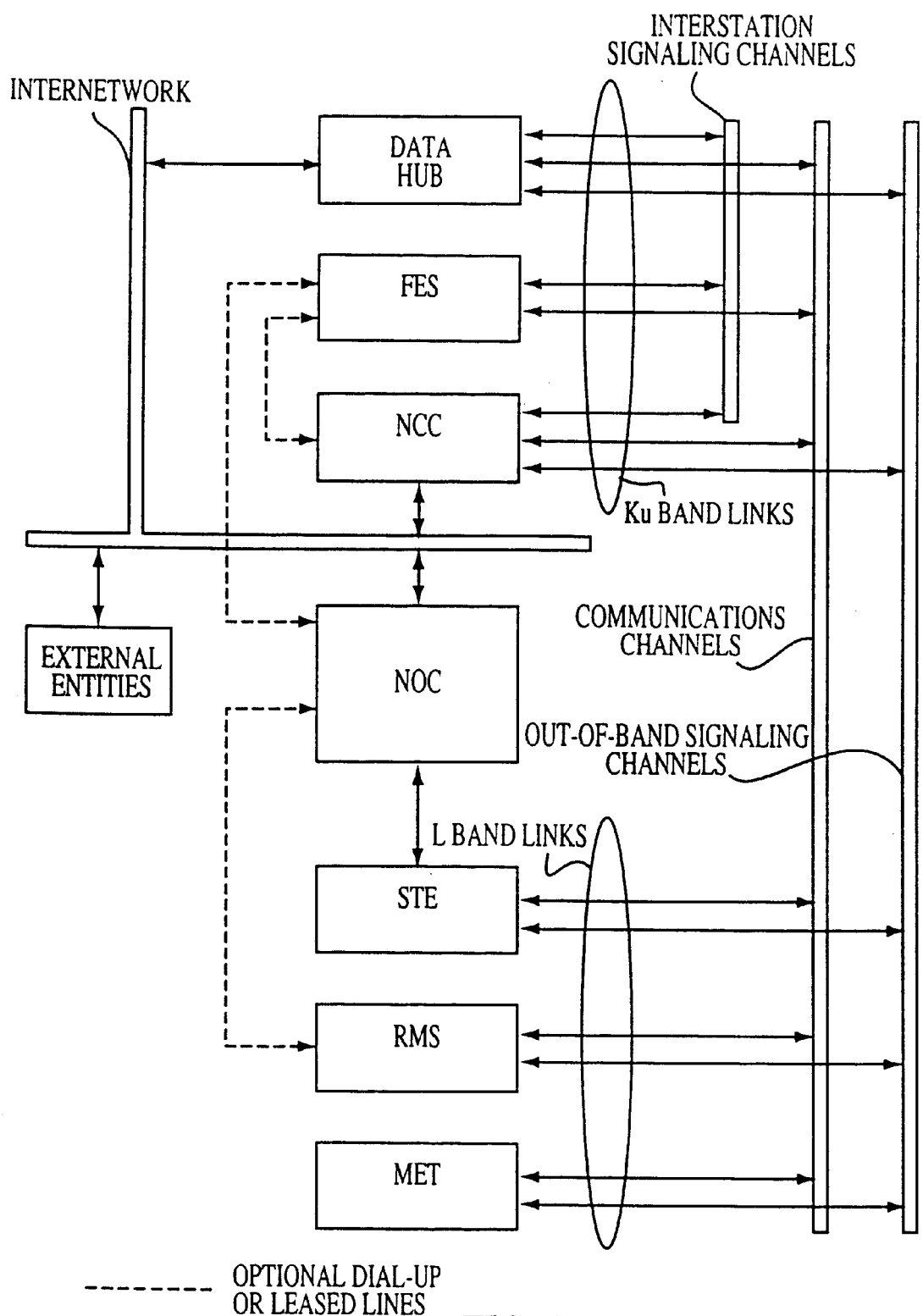
FIG. 4 is a diagram of a satellite network system illustrating a number of system elements and their interconnecting communications links.
Figure 5:
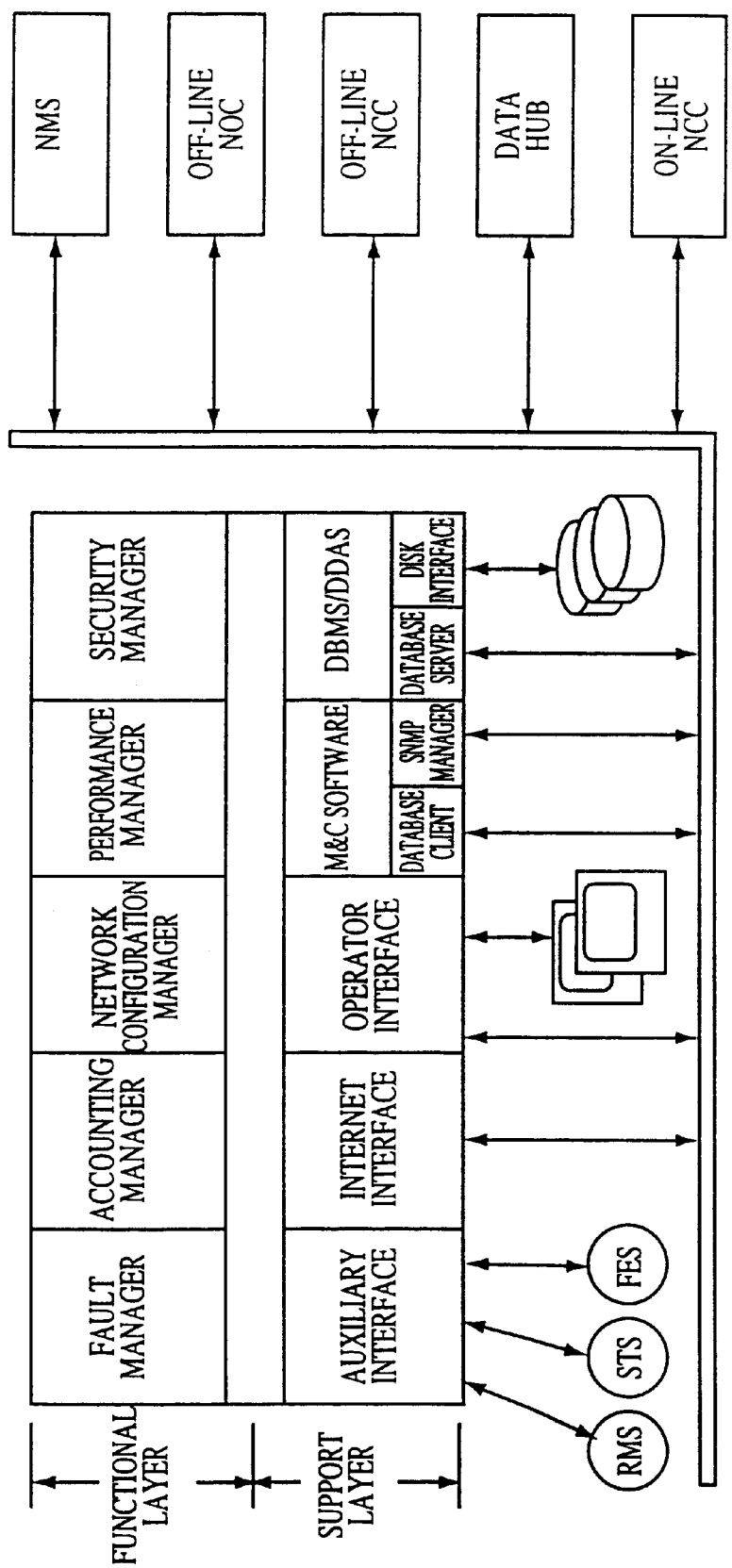
FIG. 5 is a basic block diagram of the NOC and its interfaces.
Figure 6:
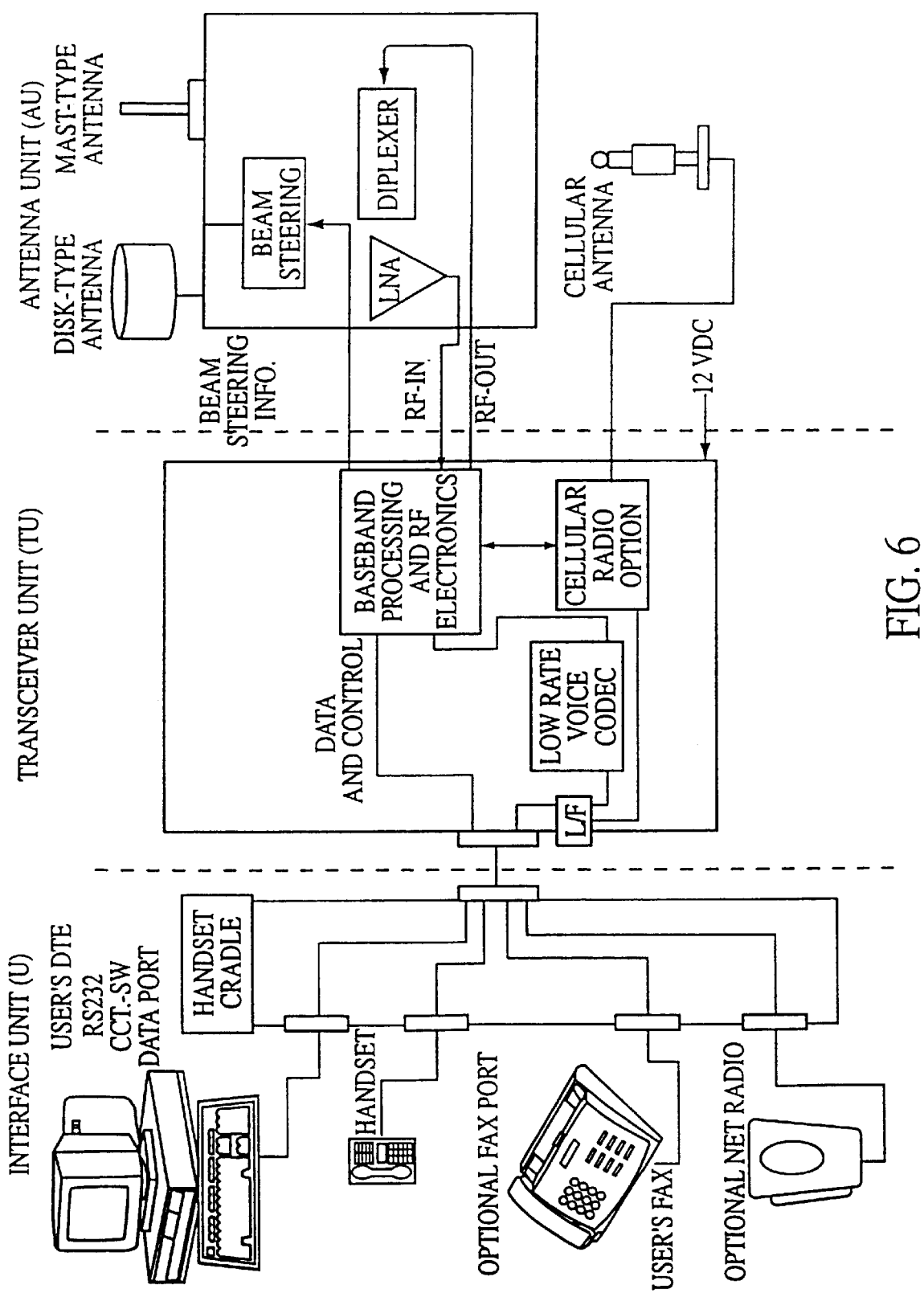
FIG. 6 is a basic block diagram of the physical architecture of the mobile earth terminal (MET)
Figure 7:
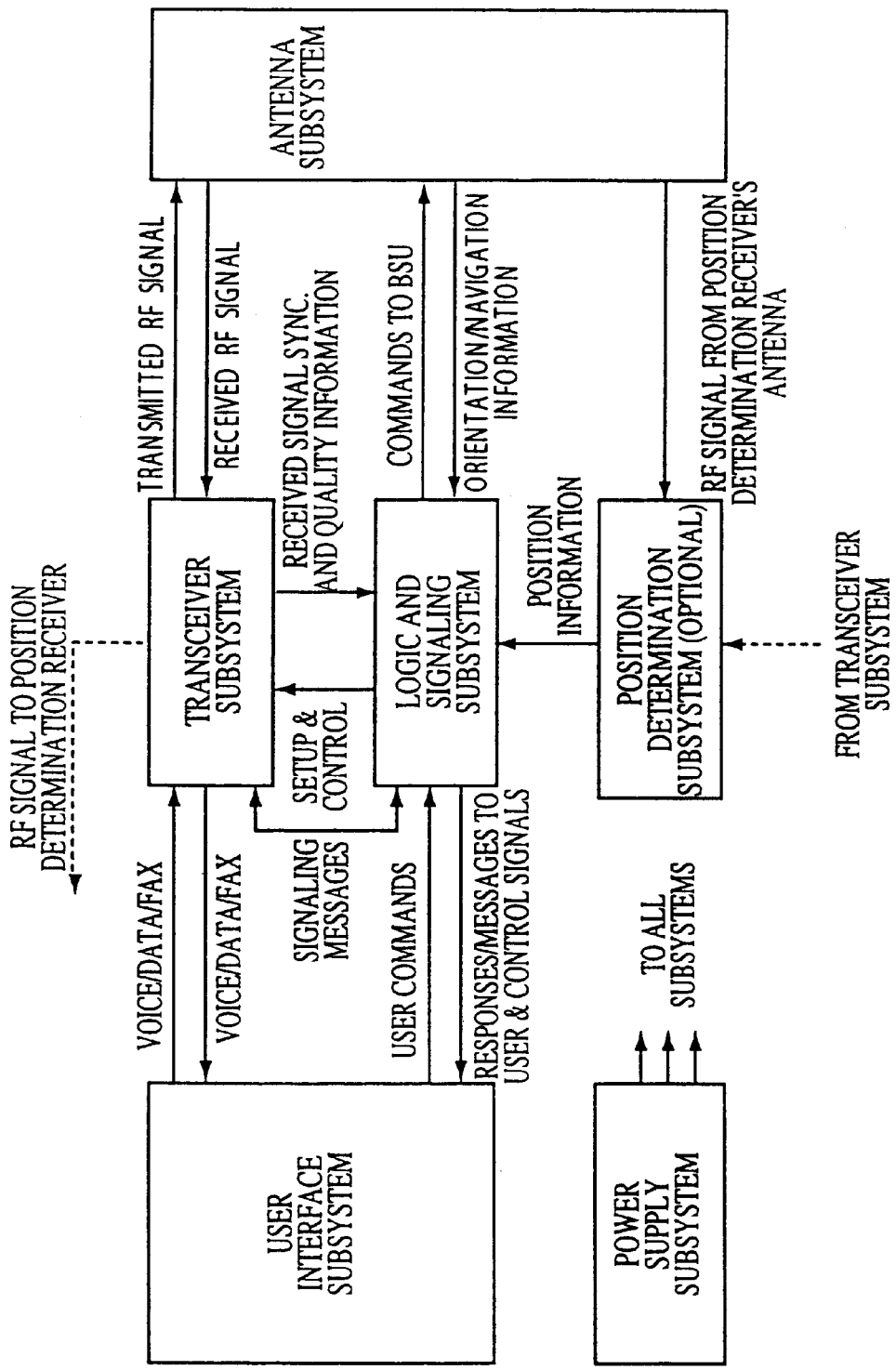
FIG. 7 is a basic block diagram of the functions of the mobile earth terminal (MET)

The MET includes all of the communication and control functions necessary to support communications from a vehicle or fixed remote site using the resources of the satellite network system. FIGS. 6 and 7 are basic block diagrams of the physical architecture and functions of the mobile earth terminal. The basic functional diagram of FIG. 7 is implemented by baseband processing and RF electronics of FIG. 6. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed blow. Advantageously, the mobile earth terminal is functional with antennas that are either steerable or nonsteerable.

The functional subsystems comprising the MET are shown in FIG. 7 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

Figure 8A:
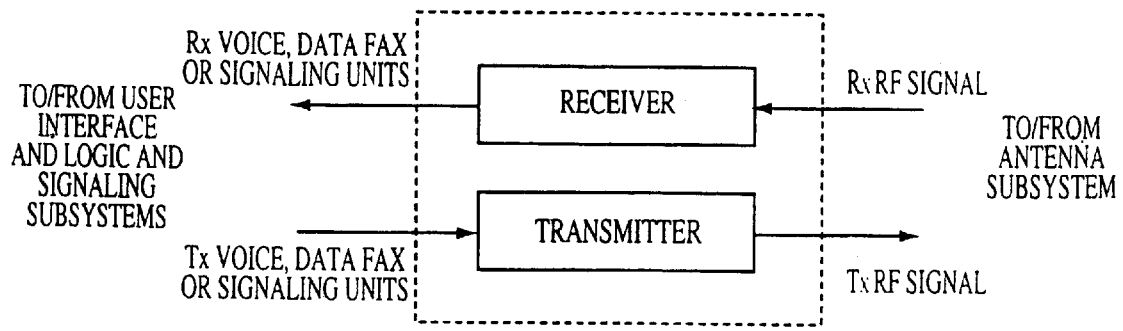
FIGS. 8a–8c are diagrams of different transceiver configurations.
Figure 8B:
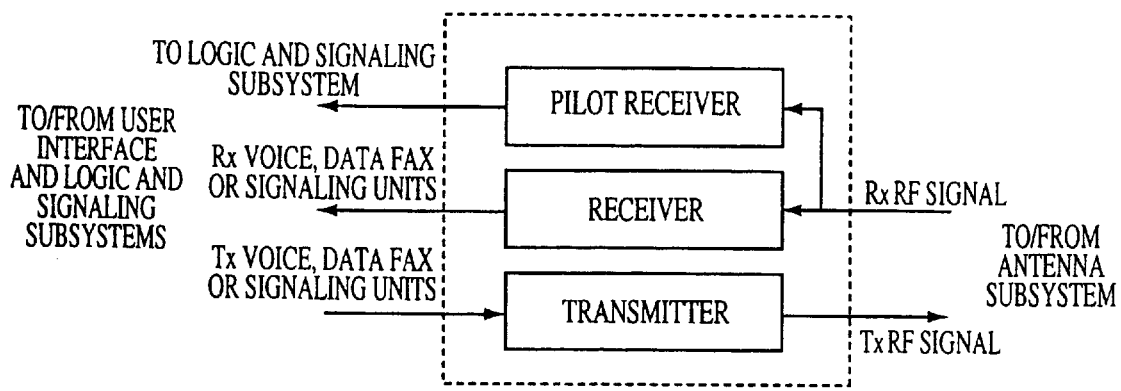
Figure 8C:
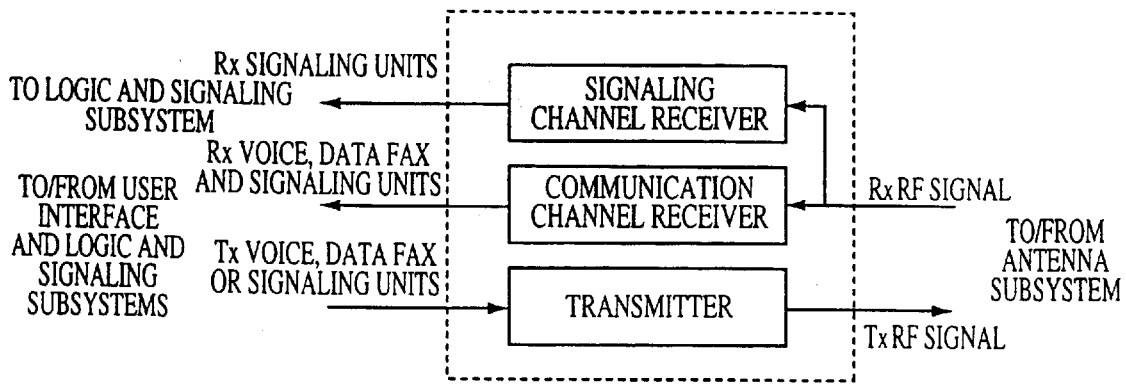

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller. Three different transceiver/receiver configurations are illustrated in FIGS. 8(a)–8(c).

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundancy Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and takes the appropriate measures needed to prevent harmful interference to the satellite network or other system.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station-Land Station Compatibility Standard"; EIA/TIA-557; EIA/IS-54B.

The MSS signaling system provides the communications capability between network elements required to set up and release communications circuits, provide additional enhanced services, and support certain network management functions. The network elements discussed above include group controllers (GCs), feederlink earth stations (FESs), and mobile earth terminals (METs). The seven different channel types are:

| | |
|---|---|
| GC-S | Outbound TDM signaling channel from the GC to the METs. |
| MET-ST | Inbound TDMA signaling channel from the MET to the GC. |
| MET-SR | Inbound random access signaling channel from the MET to the GC. |
| FES-C | Outbound communications and inband signaling channel from an FES to a MET. |
| MET-C | Inbound communications and inband signaling channel from a MET to an FES. |
| GC-I | Interstation signaling channel from the GC to an FES. |
| FES-I | Interstation signaling channel from an FES to the GC. |

Figure 9A:
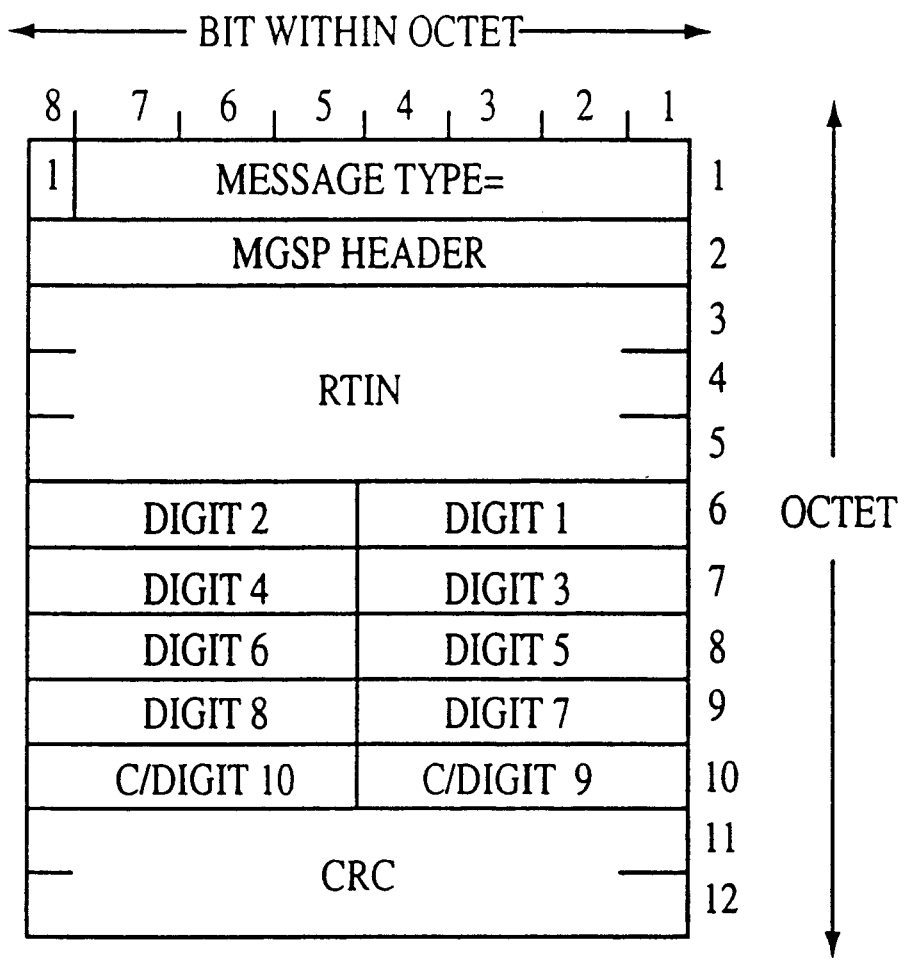
FIG. 9A is a diagram of the format of a typical signalling unit.
Figure 9B:
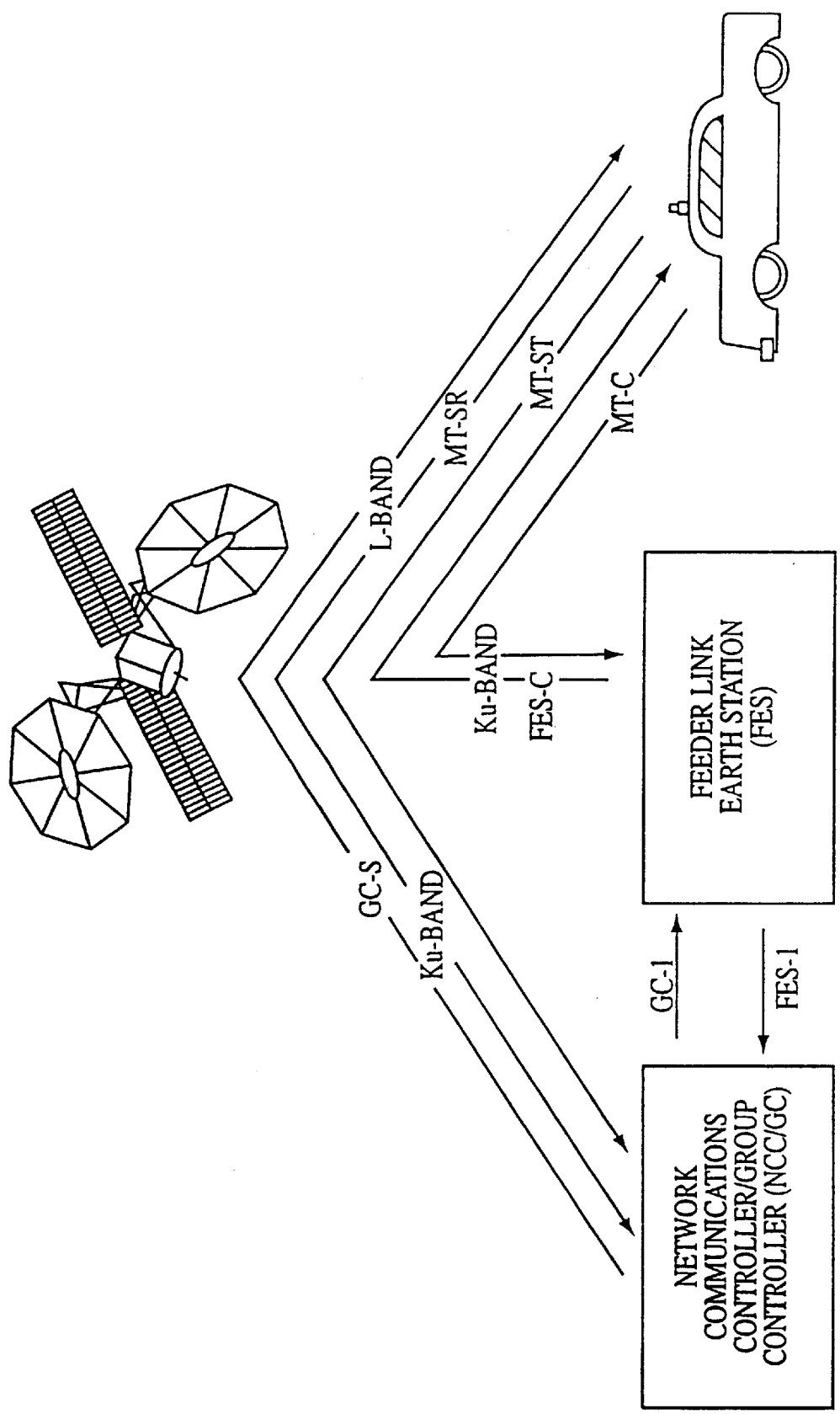
FIG. 9B illustrates the basic signalling architecture in the satellite communication system.

FIG. 9B illustrates the basic signalling architecture in the satellite communication system.

The basic element of communication for signaling and control for the MSS signaling system is the Signaling Unit (SU). The SU consists of 96 bits organized in 12 octets of 8 bits each. The first 80 bits comprise the message, and the last 16 a parity check, computed using the CCITT CRC-16 algorithm. The SU itself-may take a variety of forms, depending on its use. The format of a typical SU, in this case a MET request for access, is shown in FIG. 9A. For transmission, the SU is convolutionally encoded at either rate ¾ or ½, adding an additional 32 or 96 bits respectively.

For the example given in FIG. 9A, the meanings of the various fields are as follows:

Message type: A 7 bit code which identifies the meaning of the SU; in this case a request for access to the MSS system for call placement.

MET-GC Signaling Protocol (MGSP) Header: A 8 bit field comprised of several sub-fields giving particular information related to the protocol: message type (command, response, message), message reference identification, and the number of times the message has been retransmitted.

RTIN: Reverse Terminal Identification Number—the MET's Electronic Serial Number, by which it identifies itself in transmissions on the MET-SR channel.

Digits 1–10: The first 10 digits of the addressed telephone number in the PSTN or private network, in hexadecimal. If the 10th digit is set to "C", an address of greater than 10 digits is indicated.

CRC: The 16-bit error detection code (Cyclic Redundancy Code).

The frame formats used in the GC-S, MET-SR and MET-ST channels are closely related, and are based on a common 360 millisecond superframe established on the GC-S channel. The frame formats and relationships of the out of band signaling channels are shown in FIG. 10.

Figure 10:
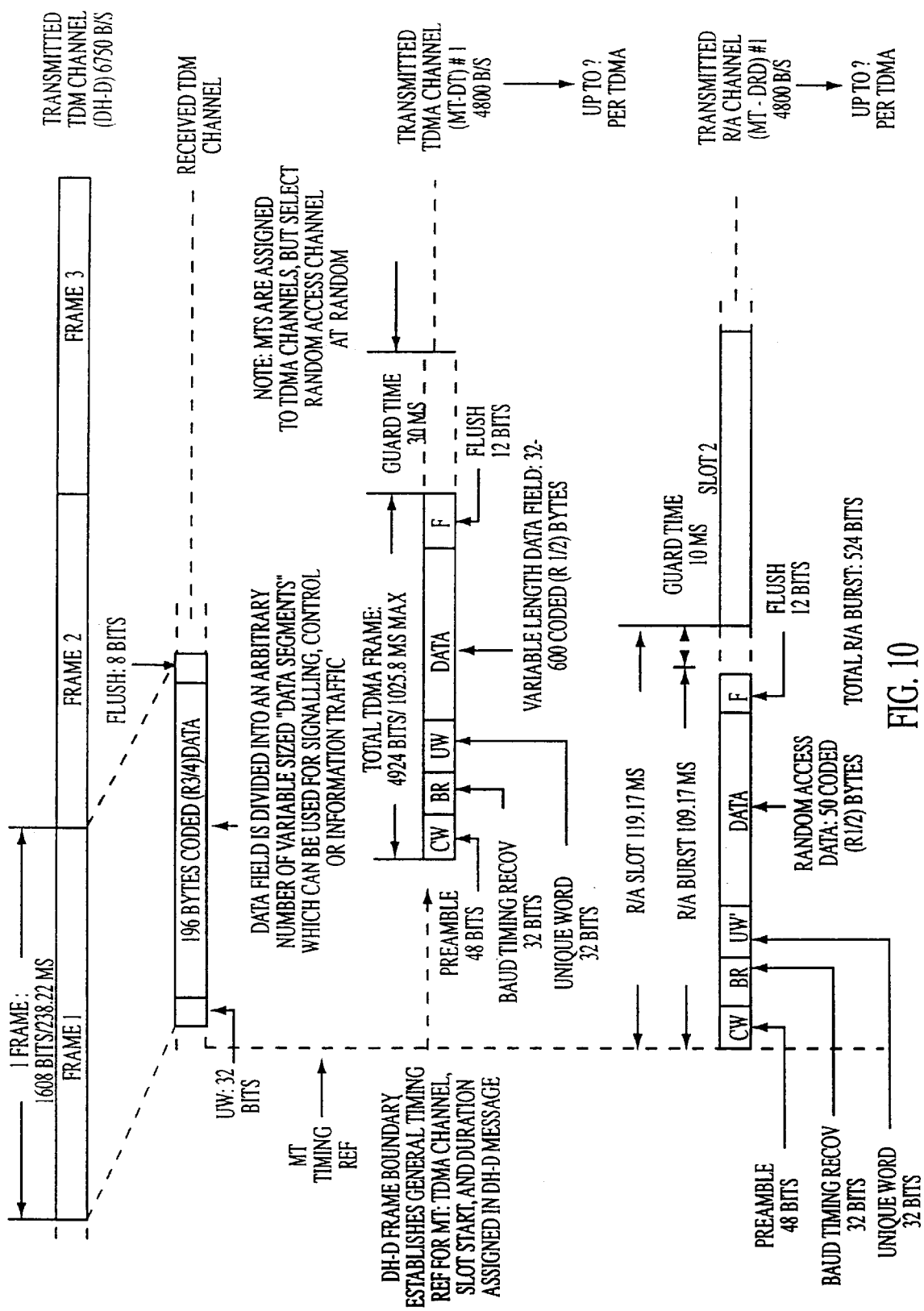
FIG. 10 is a diagram of the frame formats and relationships of the out of band signaling channels.

In FIG. 10, all timing relationships in the MSS system signaling scheme are determined from the GC-S frame structure. The GC-S is operated in the QPSK mode at an aggregate rate of 6750 b/s. The stream is divided into superframes of 360 ms, comprising three 120 ms frames. Each frame is in turn comprised of a 24-bit unique word (UW), six SUs, eight flush bits and 10 unused bits, for a total of 810 bits and 120 ms. The first frame of a superframe is identified by inversion of the UW.

Mobile terminals throughout the area covered by any beam receive GC-S channels with a total uncertainty of approximately 32 ms, primarily due to their geographical locations. The received superframe boundary establishes the four 90 ms "slots" in the MET-SR random access channels, which operate in the BPSK mode at 3375 b/s. The actual random access burst is comprised of a 24-bit preamble, a 32-bit UW, a 128-bit SU (96 bits rate 3/4 coded), and eight flush bits, for a total of 192 bits in 56.9 ms. This allows a 33.1 ms guard time between bursts. Mobile Terminals select a MET-SR channel and slot at random from among the permitted choices.

The MET-ST TDMA channels, which also operate in the BPSK mode at 3375 b/s, are comprised of bursts which are equal in length to the GC-S frame, and which are also timed on the received frame boundary. The TDMA burst is made up of a 24-bit preamble, a 32-bit UW, a 192-bit SU (96 bits rate ½ coded), and eight flush bits. The total length of the TDMA burst is 256 bits in 75.9 ms, which allows a guard time of 44.1 ms. Mobile Terminals always respond to commands received on the GC-S on a MET-ST channel which corresponds in number to the position of the command SU in the TDM frame. For example, the MET will respond to a command in SU slot 2 on MET-ST channel 2, and so forth. The response is always transmitted in the second frame time after receipt of the command, so that there is a minimum of 120 ms in which the MET can prepare its response.

The initial phase of establishing a call is handled by out-of-band signaling on the GC-S, MET-SR and MET-ST channels. This phase culminates in assignment of a pair of communication channels to the MET and FES. When these elements receive and tune to the communication channels, further signaling and control functions are accomplished using inband signaling. The communication channels, FES-C and MET-C, use a variety of related TDM formats which are determined by the intended use of the link, i.e., voice, data, or facsimile and one of three possible primary modes: call setup (entirely signaling), communication (no signaling), or in-band signaling (an occasional subframe of 128 bits is used for signaling/control).

Figure 11:
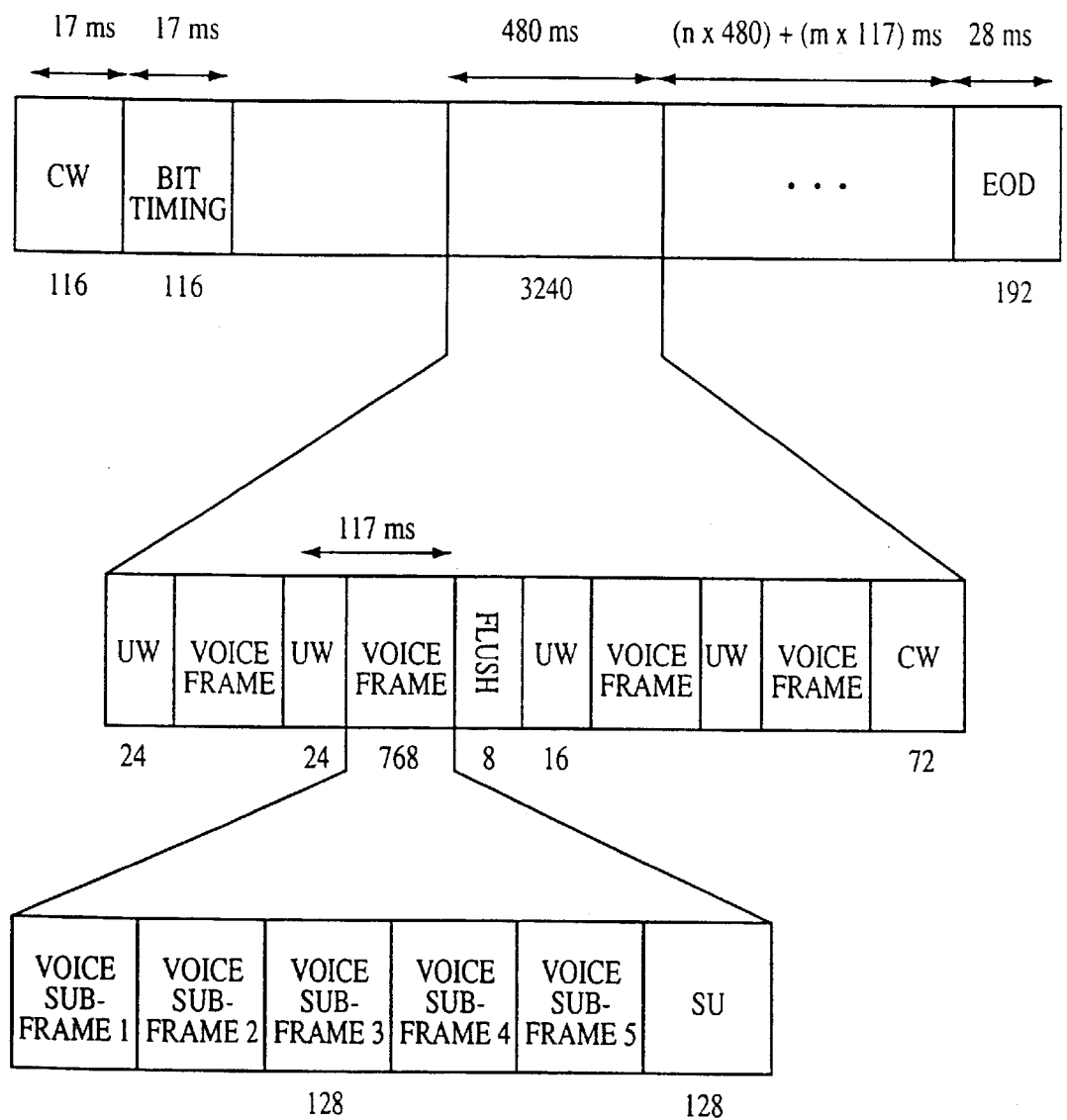
FIG. 11 is a diagram of a typical example of a communication channel format, in this case voice mode in-band signaling.

The same 96-bit SU described above is used to accomplish in-band signaling. A typical example of a communication channel format, in this case voice mode in-band signaling is shown in FIG. 11.

The outbound TDM, inbound TDMA, and inbound random access channels provide signaling between the GC and each of the METS in the associated control group. All communications on these channels will be passed in the form of 96 bit (12 octet) messages known as signaling units. Each signaling unit will begin with a 1-octet messages type field and end with a two-octet cyclic redundancy check. The MET to GC Signaling Protocol (MGSP) serves as the layer two protocol for these channels.

Communications from the group controller (GC) to the mobile terminals is provided by the Outbound TDM or GC-S channel. The primary function of this channel is to carry frequency assignments from the GC to individual METS. In addition, the Outbound TDM channel carries network status information which is received by all METs in a particular beam and control group. The outbound TDM channel operates at a rate of 6750 bits/s with rate ¾ FEC. QPSK modulation and nominally 7.5 kHz channel spacing (other spacings are under investigation) is employed. These parameters are identical to those of the communications channel and were chosen to reduce MET complexity.

Inbound TDMA (MET-ST) channels are used by the MET to respond to actions initiated by the GC, such as responding to the call announcement issued by the GC to check a MET's availability to receive a PSTN originated or MET to MET call. The Inbound Random Access (MET-SR) channels are used by METs to request frequency assignments and for other MET initiated actions. The inbound random access and TDMA channels each operate at a rate of 2400 bits/s with rate ¾ FEC. DPS modulation and nominally 7.5 kHz channel spacing is employed. This modulation scheme has been selected because of its robust performance in the presence of frequency offset and timing errors. It also exhibits superior performance relative to conventional BPSK in the presence of band-limiting and hard-limiting.

Each control group has associated with it a number of L-band beams over which it operates. In each of these L-band beams a control group has associated with it a distinct set of outbound TDM, inbound TDMA, and inbound random access channels. The number of signaling channels of each type in each set is determined based on the level of signaling traffic flowing between the GC and the METs in that control group in that L-band beam. As signaling traffic levels change, new signaling channels of each type are allocated to or deallocated from a particular set of channels. The frequencies used for outbound TDM, inbound TDMA, and inbound random access channels are included in the status information carrier in the bulletin board signaling units transmitted on the outbound TDM channel.

Each MET is assigned to one of the outbound TDM channels in the control group and beam to which it belongs. Each control group supports up to 16 outbound TDM channels in each beam. Each outbound TDM channel has associated with it up to 6 inbound TDMA channels. An inbound TDMA channel will only carry messages that are responses to messages received on the outbound TDM channel with which it is associated inbound random access channels will not associated with a particular outbound TDM channel. A MET chooses a inbound random access channel at random from among those associated with its control group and beam each time a message is to be transmitted. Each control group can support up to 64 inbound random access channels in each beam. 24 of these channels may be required system wide to meet the signaling requirements of a fully loaded system supporting 5000 circuits.

Inband signaling channels (FES-C and MET-C) are provided between the FES and the MET. These channels are used to provide signaling for call setup and call release, and also provide the capability to pass other signaling information while a call is in progress. The FES-C and MET-C channels are operated in two separate modes in "call setup mode" only signaling messages are carried by the channel. In voice mode voice frames are carried by the channel, but the capability to inject signaling messages by occasionally dropping voice subframes exists. Frames containing inband signaling messages employ a unique word different from that used for frames containing only voice subframes.

Interstation signaling channels (GC-1 and FES-1) are used to pass signaling information between the GC and each of the FESs. These channels operate at a rate of 9.6 to 64 kbit/s and are implemented using either the available 5 MHz Ku-band satellite capacity or terrestrial links. The LAP-F protocol will be employed on those links to ensure reliable transfer of variable length signaling and network management messages.

When a MET is idle (powered on and ready to receive a call) it will continuously receive an Outbound TDM channel in order to receive call announcements associated with incoming calls and obtain status information from bulletin board signaling units. Each MET will be capable of transmitting signaling information to the GC on any of the inbound random access channels or on any of the inbound TDMA channels associated with the outbound TDM channel that it is receiving. During a call a MET will receive and transmit all signaling information via the In-Band signaling channels. No signaling information will be sent to a MET via the outbound TDM channel during a call. Any signaling messages from the GC to the MET will be sent to the MET via the FES through the GC-1 and FES-C channels.

Each group controller supports at least one outbound TDM channel in each of its associated L-band beams. Each outbound TDM signaling channel is continuously transmitted and carries frequency assignments and networks status information from the GC to the METs. The outbound TDM channels are also used to poll idle METs to see if they can accept incoming calls. As this channel is the only way to signal information to a MET not engaged in communications, it must be as robust as possible under harsh fading and shadowing conditions.

Another key element in the MSS system is the need for the METs to be as inexpensive as possible. Towards this end, the outbound TDM channel will have the same rate and modulation as the communications channels. This will maximize the commonality of the receive chain of the MET for communications and signaling. Note that as the demodulation process is much more complex than the modulation process, the inbound random access and inbound TDMA channels do not really require this level of commonality with the communications channel.

The number of outbound TDM channels assigned to each set of signaling channels is determined by the traffic supported by the group controller is that L-band beam. Assignment of METs to outbound TDM channels is made based on a special identifier assigned to each MET as commissioning. This identifier is called the GC-S selector identifier code (GSI). The MET selects the outbound TDM channel to be used by dividing the GSI by the total number of outbound TDM channels available in the given beam. The remainder of the four bit binary division process will form the number of the channel to be used. Each MET will receive only the outbound TDM channel assigned to it. This method allows METS in the same logical grouping to be assigned to the same outbound TDM channel as is needed for the Net Radio Service provided by the MSS System. It also allows the load on the outbound TDM channels to be redistributed quickly if a channel fails or a new channel is added.

The 120 ms frame length was chosen because it would support 6 messages per frame and correspond to the slot size requirement (>120 ms) of the inbound TDMA channel. This allows a direct correspondence between outbound TDM frames and inbound TDMA slots for the purposes of TDMA synchronization and scheduling responses to outbound messages. Eight flush bits are included at the end of each frame to allow the decoder to reset to a known state at the beginning of each frame. This allows more rapid reacquisition following channel fade events. The modulation scheme and transmission rate for this channel will be the same as for the transmission channel, namely QPSK modulation at a transmission rate of 6750 bps. Signaling units within each frame will be coded with a rate ¾ constraint length K=7 convolutional code.

The outbound TDM superframe has a duration of 360 ms and is made up of three outbound TDM frames. The superframe duration is the basic time interval over which message repetitions are done. Repetitions are used to increase the reliability of outbound TDM signaling units. Messages can be repeated in consecutive superframes. Studies by AUS-SAT have shown that L-band fade events typically have durations ranging between 10 ms and 100 ms (2). Because the 120 ms frame would not provide adequate separation between message repetitions, the 360 ms superframe is used to reduce the chance of losing two copies of a message during the same L-band fade event. This repetition method is similar to that used in the AUSSAT system. Different numbers of repetitions may be used for different message types to provide different levels of reliability. The number of repetitions used for a particular message type will be a part of the signaling protocols and can be varied by the system operator. In addition to message repetitions, interleaving will be used to protect against burst errors. The interleaving is provided over a TDM frame and provides improved performance in the presence of short burst errors.

The bulletin board is a set of signaling unit (SUs) that are periodically transmitted by the MCC on all outbound TDM channels. The bulletin board contains global information such as current network status, signaling channel frequencies and inbound random access channel congestion control parameters. Every MET processes the information in the bulletin board METs, on startup, and acquires the entire bulletin board before attempting to use the MSS system. At least one bulletin board SU is transmitted in every outbound TDM frame. Bulletin board SUs are also sent as "fillers" SUs, i.e., sent when there are no other SUs pending on the outbound TDM channels. Bulletin board SUs do not occupy any fixed position in the outbound TDM frame.

Bulletin board SUs are grouped into pages of related SUs. Each Bulletin Board page has an update number associated with it, which will be sent with each SU of that page. This number will be incremented by the NCC whenever the information in that page is updated. METs are required to build a local data structure that contains the contents of the bulletin board. Whenever a change in update number is detected for any page, the MET will update the entire data structure for that page with the contents of the bulletin board SUs that follow.

The inbound TDMA channel is used by the METs to transmit responses to call announcement messages and for responses to other messages received on the outboard TDM channel. Each of the inbound TDMA channels is assigned to a particular outbound TDM channel. The number of inbound TDMA channel assigned to a particular outbound TDM channel depends on the traffic supported by that outbound TDM channel and is selectable by the network operator. The TDMA channel is divided into slots of 120 ms duration. Inbound messages consist of 96 bits before coding and 128 bits after rate ¾ convolutional coding. The resulting burst will occupy 80 ms of the slot, allowing 40 ms of guard time.

This guard time arises due to the uncertainty in round trip transmission time between the satellite and a mobile terminal. Mobile terminals derive their inbound frame timing (for both the TDMA and random access channels) from the outbound TDM frames. Inbound TDMA slots have the same duration as an outbound TDM frame. At a MET each TDMA slot boundary occurs at an outbound TDM frame boundary. If MET A is nearer to the satellite than MET B, MET A will receive the outbound TDM channel At sooner than MET B, where At corresponds to the difference in propagation times to the satellite for the two terminals. As a result, if both METs synchronize their transmit timing to their reception of the outbound TDM channel, MET B's responses to messages will take 2Δt longer to reach the satellite than MET A's responses. As additional guard time of 1 symbol time also must be included to account for the ±½ symbol synchronization uncertainty in the MET. This results in a total guard time requirement of 2Δt+1 symbol time.

TDMA scheduling is done using a fixed relationship between outbound TDM channel time slots and inbound TDMA channels and slots. The response to a message received in the nth slot of the outbound TDM frame is transmitted on the nth TDMA channel assigned to that outbound TDM channel. The frequencies of the assigned inbound TDMA channels are contained in one of the bulletin board signaling units periodically transmitted in the outbound TDM channel. The response to an outbound message is transmitted in the TDMA time slot that begins 120 ms after the end of the TDM frame in which the outbound message was received. This should provide adequate time for message processing in the MET.

The inbound random access channel is used by the METs to transmit call requests to the GC. It is also used to carry other inbound messages for MET originated actions. The number of inbound random access channels assigned to a particular control group in a particular L-band beam depends on the traffic supported by that control group in that beam and is selectable by the network operator. To provide reasonable call setup times and call loss probabilities these channels are typically be operated at a throughput of approximately 25% or less. As the random access channel is operating at a relatively low throughput, one of the prime goals in its design is that it be bandwidth efficient.

The frequencies used for the random access channels are transmitted in the bulletin board signal units. For each transmission, METs choose at random among the inbound signaling channels assigned to their control group. After transmitting a message, the MET waits a given amount of time for a response. If no response is received within this amount of time, the MET retransmits in a slot selected at random over some given number of slots. This procedure is repeated until either a response is received or a maximum number of transmissions is reached. The bursts on the random access channel are identical to those on the TDMA channel (i.e., modulation, coding, preamble, etc.).

The MET-GC Signaling Protocol (MGSP) procedures send signaling units between GCs and METs via the GC-S, MET-ST and MET-SR channels. This protocol encapsulates functions such as channel selection, channel access, slot timing, error recovery and congestion control. Higher layer functions, such as call processing, use the protocol for communicating among themselves between the METs and GCs.

Figure 12:
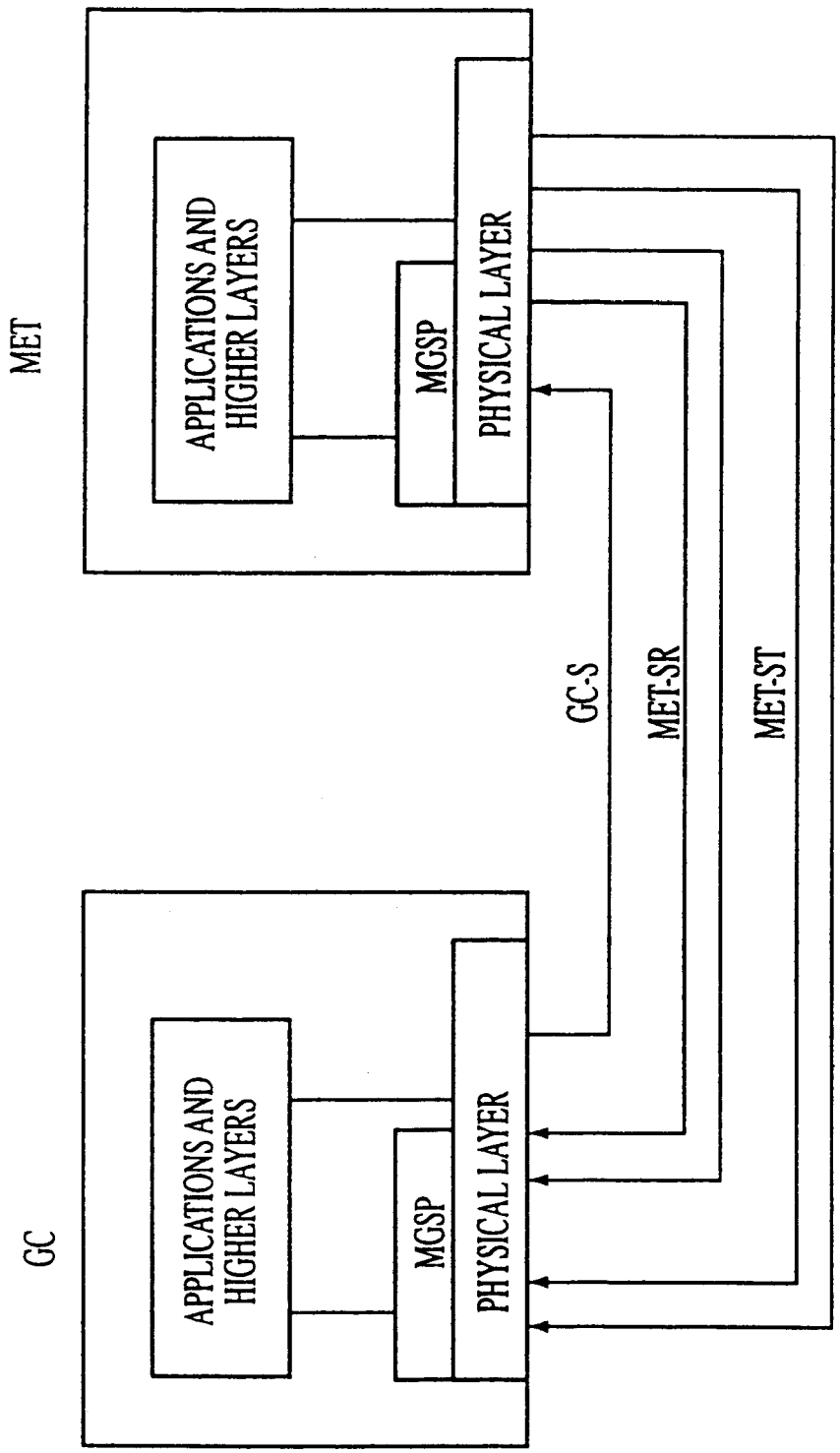
FIG. 12 is a diagram of the relationship of MGSP to other signaling layers in the GC and the MET.

The relationship of MGSP to other signaling layers in the GC and the MET is shown in FIG. 12. A transaction consists of a command message that is sent from an originating application to a destination application, to which the destination application replies with a response message. Each command and response consists of a signaling unit. The MGSP performs functions such as channel selection, error recovery using retransmission, and repetition of SUs to improve channel reliability. The MGSP at a MET also implements congestion control procedures for the MET-SR channels. only one outstanding transaction exists between a MET and a GC in a given direction. However, two simultaneous transactions, one in each direction, are supported between a GC and a MET. MGSP also provides a only-way message service, that does not require a response from the receiver.

Figure 13:
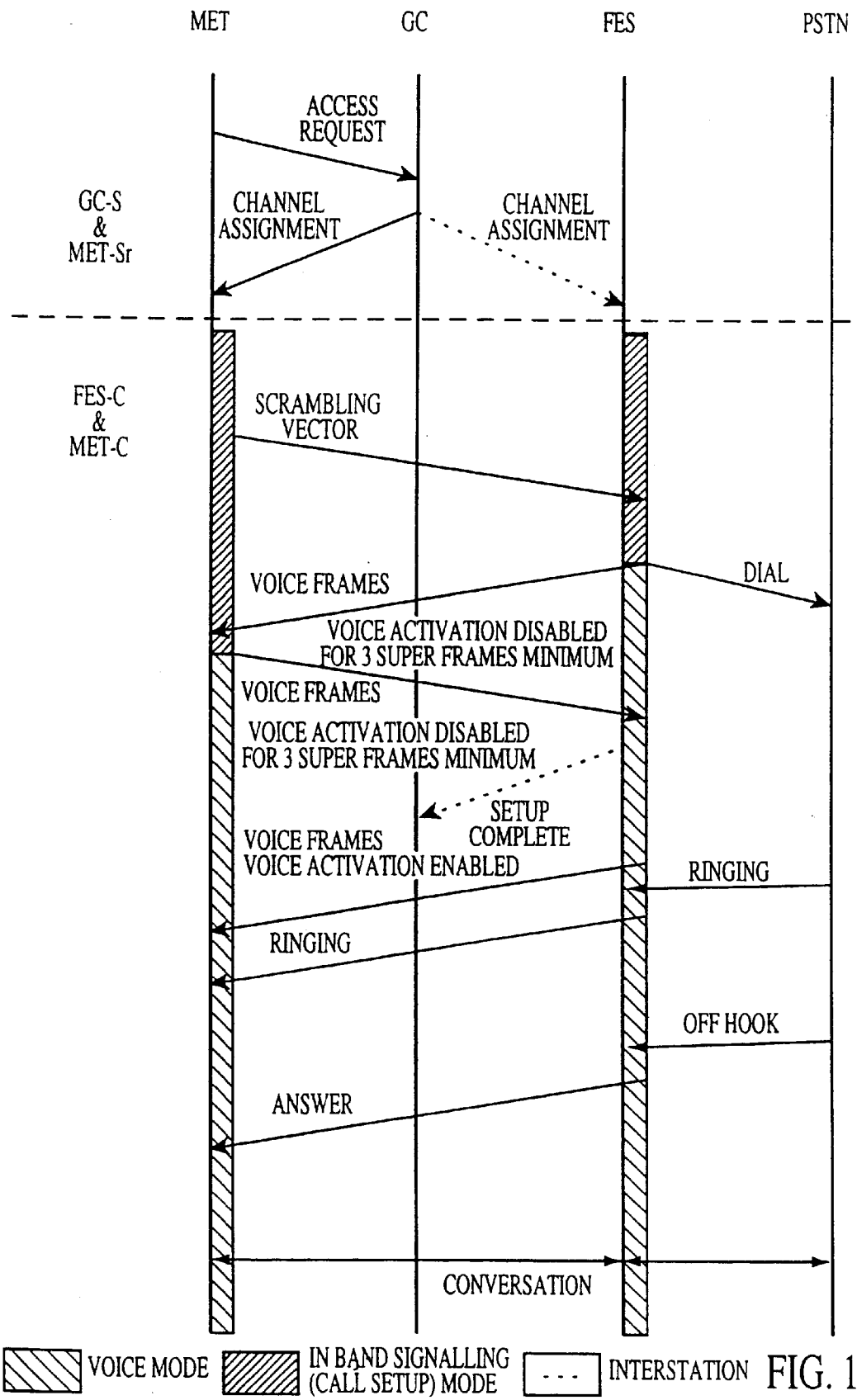
FIG. 13 is a diagram of the improved call setup protocol used to establish a MET originated voice call.

The improved call setup protocol used to establish a MET originated voice call is shown in FIG. 13. When a MET user initiates a call, the MET formats and transmits an access request message via a random access channel. This message includes the call type and the destination phone number. The group controller chooses an FES to handle the call and sends frequency assignments to the MET via the TDM channel and to the FES via the interstation signaling channel. The FES frequency assignment also includes the call type, the destination phone number to allow the FES to complete the call, and an access security check field used to verify the METs identity. The access security check field is generated by the group controller using the MET frequency assignment and the MET key which is known only to the MET and the group controller.

After the MET receives the frequency assignment, it transmits a scrambling vector message to the FES. This message contains the initial vector to be preloaded into the FES scrambler at the beginning of each voice channel frame. Letting the MET randomly pick this vector provides some degree of privacy on the Ku to L-band link. The scrambling vector message also contains an access security check field generated by the MET using its frequency assignment and its key. The FES compares this field with that received from the group controller to verify the identity of the MET. After receiving the scrambling vector message, the FES and the MET switch from call setup mode to voice frame mode and the FES completes the call to the terrestrial network user.

Figure 14:
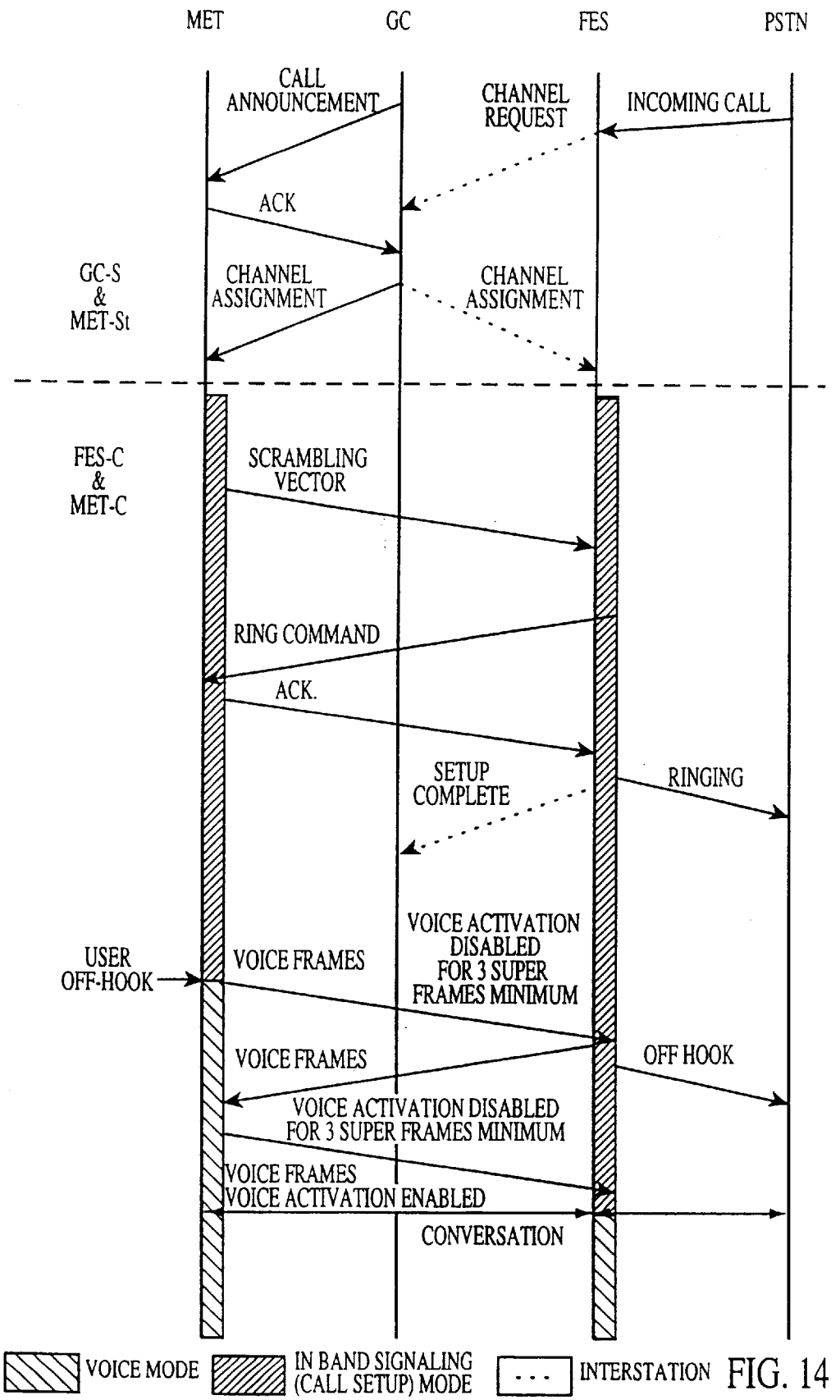
FIG. 14 is a diagram of the improved protocol used for PSTN originated calls.

The improved protocol used for PSTN originated calls is shown in FIG. 14. When a call from a terrestrial network user arrives at an FES, the FES makes a channel request using interstation signaling. This request contains the phone number received from the terrestrial network user. The group controller determines the MET identity based on the phone number and transmits a call announcement via the TDM channel. The MET acknowledges this announcement via the TDMA channel. This exchange allows the group controller to verify that the MET is available before assigning bandwidth to the call. Frequency assignments are then made and the scrambling vector is transmitted by the MET. The call is then completed to the MET user.

MET to MET calls are set up using a double hop connection through an FES. These calls are set up by the group controller and the FES as a MET to PSTN call setup concatenated with a PSTN to MET call setup. As a result the METs require no additional call processing for MET to MET calls. A MET authenticates its identity upon each commissioning event, performance verification event, and call setup event. The authentication process is based upon the use of an encryption function and a MET Access Security Key (ASK) to form an authorization code (the Access Security Check Field) from a random variable (the MET transmit and receive frequency assignments) at the beginning of each event.

Further details of the authentication process and encryption function are set forth in the assignee's copending provisional application Ser. No. 60/007,803, filed Nov. 30, 1995, which is incorporated herein by reference in its entirety.

MET Roaming

Figure 15:
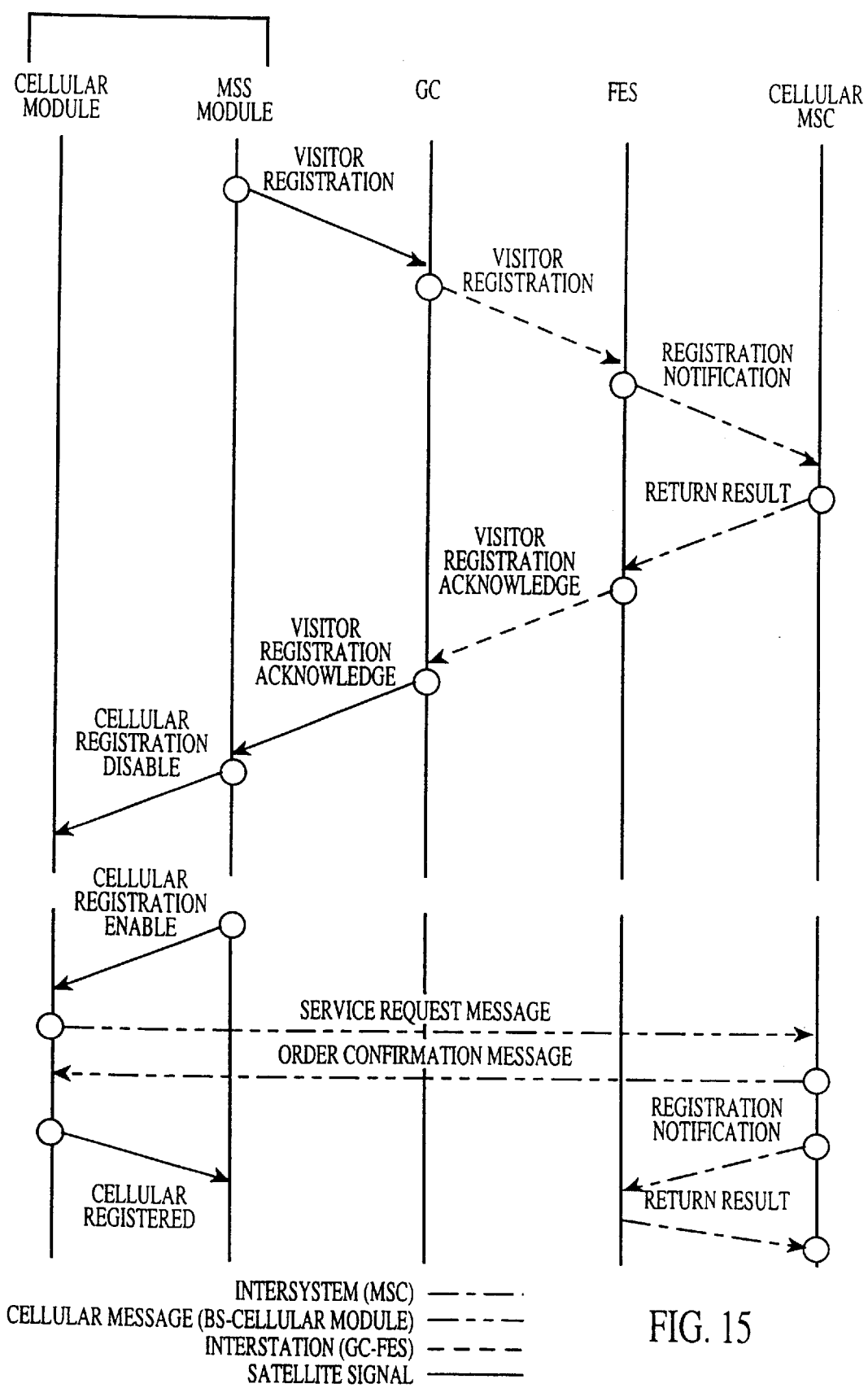
FIG. 15 is a diagram of a visitor registration sequence of the MET.

The Mobile Telephone Cellular Roaming Service (MTCR) supplements cellular service, providing access where there is no cellular coverage. The "home" Mobile Switching Center (MSC) of the multimode MET, as defined in EIA/IS-41B, is either the terrestrial cellular mobile carrier (CMC) system or the satellite network system. The MET registers as a "visitor" in either the satellite MSC or a terrestrial cellular system MSC per the requirements of EIA/IS-41B. The visitor registration sequence is provided in FIG. 15. The gateway provides automatic roaming for METs outside the range of terrestrial cellular coverage in accordance with EIA/IS-41B. METs are identified with the same 10-digit telephone number in the terrestrial cellular and satellite networks.

In the idle state, a mobile unit monitors the cellular and satellite signaling channels. The normal cellular procedure is used for terrestrial calls as defined in EIA/TIA 557. Each MET uses the cellular terminal ESN (electronic serial number) and the telephone number for the purposes of identification and registration on the CMC. Upon power up, the MET registers per the requirements of FIG. 16. If unsuccessful, it registers in accordance with the secondary selection, if applicable. If the mobile is in the coverage area of selected preferential service, the MET will not attempt to register as a roamer-in another system until the MET detects the absence of preferential coverage. At that time, the MET attempts to register on the secondary coverage system as a roamer.

If the MET is registered in a secondary coverage system as a roamer, and detects the availability of preferential coverage, it attempts to register (reregister) with the preferential system. However, once a call is established on the satellite system, it remains on the satellite system until completion. Reregistration only occurs after a suitable time delay at the MET to avoid constantly switching between networks. For all reregistrations, a suitable time delay is defined as follows. The MET, upon the loss of a primary service (satellite or cellular) waits, for example, a nominal 6 seconds before attempting to register in the alternate service (cellular or satellite). If the primary service is recovered prior to the expiration of the 6 second delay, the mobile will not attempt reregistration. When registered on the alternate service, the MET will wait a nominal 6 seconds, and will then continuously monitor the availability of the primary service. When the primary service becomes satisfactorily available, the MET will attempt to return the registration to the primary service.

If the primary service is subsequently lost again, the MET will wait a nominal 15 seconds before attempting to register in the alternate service. If the primary service is recovered prior to the expiration of the 15 seconds delay, the mobile will not attempt reregistration. When registered on the alternate service, the MET will wait a nominal 15 seconds, and will continuously monitor the availability of the primary service. When the primary service becomes satisfactorily available, the MET will attempt to return the registration to the primary service.

If the primary service is subsequently lost again (a third or more times), the MET will wait a nominal 30 seconds before attempting to register in the alternate service. If the primary service is recovered prior to the expiration of the 30 second delay, the mobile will not attempt reregistration. When registered on the alternate service, the MET will wait a nominal 30 seconds and will then continuously monitor the availability of the primary service. When the primary service becomes satisfactorily available, the MET will attempt to return the registration to the primary service.

Once the MET has invoked any reregistration, a 5 minute timer will be started. The timer will be reset to 5 minutes for each reregistration. If the 5 minute timer expires, the reregistration delay will be set to a nominal 6 seconds and the cycle will start over again. If both services are lost, the MET will continuously monitor both services, and will attempt to register (reregister) on whichever service becomes satisfactorily available.

MET Data Call

Figure 17A:
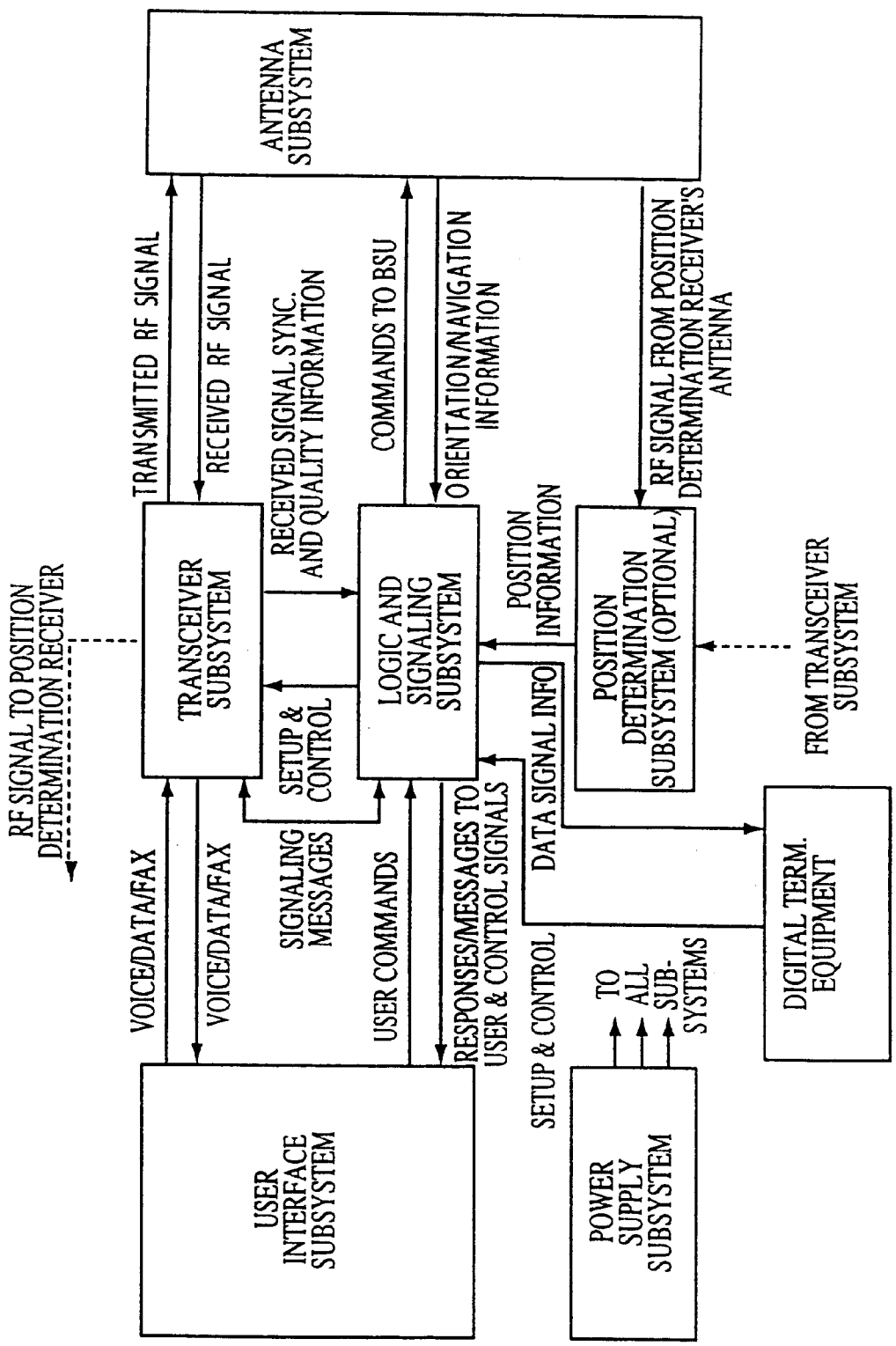
FIG. 17A is a basic block diagram of the functions of the mobile earth terminal (MET) including the digital equipment terminal functions.

FIG. 17A is a basic block diagram of the functions of the mobile earth terminal including the digital terminal equipment functions. The calling procedures for MET initiated data calls permit standard data terminal equipments (DTEs) connected to METs to place 2400 bps and 4800 bps data calls to appropriately equipped subscribers of the PSTN or members of private networks, similar to a data call by a standard modem. As discussed below, however, additional functions are required to effectuate the data call in the MET environment. The 2400 bps mode has a fall back rate of 1200 bps. The frame and data field formats for 1200 bps is identical to that for 2400 bps.

Figure 17B:
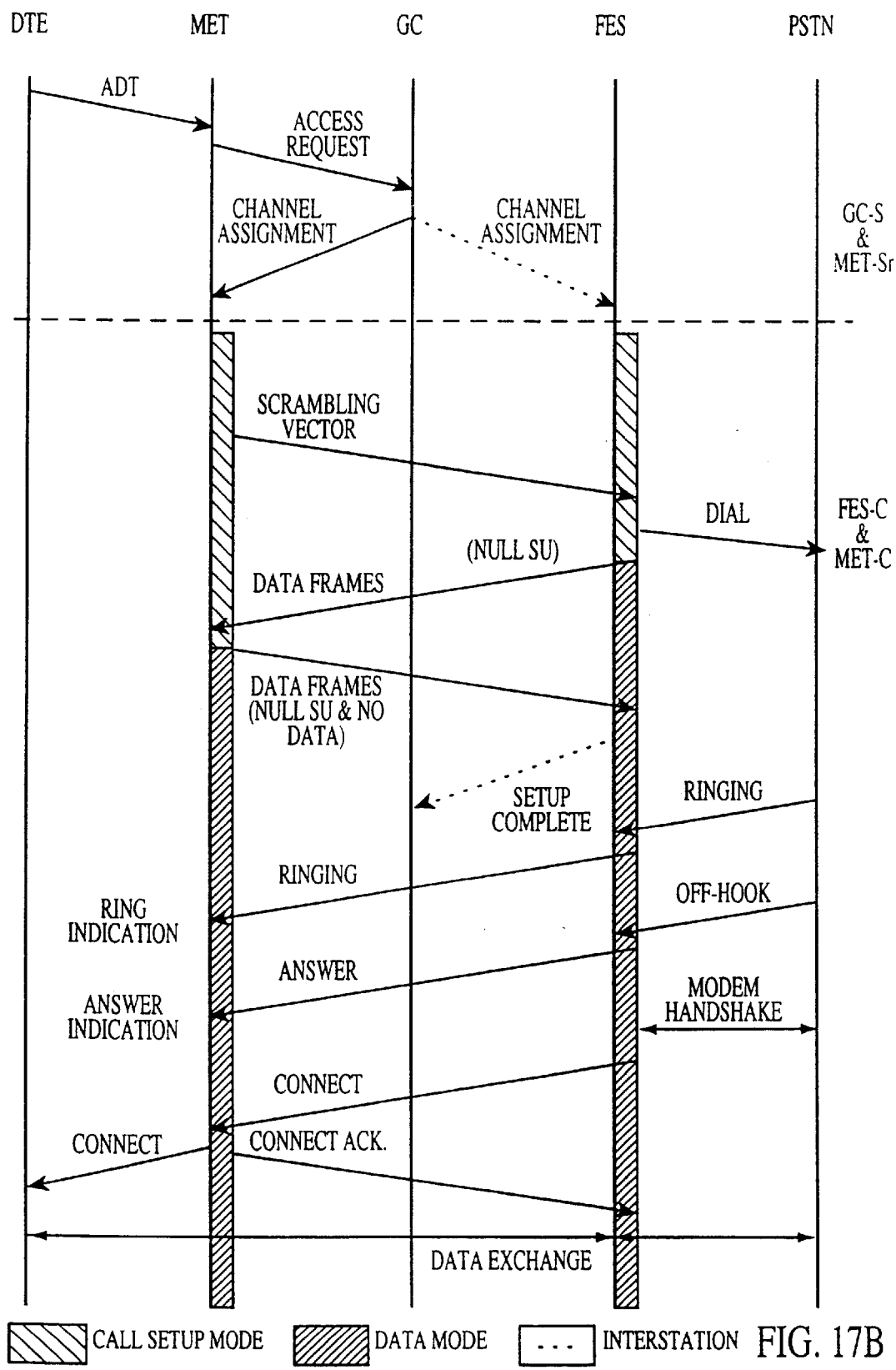
FIG. 17B is a diagram of a data call setup sequence between the MET and a PSTN.
Figure 18:
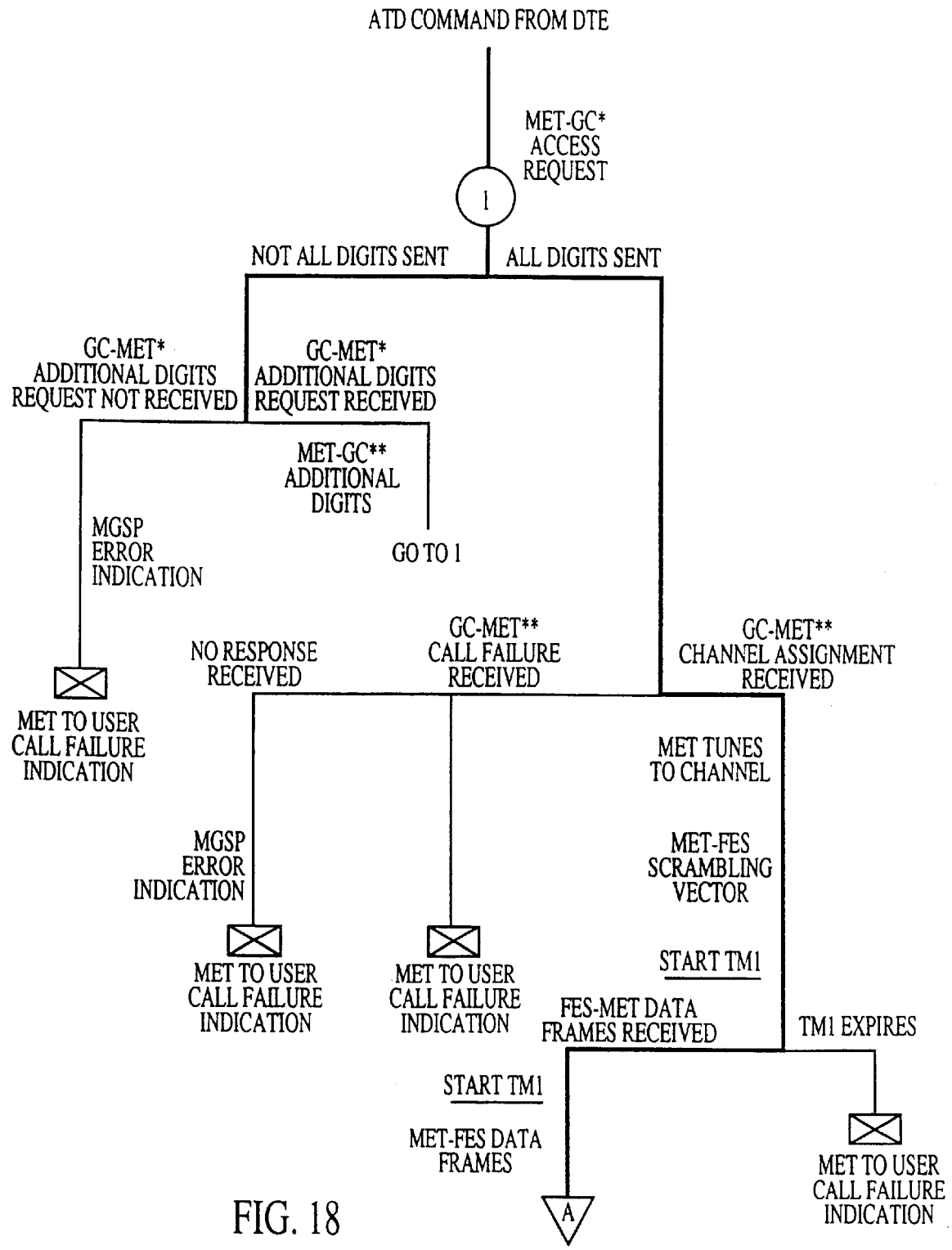
FIGS. 18–19 are event tree diagrams of a call setup sequence between the MET and a PSTN.
Figure 19:
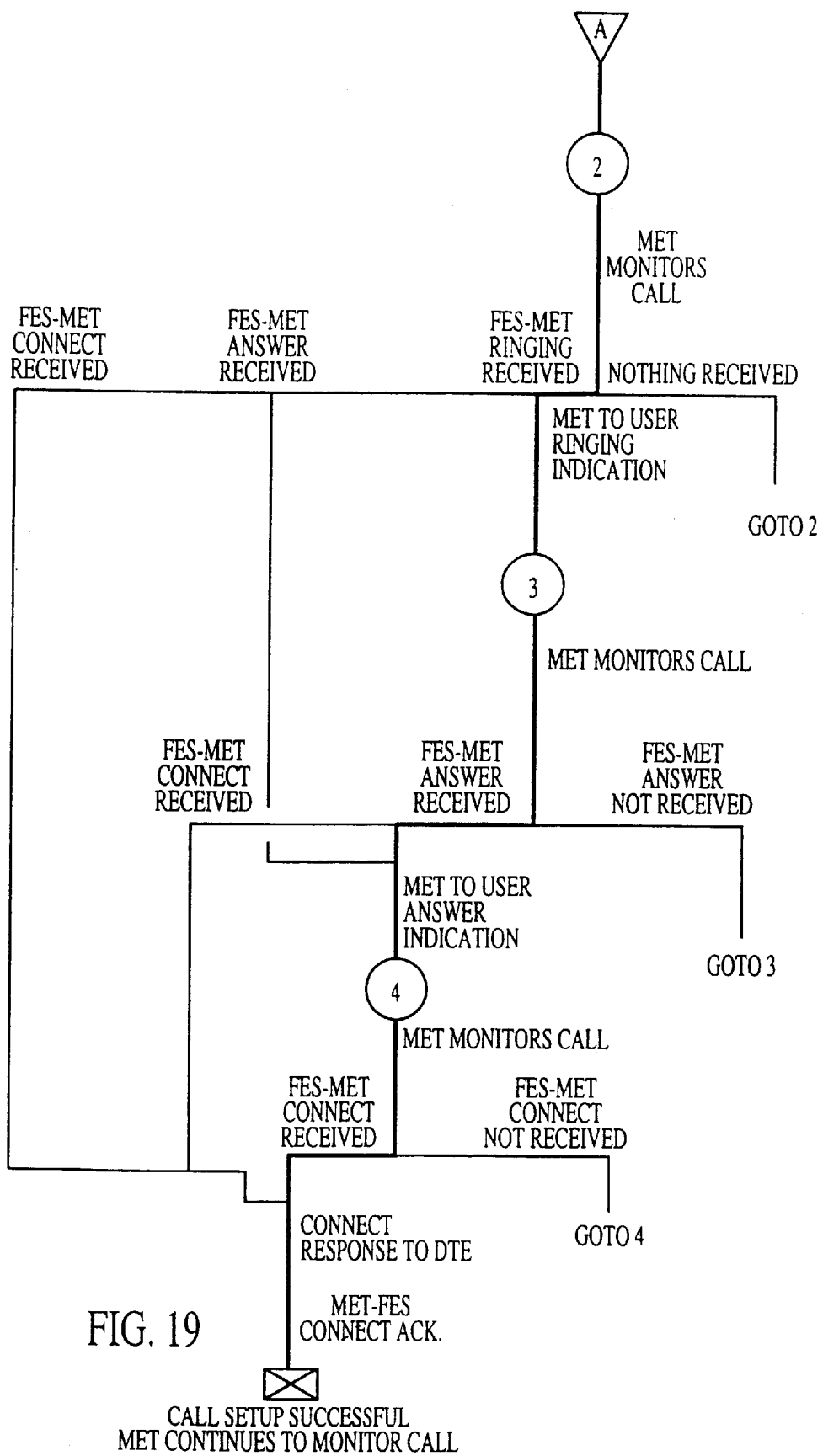

The AT command set is a set of commands commonly used for exchange of control information between DTEs and dial up modems. DTEs connected to the MET use a subset of the AT command set to send commands to the MET and receive responses from the MET. The message sequence shown in FIG. 17B is used to establish MET originated data calls. The protocol employed is specified in the event tree given in FIGS. 18–19. A data call is initiated by the transmission of an ATD command from the DTE to the MET. The ATD command contains the telephone number of the destination modem/DTE. The ATD command also contains the desired transmissions speed and the character format to be used.

The message type field of the access request SU indicates that the call is a data call. Upon reception of the MET channel assignment SU, the MET transmits a scrambling vector SU to the FES via the MET-C channel. This message is continuously repeated until data frames are received from the FES. If no response is received after 5 seconds the MET ceases transmission and signals call failure to the user. The scrambling vector SU contains the initial scrambling vector to be used by the FES on the FES-C channel, the access security check field generated by the MET, and the desired character format and line speed for the connection.

Upon successful reception of the scrambling vector SUs, the FES will compare the access security check fields received from the GC and the MET and initiate call release if the fields are not identical. If the access security check fields are identical, the FES will seize a circuit into the PSTN and initiate establishment of the terrestrial portion of the connection. The FES will also switch to data mode and begin transmitting data frames to the MET. Upon reception of the data frames from the FES the MET switches from the call setup frame mode to the data frame mode and continuously transmits data frames to the FES with NULL SUs in the in-band signaling frames until a "connect" SU is received from the FES. For 1200/2400 bps data calls, the MET and FES transmit null SUs in the SU field.

Upon receiving data frames from the MET, the FES will begin transmitting ringing SUs to the MET in the in-band signaling field of the data frames. Upon detection of the PSTN going off-hook, the FES will stop sending ringing SUs and will begin transmitting answer SUs to the MET in the in-band signaling field of the data frames. Upon completion of the handshake and bit rate selection procedures between the FES terrestrial modem and the PSTN user modem, the FES will stop transmitting answer SUs and will begin transmitting "Connect" SUs to the MET. Upon receiving a "connect" SU from the FES, the MET continuously transmits "Connect Acknowledgment" SUs. Upon receiving a "Connect Acknowledgment" SU from the MET, the FES will cease transmitting connect SUs to the MET.

Figure 20:
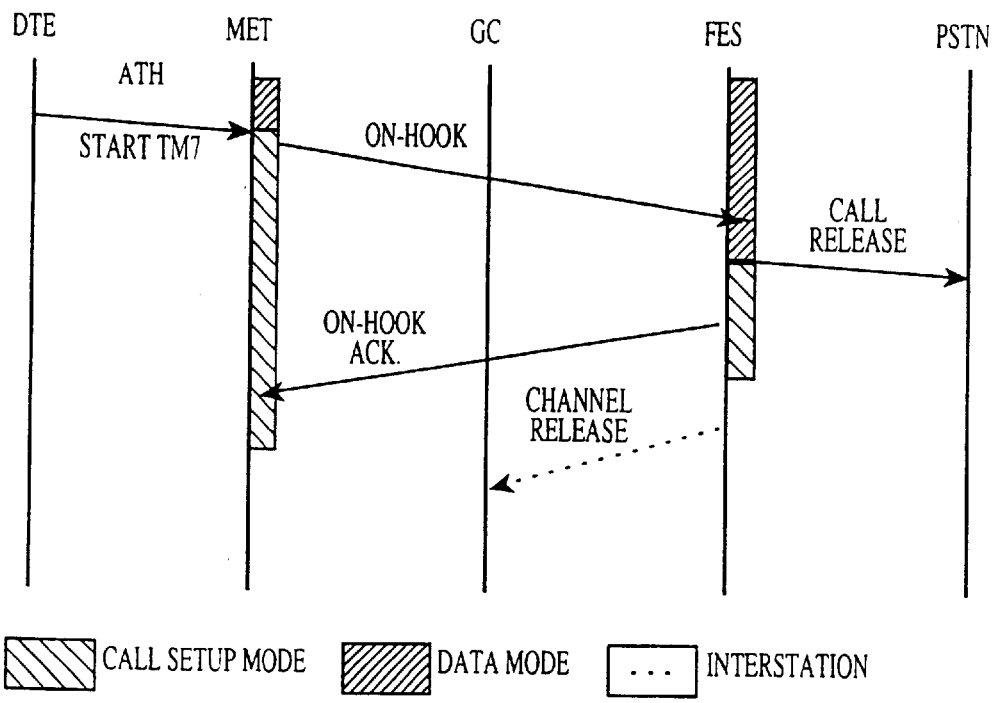
FIG. 20 is a diagram of a call release sequence initiated by the MET.
Figure 21:
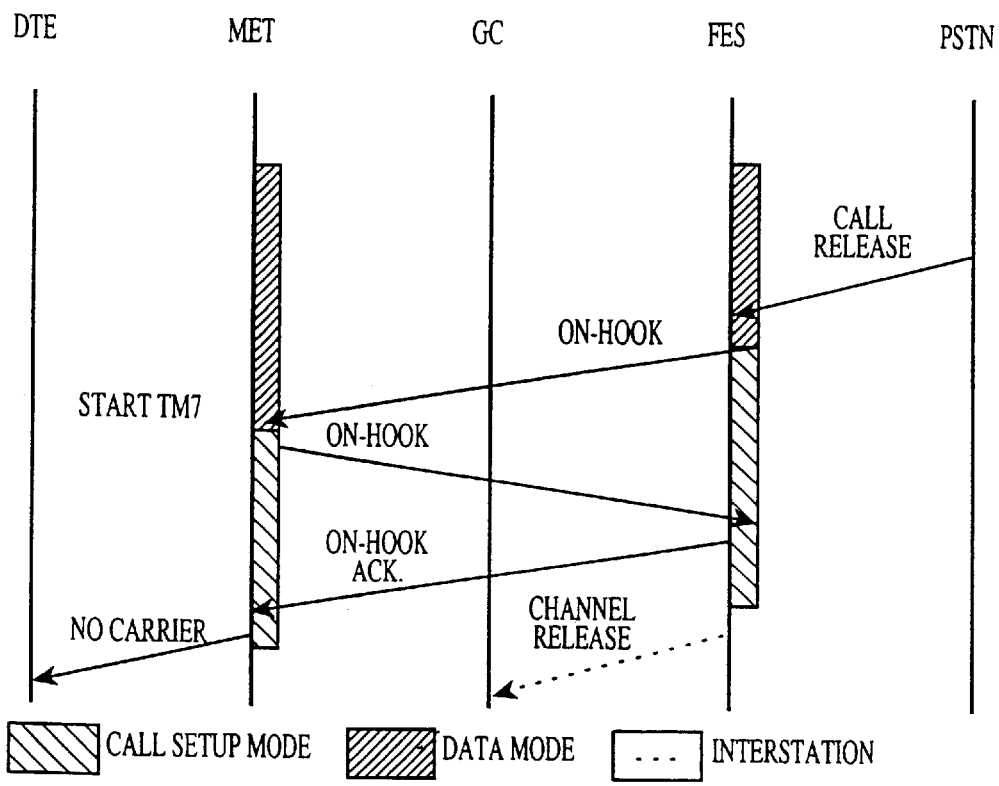
FIG. 21 is a diagram of a call release sequence initiated by the PSTN.

For data calls the DTE must be involved in the call release procedure. In all other respects the call release procedures for both MET and PSTN initiated data call release is the same as those specified for MET initiated calls. MET originated call release occurs when the DTE issues an ATH command to the MET. When PSTN initiated call release occurs the MET issues a NO CARRIER indication to the DTE. The sequences for MET and PSTN initiated data call release are shown in FIGS. 20–21. The MET continuously transmits "On Hook" SUs until it receives an "On-Hook Acknowledgment" SU or until timers TM5 or TM7 expire.

The data field portion of the data call is used to transport asynchronous data characters. Each data character byte shall consist of either a 7-bit data character representation with a parity bit or an 8-bit character representation. All data characters are transmitted least significant bit first. If a 7-bit data character representation with a parity bits used, the least significant bit shall contain the parity bit. If a 7-bit data character representation without a variety bits used, the least significant bit contains a 0 bit. Valid data characters are transported in the first L data character bytes of the frame, where L is the value of the length parameter contained in the length indicator bytes. All other data character bytes preferably contain a 10101010 pattern.

Figure 22:
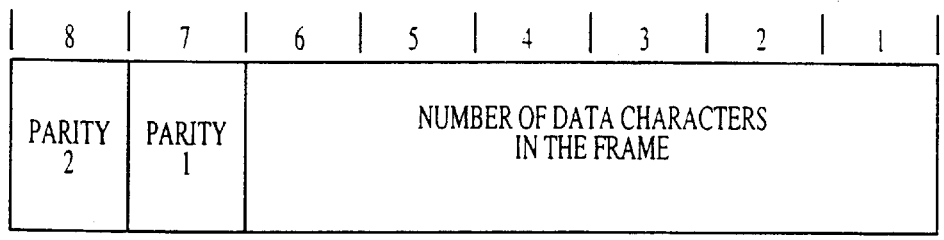
FIG. 22 is a diagram of a data field format.

The format of the length indicator bytes shall be as shown in FIG. 22. The length indicator bytes each contain a 6 bit length parameter that indicates the number of valid data character in the total frame. In addition the length indicator byte contains 2 parity bits used for error detection. The order of transmission of the bits in the length indicator byte is as indicated in FIG. 22.

Figure 23:
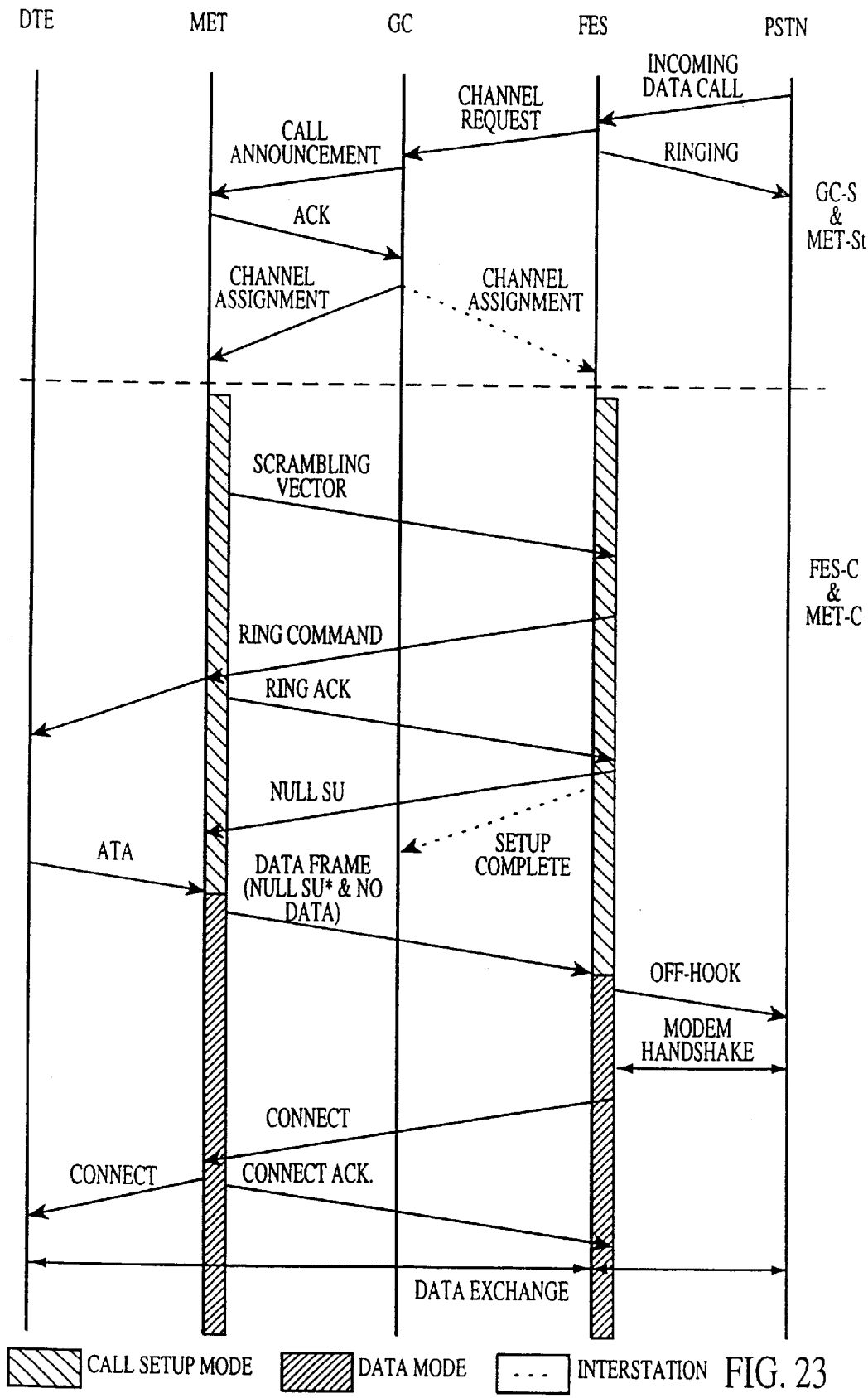
FIG. 23 is a diagram of a call setup sequence between the PSTN and MET.
Figure 24:
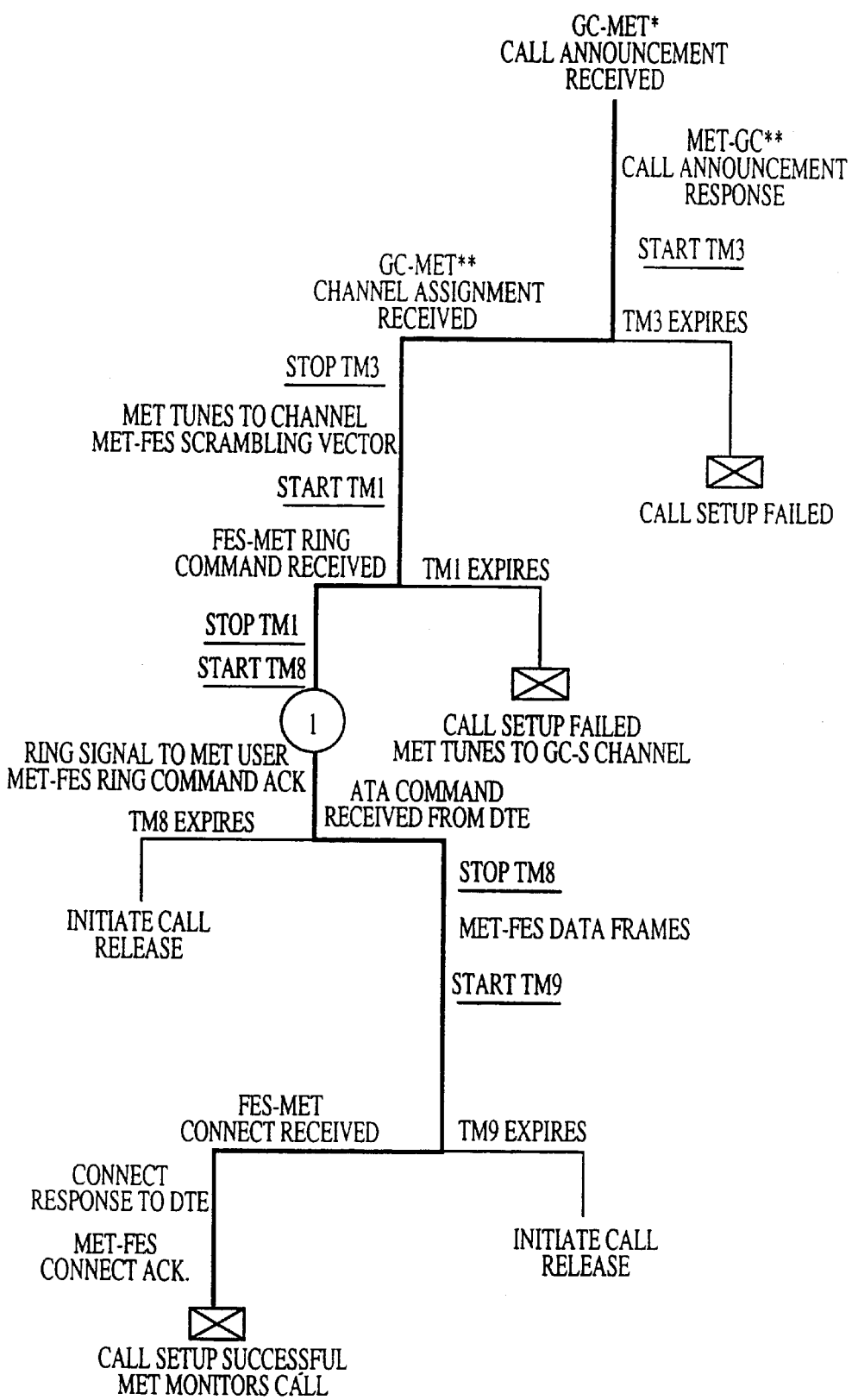
FIG. 24 is an event tree diagram of a call setup sequence between the PSTN and MET.

For PSTN-originated data calls, channel-assignment is as specified for PSTN originated voice calls. The GC will determine that the call is a data call and will indicate this in the call type field of the call announcement and MET channel assignment. FIG. 23 shows a call setup sequence between the PSTN and MET. FIG. 24 illustrates by way of an event tree a call setup sequence between the PSTN and MET.

Upon reception of the MET channel assignment SU the MET transmits a scrambling vector SU to the FES via the MET-C channel. This message is continuously repeated until a response is received from the FES. If no response is received after 5 seconds the MET ceases transmission and signals call failure to the user. Upon successful reception of the scrambling vector SUs, the FES will compare the access security check fields received from the GC and the MET and will initiate call release if the fields are not identical. If the access security check fields are identical, the FES will begin transmitting the ring command SU to the MET. Upon reception of the ring command SU from the FES, the MET signals the MET user either by generating an audible ringing sound or by sending a RING response to the DTE, sets Tm8 to 12 seconds and also transmits the ring command acknowledgment SU until the ATA command is issued by the MET DTE, or upon expiration of timer Tm8. Upon receiving the ring command acknowledgment from the MET, the FES will transmit a call setup complete SU to the GC to notify it that the channel has successfully been established, and will begin transmitting null signal units to the MET. If timer TM8 expires, the MET initiates a call release.

When the MET DTE issues the ATA command the MET switches to the data frame mode, stop Tm8, and set timer Tm9 to 20 seconds. Upon detection of the MET switching to data frame mode, the FES will switch to data frame mode and will signal off-hook to the PSTN. The FES will then complete the modem bit rate selection and handshake procedures with the PSTN user modem based on CCITT Recommendation V.22bis. Upon completion of the modem bit rate selection and handshake procedures, the FES will begin continuously transmitting a connect SU to the MET. The FES continues sending the connect SU until a connect acknowledge SU is received from the MET. Upon receiving the connect acknowledge SU, the FES ceases transmitting connect SUs.

Upon receiving the connect SU from the FES, the MET stops timer Tm9 and sends the connect acknowledge SU to the FES. The MET ceases transmitting connect acknowledgement SUs within 2 seconds of the time at which receipt of connect SUs ceases. If timer Tm9 expires, the MET initiates a call release.

MET Facsimile Call

Figure 25:
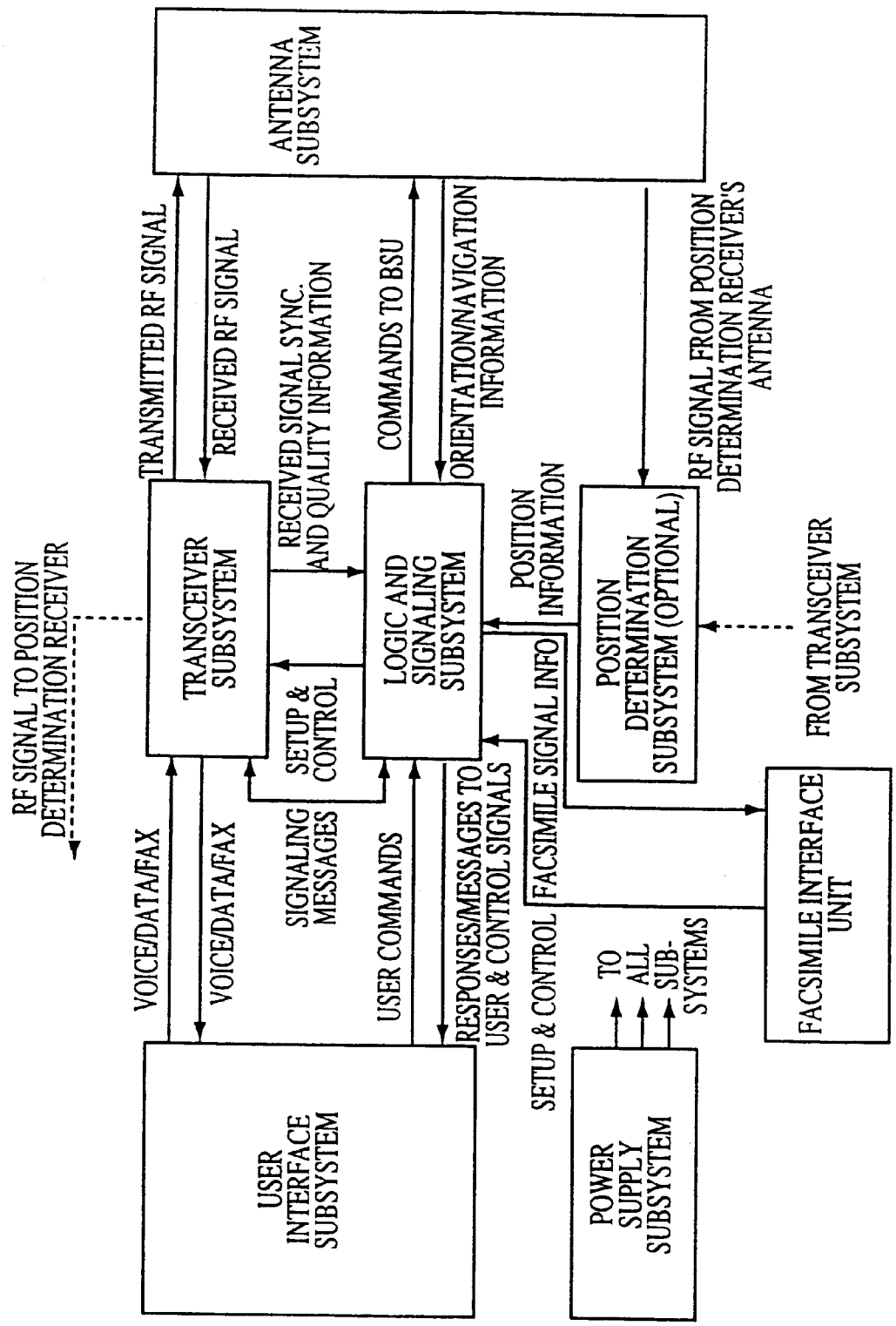
FIG. 25 is a basic block diagram of the functions of the mobile earth terminal including the facsimile interface unit functions.

FIG. 25 is a basic block diagram of the functions of the mobile earth terminal including the facsimile interface unit functions. Facsimile interface units (FIU) are installed in the Feeder Link Earth Stations (FES) and in the MET which communicate with each other by a digital communications channel established in the facsimile data mode. These units enable a terrestrial user's CCITT Group 3 facsimile terminal equipment (FTE) to be interconnected with a MET user's CCITT Group 3 FTE (or between two MET users) via the digital satellite system.

The FIUs perform two basic functions. First, they demodulate the facsimile voiceband signals in the FTE-to-satellite direction (and remodulate the baseband digital signals in the satellite-to-FTE direction). Second, they perform protocol conversions so that the facsimile protocols become compatible with the transport channel constrains of the basic service configuration. To perform these functions, the FIUs consist of several standard elements including Telephone Tone Generators and Detectors; a CCITT V.21 Modulator and Demodulator; and Control Logic for baseband message formatting, facsimile process control, facsimile protocol conversation, call establishment, call control, and call clearing.

The physical interface is preferably characterized using an RJ-11 connector, a 600 ohms signal impedance, a Line Supervision (Detection of Off-Hook and On-Hook), a Minus 24 volt, 30 ma nominal DC source for loop (supervisory) current. The interface preferably provides ringing voltage of 86 Vrms and support up to 5 ring loads, or provides a source over the linear range from 64 Vrms at 50 ms down to a minimum of 40 Vrms at 100 ma. The required generated signaling tones are:

| Congestion | [480 + 620 Hz (0.25 sec's on and 0.25 sec's off)] |
| Busy | [480 + 620 Hz (0.5 sec's on and 0.5 sec's off)] |
| Ring-back | [440 + 480 Hz (1 sec on and 1 sec off)] |
| Dial | [Reference CCITT E.180:350 + 440 Hz (continuous) −10 Dbm0 nominally] |

Figure 26:
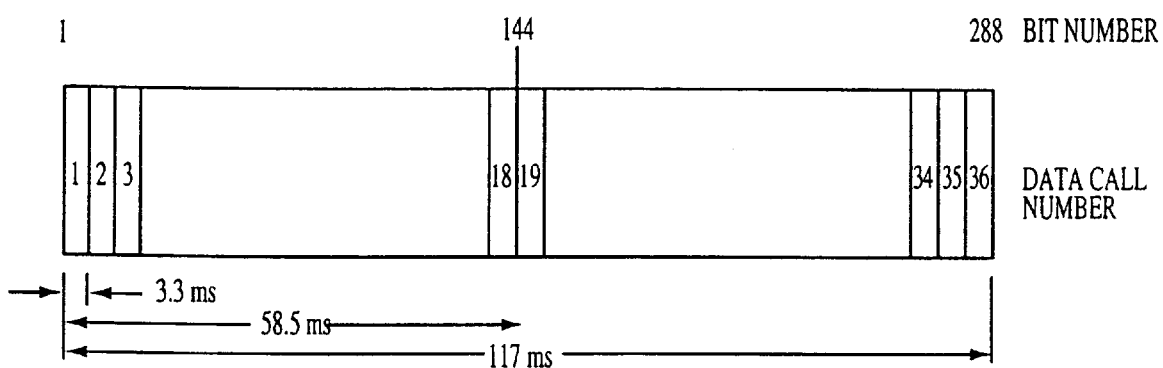
FIG. 26 is a diagram of a data field format at 2400 bit/s.

The FIUs transmit and receive digital signals to an from the satellite 2.4 kbit/ss Data channel in blocks of 288 bits as shown in FIG. 26, which illustrates the sub-field structure of the data channel. In addition, the FIU internally partitions each of the 288-bit data-field into 36, 8-bit data cells. The Digital Facsimile Protocol provides line-state indication by means of the following messages, carried as "line control packets", which are transmitted at full rate (i.e., 2.4 kbit/s) over the data channel. The coding is described below:

| Code | Line state |
| --- | --- |
| 0001 | Idle |
| 0010 | CED Connection |
| 0100 | Spare |
| 0111 | Binary Coded Signal Connection |
| 1000 | FIU Capabilities Control Packet |
| 1011 | Synchronizing Signal Connection |
| 1101 | Preamble Connection |
| 1110 | Message Connection |

The coding is associated with the voiceband signal states as shown below:

| Indication | Line State |
|---|---|
| Idle | No signal on the telephone circuit |
| CED Connection | 2100 Hz Called Station Identification (CED) signal on the telephone circuit |
| Binary Coded Sig. Connection | 300 bit/s (non-permeable) binary coded procedural signal on the telephone circuit |
| Synch. Signal Connection | Modem synchronizing (or training signal on telephone circuit) |
| Preamble Connection | 300 bit/s binary coded preamble signal on the telephone circuit |
| Message Connection | Facsimile message on the telephone circuit |

The special line state "FIU Capabilities Control Packet" is not associated with an analog line state but with in-band signaling between FIUs.

Line control packets are generated whenever a line state transition occurs, and generally always precede the transmission of information (associated with the new line state) over the digital channel. The indication in the line control packet applies to all associated 8-bit data cells of the satellite channel that immediately follow it until a new line control packet is generated. Hence, these line control packets are used as headers of new information. All non-preamble signals of the 300 bit/s is binary coded procedural signaling, which are specified in CCITT Recommendation T.30, are transferred to the re-modulating (distant) FIU in the form of a demodulated baseband digital data stream. A re-modulating (or modulating) FIU is defined as the FIU which is receiving data from the satellite channel for modulation and transmission to the customer FTE. A demodulating FIU is defined as the FIU which is receiving data from the customer FTE for demodulation and transmission to the satellite channel. During a call, an FIU will perform both modulating and demodulating functions, as the signal direction between the end-customer FTEs will change several times.

The facsimile message signal (including the TCF signal) is also transferred to the re-modulating FIU in the form of a demodulated digital data stream. Reception of the modem synchronizing signal on the telephone circuit is indicated by the demodulating FIU to the re-modulating FTU by transmitting the "Synchronizing Signal Connection" line control packet. The FIU at the modulating end generates a modem synchronizing signal according to this indication. Detection of the CED signal on the telephone circuit is indicated by the demodulating FIU to the re-modulating FIU by transmitting the "CED Connection" line control packet. (The actual CED signal cannot be transferred to the re-modulating FIU since it is not digital by nature.)

The tonal signaling procedures defined in CCITT Recommendation T.30 are not generally accommodated by the Digital Facsimile Protocol. The Group 3 procedures recommended by CCITT are generally supported by the FIU. Therefore, the FIU is not required to detect the use of tonal signaling procedures. Eventually a Group 1 or Group 2 FTE should clear the call on the analog circuit when it does not receive proper responses from the FIU.

Line control packets are generated whenever a line state transition occurs, and generally always precede the transmission of information (associated with the new line state) over the digital channel. Because these packets are transmitted in-band over the 2.4 kbit/s data channel, they are generated by the demodulating FIU in the FTE-to-satellite direction and removed by the remodulating FIU in the satellite-to-FTE direction. The first bit of the line control packet must be coincident with a data cell boundary. When generating line control packets these are constructed by utilization of 18 data calls as follows:

The first 9 data calls (72 bits) are comprised of nine repetitions of the "11111111" binary octet and are used as a line control preamble to indicated that the following 9 data cells contain line state transition information. The next 8 data cells (64 bits) are comprised of 16 repetitions of the appropriate 4-bit code for the new line state. The final data cell (8 bits) comprises the unique binary word "11000011" which is used to precisely align the user data associated with the new line state. The new line state indicated by a received line control packet does not become effective until the last bit of the line control packet has been received on the satellite channel. Consequently, since line control packets are 18 data cells long, a line control packet inserted into the satellite data stream effectively adds 60 ms to the length of the previous line state.

This is true for receipt of all line control packets except an "Idle" packet when it has been preceded by either a "Binary Coded Signal Connection" packet or a "Message Connection" packet. In either of those two cases, the "Idle" line control packet must be immediately processed (removed from the satellite data stream) when the first, rather than the last bit of the packet is received, thus avoiding a situation where 60 ms of invalid data would be modulated at either the V.21 or V.27ter mode. To accomplish this "early line control packet detection," the FIU must incorporate a look-ahead buffer between the satellite channel and the FIU software in which it can look ahead 60 ms into the received satellite data stream and identify a valid "Idle" line control packet while in the "Binary Coded Signal Connection" or "Message Connection" line state.

Since, in the special situations, the "Idle" line control packet is removed all at once (instead of removing it over the course of 18 data cell times), the look-ahead buffer will shrink in size as "Idle" line control packets are detected and removed. When the FIU switches from its "modulating" role to its "demodulating" role, the look-ahead buffer may be empty due to the removal of "Idle" line control packets. The buffer must already be filled with satellite data by the time an FIU switches from the "demodulating" role to the "modulating" role. This filling can take place when the FIU is likely to be receiving idle fill over the satellite when it is in the "demodulating" role.

Furthermore, the look-ahead buffer must accommodate two line control packets since, at most, there will be two transitions from "Binary Coded Signal Connection" or "Message Connection" line state to "Idle" line state during a single line turnaround of the half-duplex T.30 facsimile protocol. That is, the buffer must be about 288 bits in size. This will add, at most, 120 ms to the overall delay through the FIU.

The facsimile interface unit (FIU) interworks with a user's CCITT Group 3 facsimile terminal equipment (FTE) through a telephone circuits in accordance with CCITT Recommendation T.30, and with the FIU at the distant end through the satellite channel in accordance with the Digital Facsimile Protocol. To accomplish this, the FIU shall comprise the following standard circuit elements:

CCITT Recommend. V.27 ter [R-27] voice-band data modem;

CCITT Recommendation V.21 [R-28] voice-band data modem;

2100 Hz tone generator and detractor;

1100 Hz interrupted tone generator and detector;

processor/controller; and elastic buffer, multiplexer/demultiplexer, and interface with the satellite channel unit.

After the FIUs have been switched-in by the FES or the MET in a remote-originated mode (FTE at the opposite FIU has originated the call), the FIU generates the CNG signal (a 1100 Hz interrupted tone) and transmits it to the called user. The CNG signal is terminated following the detection of either the CED signal or a 300 bit/s binary coded procedural signal on the incoming telephone circuit in accordance with the procedures defined in CCITT Recommendation V.25 [R-29]. The characteristics of the CNG signal comply with the relevant requirements specified in CCITT Recommendation T.30.

The called FTE may transmit the CED signal following the connection of the telephone circuit at the called end. The called FIU shall detect the onset and termination of the CED signal on the telephone circuit and shall inform the calling FIU of this e vent by inserting the "CED Connection" line control packet in the satellite channel. The CED signal detector response threshold and times shall be in accordance to CCITT Recommendations T.4, T.30, and V.25 [R.29]. The insertion of the "CED Connection" line control packet in the data channel occurs in the first data-cell to be transmitted after the CED detector output has changed from OFF to ON.

The "CED Connection" line state is changed to "Idle" by transmissions of the "Idle" line control packet in the data channel as soon as the ON-to-OFF transition of the CED signal is detected and a data-cell boundary becomes available, but subject to the restriction that a "Idle" signal gap of 75±20 ms must be inserted (i.e. 22±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). It is the responsibility of the FIU to be aware of the (possibly different) on-to-off and off-to-on signal detect times for CED and V.21 Preamble and adjust the generated satellite line control packets accordingly so as to insure a 75±20 ms idle time between different signals.

The called FTE transmits the CED signal following the connection of the telephone circuit at the called end. The called FIU detects the onset and termination of the CED signal on the telephone circuit and informs the calling FIU of this event by inserting the "CED Connection" line control packet in the satellite channel.

The CED signal detector response threshold and times are in accordance to CCITT Recommendations T.4, T.30, and V.25 [R-29]. The insertion of the "CED Connection" line control packet in the data channel occurs in the first data-cell to be transmitted after the CED detector output has changed from OFF to ON.

The ICED Connection" line state shall be changed to "Idle" by transmission of the "Idle" line control packet in the data channel as soon as the ON-to-OFF transition of the CED signal is detected and a data-cell boundary becomes available, but subject to the restriction that a "Idle" signal g ap of 75±20 ms must be inserted (i.e. 22±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). The FIU detects the (possibly different) on-to-off and off-to-on signal detect times for CED and V.21 Preamble and adjusts the generated satellite line control packets accordingly so as to insure a 75±20 ms idle time between different signals.

A CED signal is generated by the called FTE after the telephone circuit has been connected between the called FIU and the called FTE. The onset and termination of the CED signal on the telephone circuit are detected by the called (demodulating) FIU and signaled to the calling (re-modulating) FIU by means of line control packets. The calling FIU shall generate a CED signal (2100 Hz tone) and shall transmit it to the calling FTE when the line control packet indicates "CED Connection". The OFF-to-ON instruction to the tone generator shall occur only after the entire "CED Connection" line control packet has been received.

The ON-to-OFF instruction to the tone generator occurs when a new line control packet has been detected by the called FIU. Ideally, the "Idle" line control packet will be received following the "CED Connection" packet, but errors on the satellite channel may corrupt the "Idle" packet so that the "Preamble Connection" packet may be the next one detected. The characteristics of the generated 2100 Hz tone shall comply with the relevant requirements for the CED signal specified in CCITT Recommendations T.30, T.4, and V.25.

The FIU receives and demodulates the binary coded procedural signals which are defined in CCITT Recommendation T.30 and which appear on the incoming telephone circuit. The binary coded procedural signals (except the TCF signal) are modulated at 300 bit/s in accordance with the CCITT Recommendation V.21 modulation system and are preceded by the preamble (sequence of repeated flags) specified in CCITT Recommendation T.30. The TCF signal is modulated at 2.4 kbit/s in accordance with CCITT Recommendation V.27 ter and is preceded by the modem synchronizing signal. The data is transmitted over the satellite channel in the same order as received over the telephone circuit (i.e., the first bit received over the telephone circuit by the demodulating FIU is the first bit to be sent over the satellite channel to the re-modulating FIU).

Figure 27:
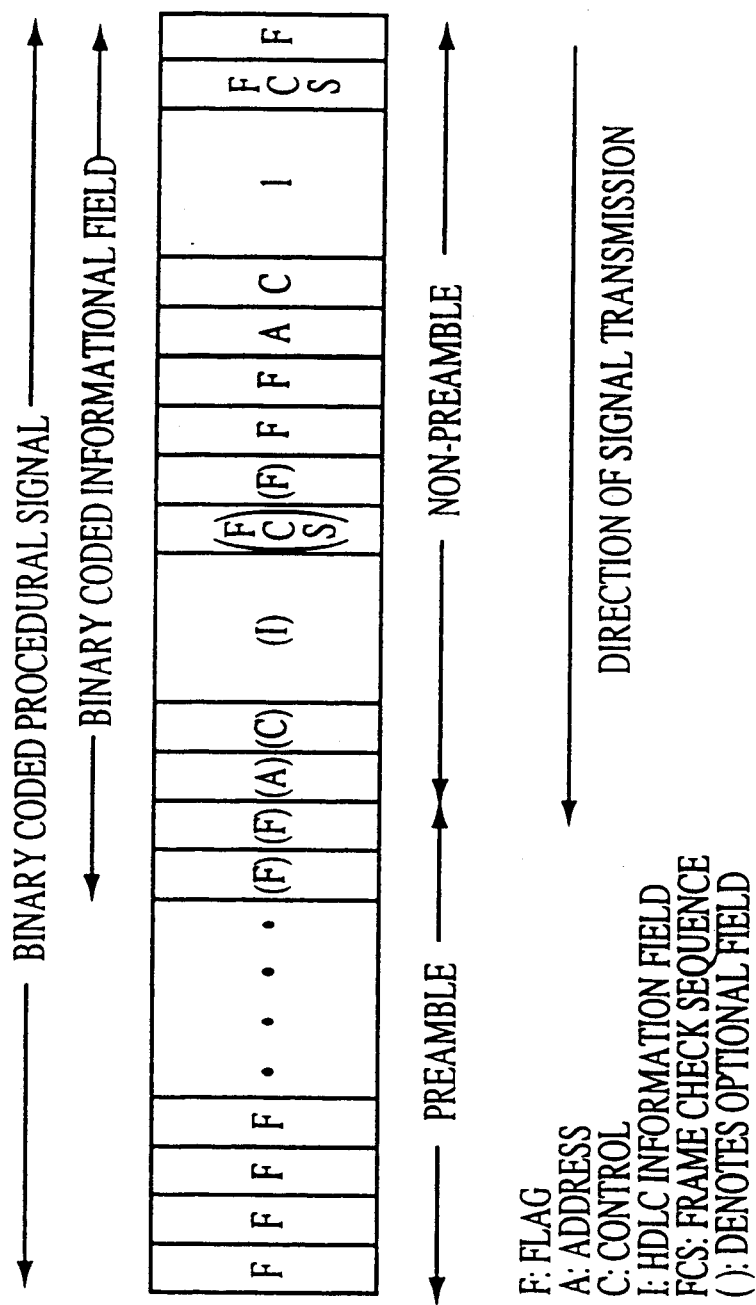
FIG. 27 is a diagram of a binary coded procedural signal.

The non-preamble portion of the V.21 modulated 300 bit/s binary coded procedural signal is defined as the portion of this signal which begins with the first non-Flag octet and ends with the last Flag received after the last HDLC frame. The preamble portion of the 300 bit/s binary coded procedural signal is defined as the portion of the V.21 modulated signal which begins with the first Flag and ends with the last Flag preceding the non-preamble portion (i.e. ends with the Flag preceding the first non-Flag octet of the binary coded information field). This definition is illustrated in FIG. 27.

The demodulated data stream of the non-preamble portion of the 300 bit/s binary coded procedural signal is transmitted to the re-modulating FIU regardless of the error state of the signal. The binary coded Address, Control, and HDLC information fields of the demodulated data (with the exception of the NEF, DIS, and DTC signals) are not generally manipulated by the demodulation process and the FCS field indicates an error condition, the regenerated FCS sequence must be such that it will result in an error condition being detected by the distant FTE, assuming subsequent error-free transmission. Transmission of the data shall be immediately preceded by the transmission of the "Binary Coded Signal Connection" line control packet.

When the demodulating FIU manipulates the DIS, DTC and DCS signals in the manner described in the preceding paragraphs, a new Frame Checking Sequence (FCS) must be computed. However, if the original (prior to manipulation) signal indicates an FCS error, the sequence computed must be such that it will result in an error condition being detected by the distant FTE assuming subsequent error-free transmission. The demodulated, non-preamble data stream of the 300 bit/s signal is transmitted to the re-modulating FIU over the satellite channel, preceded by the "Binary Coded Sequence Connection" line control packet. The line control packet is delayed by the same amount as that introduced in the preamble in paragraph 10 above and is further aligned to make the first bit of the line control packet coincident with the first bit of a data cell. When reception of the 300 bit/s signal ceases, an "Idle" line control packet shall be inserted in the satellite channel starting at the next available data cell. The response time for the Synchronizing/TCF signal detection is in accordance to CCITT Recommendations T.4, and V.27ter.

The onset of the synchronizing portion of the synchronizing/TCF signal is signaled to the distant FIU by transmitting the "Synchronizing Signal Connection" line control packet. The transmission of the "Synchronizing Signal Connection" line control packet, signifying the transition from the "Idle" to the "Synchronizing Signal Connection" line state, occurs in the first data cell of the satellite data channel after a period of 75±20 ms of idle activity has been transmitted over the satellite channel following the end of the previous (DCS) signal which was originally encoded according to the V.21 modulation scheme. That is, there must be at least one data cell between the "Idle" line control packet and the subsequent "Synchronizing Signal Connection" line control packet (since transmission of the "Synchronizing Signal Connection" packet contributes 60 ms to the length of the "Idle" line state. The FIU detects the (possibly different) on-to-off and off-to-on signal detect times for V.27 ter and V.21 and adjusts the generated satellite line control packets accordingly so as to insure a 75±20 ms idle time between different signals.

When the line control packet indicate "Synchronizing Signal Connection", the data stream sent to the distant FIU includes a binary all "zero" sequence irrespective of the demodulated sequence. The "Synchronizing Signal Connection" line state continues until local V.27ter modem training is complete and the first bit of TCF data is demodulated by the local V.27ter modem. The signal activity detector does not detect Segment 2 of the V.27ter training sequence ("No transmitted energy") as the end of the modem Turn-On sequence. Thus, the Synchronizing Signal Connection line state will apply for at least 225 ms (regardless of the signal activity detector output state).

The demodulated and unscrambled TCF signal (originally a series of binary "zeros") is transmitted to the re-modulating FIU over the satellite channel, preceded by transmitting the "Message Connection" line control packet. To compensate for the possibility that the demodulating V.27ter modem interprets the end of the modem Turn-On sequence as TCF data, the FIU insures that the first 6 data cells (48 bits) of the TCF data transmitted over the satellite consist of binary "zeros", no matter what was actually demodulated by the V.27Terri modem. The "Message Connection" line control packet and subsequent TCF data is delayed by the same amount as that introduced to the "Synchronizing Signal Connection" line control packet defined in paragraph 17 above, and is further aligned to make the first bit of the line control packet coincident with the first bit of the data cell.

The end of the TCF signal is determined by the FIU, and the tail of the signal is discarded if the number of bits is insufficient to fill the data cell. An "Idle" line control packet shall then be transmitted to the distant FIU in the following data cell.

The re-modulating FIU receives the data stream for the 300 bit/s binary coded procedural signals or the TCF signals (preceded by the "Binary Coded Signal Connection" or "Message Connection" line control packet, respectively) which are transmitted over the satellite by the demodulating FIU. The re-modulating FIU generates the voice-band data signals for the non-preamble portions of the binary coded procedural signals based on the data stream and the relevant line control packet, and transmits them to the FTE on the outgoing telephone circuit. In generating the modulated signals, no manipulation of the data is performed by the re-modulating FIU. If a new Frame Checking Sequence (FCS) is regenerated, and the original signal indicates an FCS error, the sequence computed must be such that it will result in an error condition being detected by the FTE, assuming subsequent error-free transmission.

The modulation applied to the data which have been preceded by the "Binary Coded Signal Connection" line control packet are at 300 bit/s and in accordance with the CCITT Recommendation V.21 modulation system (as specified in CCITT Recommendation T.30). The entire data, after removal of the line control packet, are transmitted to the FTE. The transmission of the 300 bit/s modulated binary coded signal preamble commences immediately after reception of a valid "Preamble Connection" line control packet and continues for as long as no new line state transition in the form of a valid line control packet is received. The Demodulating FIU makes sure that there is at least a 75±20 ms gap between the "Preamble Connection" line state and the preceding line state. The re-modulating FIU must insure that the length of the "Idle" line state indicated on the satellite is correctly reproduced on the analog circuit. If, due to channel errors, the "Preamble Connection" line control packet was not preceded by an "Idle" packet, then the re-modulating FIU must insure that there is 75±20 ms of idle analog line state before the flag sequence begins.

The transmission of the non-preamble 300 bit/s modulated binary coded (non-preamble procedural signals is initiated following the recognition of a line state change from "Preamble Connection" to "Binary Coded Signal Connection" signaled by the reception of a valid "Binary Coded Signal Connection" line control packet from the satellite data channel. The transmission of the non-preamble portion of the 300 bit/s modulated binary coded procedural signals follow the termination of the preamble with no interruption of signal energy on the outgoing telephone circuit. Furthermore, in order to preserve the octet integrity of the preamble being transmitted the 300 bit/s modulated binary coded procedural signals may additionally be delayed by a period of up to 8 data cells.

The transmission of the non-preamble 300 bit/s modulated signals continues until a valid "Idle" line control packet is received from the satellite channel. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Binary Coded Signal Connection" analog line state. In generating the TCF signal, the modulation shall be in accordance with CCITT Recommendation V.27ter.

When the most recently received line control packet indicates "Synchronizing Signal Connection", a modem synchronizing signal (the long sequence with protection against talker echo as specified in CCITT Recommendation V.27 ter) shall be generated by the re-modulating FIU. Transmission of the modem synchronizing signal is initiated only after the line state change from "Idle" to "Synchronizing Signal Connection" has been detected by the reception of a valid "Synchronizing Signal Connection" line control packet. If the Synchronizing Signal has been preceded by a signal encoded according to the V.21 modulation scheme in the same direction of transmission(i.e. DCS), the demodulating FIU has made sure that the duration of the "Idle" line state between the last flag of the "DCS" message and the start of the "Synchronizing Signal Connection" line state is at least 75±20 ms. The re-modulating FIU must insure that the duration of this "Idle" line state is accurately reproduced on the analog circuit. If, due to channel errors, the "Synchronizing Signal Connection" line control packet was not preceded by an "Idle" packet, then the re-modulating FIU insures that there is 75±20 ms of idle analog line state before the flag sequence begins.

The synchronizing signal is followed, without an interruption of signal energy, by a signal modulated by the received TCF data (after removal of the "Message Connection" line control packet which will take an additional 60 ms). The received data is delayed as appropriate, to allow the first effective bit of data preceded by the "Message Connection" indication to coincide with the first bit which follows the synchronizing signal in the modulated signal. Ideally, the FIU will insure that data consisting of binary "zeros" is modulated in the event that v.27ter modem training completes before the "Message Connection" line control packet is received over the satellite. This situation could occur because of the tolerance allowed in V.27ter for the modem Turn-On sequence. Once the "Message Connection" line control packet is received, TCF data is modulated without modification by the FIU.

The TCF signal is almost immediately terminated upon reception of a valid "Idle" line control packet from the satellite channel. The FIU "looks ahead" in the received satellite data stream to identify the "Idle" line control packet as soon as its first bit has been received. The "Idle" line control packet, once so identified, will be almost immediately removed from the satellite data stream and will not contribute an additional 60 ms of time to the existing "Message Connection" analog line state.

The demodulating FIU receives and demodulates facsimile message signals modulated at 2400 bit/s using the CCITT Recommendation V.27 ter modulation system, as defined in CCITT Recommendation T.4. Each transmission of a message is preceded by the modem synchronizing signal specified in the CCITT V.27 ter. The onset of the synchronizing signal portion of the synchronizing facsimile message signal on the incoming telephone circuit is detected by the demodulating FIU and signaled to the re-modulating FIU by transmitting the "Synchronizing Signal Connection" line control packet over the satellite data channel in the first available data cell.

When CCITT V.27ter modem training has completed, the demodulating FIU inserts a "Message Connection" line control packet in the satellite data stream as soon as the first bit of valid demodulated data is available. Transmission of the demodulated data over the satellite is preferably in the same bit order as it was received on the analog circuit. The demodulated facsimile message is not generally manipulated in any way by the demodulating FIU. The tail of the facsimile message signal is detected by the demodulating FIU. The "Idle" line control packet is then transmitted to the re-modulating FIU. The "Idle" line control packet is transmitted to the re-modulating FIU in the data cell following the last bit of the last HDLC frame containing the last bit message data. If insufficient data is demodulated to fill a complete satellite data cell, it will be padded with binary "zeroes" in order reach a data cell boundary.

The re-modulating FIU receives the facsimile message data stream which is transmitted over the satellite channel by the demodulating FIU, preceded by a "Message Connection" line control packet. When the most recently received line control packet indicates "Synchronizing Signal Connection" the long modem synchronizing sequence with protection against talker echo specified in CCITT Recommendation V.27ter is generated by the re-modulating FIU. The re-modulating FIU generates a voice-band data signal for the facsimile message signal, based on the received data stream, and transmits it to the FTE using 2.5 kbit/s modulation in accordance with CCITT Recommendation V.27ter.

The synchronizing signal is followed, without an interruption of signal energy, by a signal modulated by the received data, which is introduced by the "Message Connection" line control packet. Modulation of this data may be delayed to allow the first bit of data to coincide with the first bit which follows the modem synchronizing signal. It may also happen that local modem V.27ter training takes less time than that experienced at the demodulating FIU, as indicated by the local V.27ter modem completing its synchronizing phase before the arrival of the "Message Connection" line control packet. In this case, the FIU insures that binary data consisting of all "ones" should be inserted in the modulated data stream as fill until the arrival of the "Message Connection" line control packet. Then, insertion of fill will cease and the relevant data cells received over the satellite will be modulated on the analog circuit starting with the next available bit position in the modulated data stream.

The Message signal is almost immediately terminated on completion of the last bit of data as indicated by receipt of the "Idle" line control packet. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Message Connection" analog line state.

The FIUs, in the course of performing the processing tasks (e.g. signal detection, elastic buffering, signal buffering, line control packet generation and "look ahead") may introduce additional delays along the signal path from one FTE to another. The total throughout delay introduced by each FIU is implementation dependent but must not be greater than 1 second end-to-end. That is, the sum of the delay through the originating FIU plus the delay through the destination FIU must not exceed this value in either direction of data flow. This figure includes delays associated with the modulator and demodulator, the FIU itself and the FIU-to-modem interface. It does not include satellite transmission delay or delay through the PSTN network.

Delays due to satellite transmission and PSTN transmission should not exceed 0.5 seconds. This may require the selection of low-delay PSTN connections at the FES. The total delay, therefore, between FTEs should not exceed 1.5 seconds in either direction of data flow.

When the FES detects that a facsimile call is in progress, it will "switch-in" the FES FIU and signal to it whether this is a fixed or mobile-originated call. When the FES FIU has been switched-in with a fixed-originated call, it may receive a CNG tone from the FTE but this is ignored. It may also eventually receive a V.21 message from the FTE containing a DCN frame in the event that the FTE times out while waiting for a message from the MET FTE. Primarily, the FES FIU will be awaiting a signal from the MET FTU. When the FES FIU has been switched-in with a mobile-originated call, it will start generating CNG tone on the analog circuit to the FTE. It will also be prepared to detect either CED tone or the onset of V.21 preamble. In either case, it will cease generation of the CNG tone as soon as either of these two signals has been detected.

The FES will "switch-out" the FES FIU when it detects that the satellite or PSTN call has cleared. The FIU will immediately cease operations both on the satellite and analog connections. Since there maybe significant buffering of satellite or analog data both inside and outside the FIU, the FES will delay implementing the switch-out operation until it is certain that all buffered data has been delivered to the appropriate channel (and thus to either the MET or the analog FTE).

When the MET detects that a facsimile call is in progress, it will "switch-in" the MET FIU and signal to it whether this is a fixed or mobile-originated call. When the MET FIU has been switched-in with a mobile-originated call, it may receive a CNG tone from the FTE but this is ignored. It may also eventually receive a V.212 message from the FTE containing a DCN frame in the event that the FTE times out while waiting for a message from the FES FTE. Primarily the MET FIU will be awaiting a signal from the FES FIU. When the MET FIU has been switched-in with a fixed-originated call, it will start generating CNG tone on the analog circuit to the FTE. It will also be prepared to detect either CED tone or the onset of V.21 preamble. In either case, it will cease generation of the CNG tone as soon as either of these two signals has been detected.

The GC and the NCC

Figure 28:
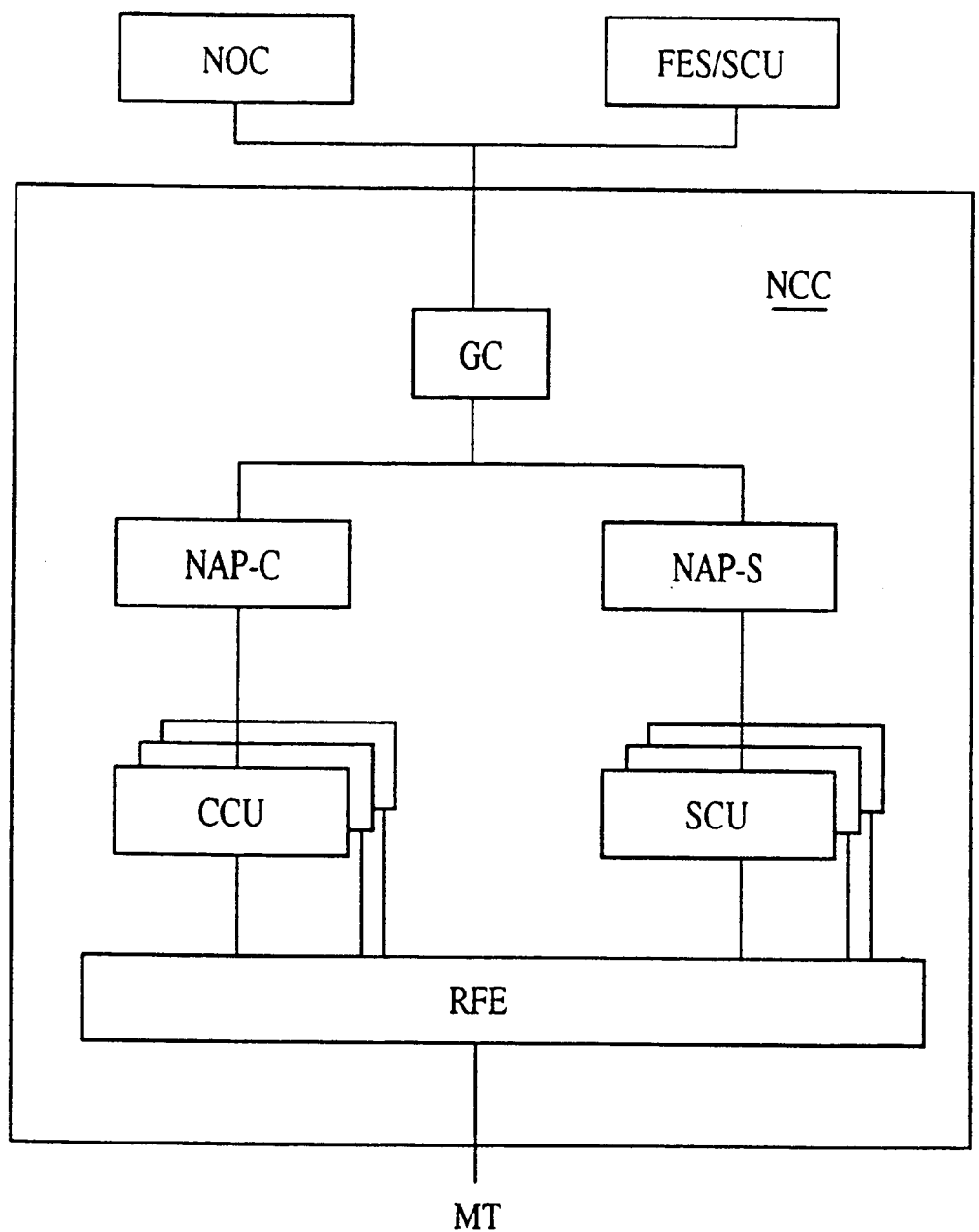
FIG. 28 is a basic block diagram of the basic components of the NCC showing the included GC.

FIG. 28 illustrates the Network Communications Center (NCC) and the elements contained therein. The Group Controller (GC) resides in the Network Communications Center (NCC) system element within the CGS and provides call control and satellite resource management for:

Circuit-switched voice, FAX, and data calls;
    Integrated Voice and Data MT (IVDM) voice calls;
    Satellite trunked radio calls.

It controls setup, monitoring, and cleardown of calls between MTs, IVDMs, Net Radio MTs, and terrestrial users. It also provides AMS(R)S Provisioning, Control Group Reconfiguration, MT and FES PVT and Commissioning support, and Performance and Status Monitoring.

The primary function of the GC is the management of customer Control Groups. Control Groups identify groups of MTs/IVDMs which have access to CGS, the satellite and network resources that have been allocated to them for sending/receiving calls, and the service permissions and calling restrictions that apply to each MT/IVDM. Control Groups also contain Virtual Networks (VNs), which define the routing options that apply to each MT or IVDM in the Control Group and Circuit Pools, which control the allocation of use of satellite circuits for circuit-switched calls.

Figure 29:
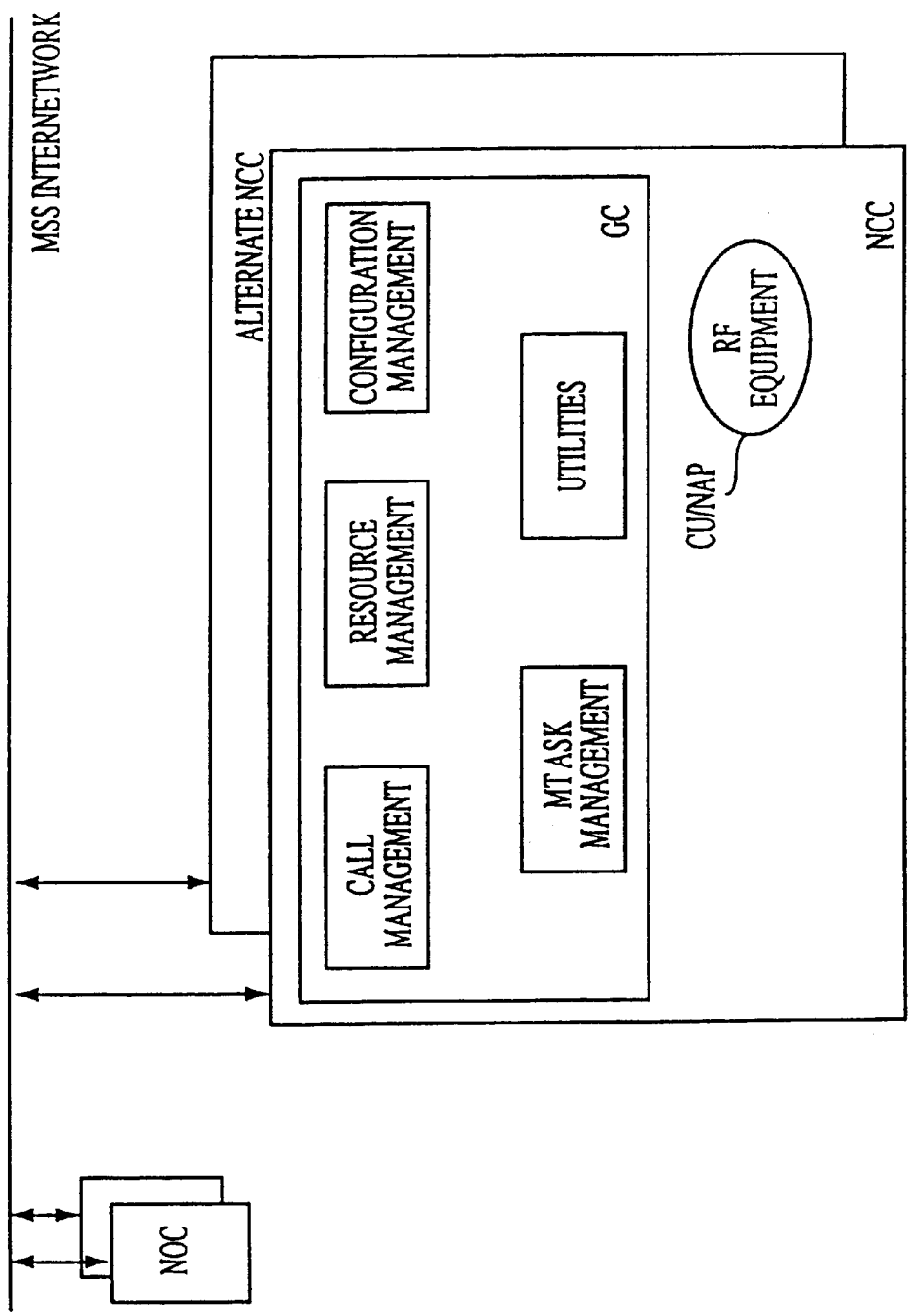
FIG. 29 is a diagram of the NCC logical architecture.

FIG. 29 illustrates the NCC logical architecture. The Group Controller consists of five top level components which perform the following functions:

1. Call Management
    This component performs:
        Call setup/monitoring for:
            a. MT-to-MT, MT-to-PSTN/PN, PSTN/PN-to-MT calls
            b. MT initiated NET Radio Calls
            c. Dispatch initiated Net Radio, Private Mode, Broadcast, and Priority 1 calls.
    MT Management, including:
        MT Logon, GC-S Change, MT Shutdown, and MT Parameter Update, Visitor Registration;
        Preemption of calls for AMS(R)S provisioning of satellite bandwidth and power.
    MT Commissioning and PVT.

2. Resource Management
    This component performs resource management and reconfiguration, including:
        allocation/deallocation of satellite resources during call setup/cleardown
        incremental/complete reconfiguration of local Control Group databases
        address screening
        MT authorization
        call routing
        Virtual Network configuration 3. Configuration Management
    This component performs executive control for:
        Control Group configurations;
        AMS(R)S requests 4. MT ASK Management
    This component performs:
        secure MT and NET ASK database management
        real-time check field generated for call processing
        ASK generation after completing commissioning/PVTs for Enhanced Fraud 5. Utilities
    This component is the common utility set for the GC including:
        MGSP
        Call Record Management
        Performance and Traffic Statistics generation
        Congestion Control
        Memory Management
        X.25 interface.

The NCC provides real time call processing for users of the CGS by assigning resources on a per call basis. The NCC operates under the administrative control of and is monitored by the NOC. The NCC manages access of users of the space resources allocated to the NCC by the NOC. The NCC provides system monitoring and testing functions to support FES and MT commissioning and periodic performance verification testing. A single NCC provides these functions for an entire network carrying the full traffic load. In the event that the NOC is not available, the NCC contains a backup operator interface capable of monitoring and controlling the ongoing provision of services to customers and which is capable of providing emergency AMS(R)S provisioning.

Figure 30:
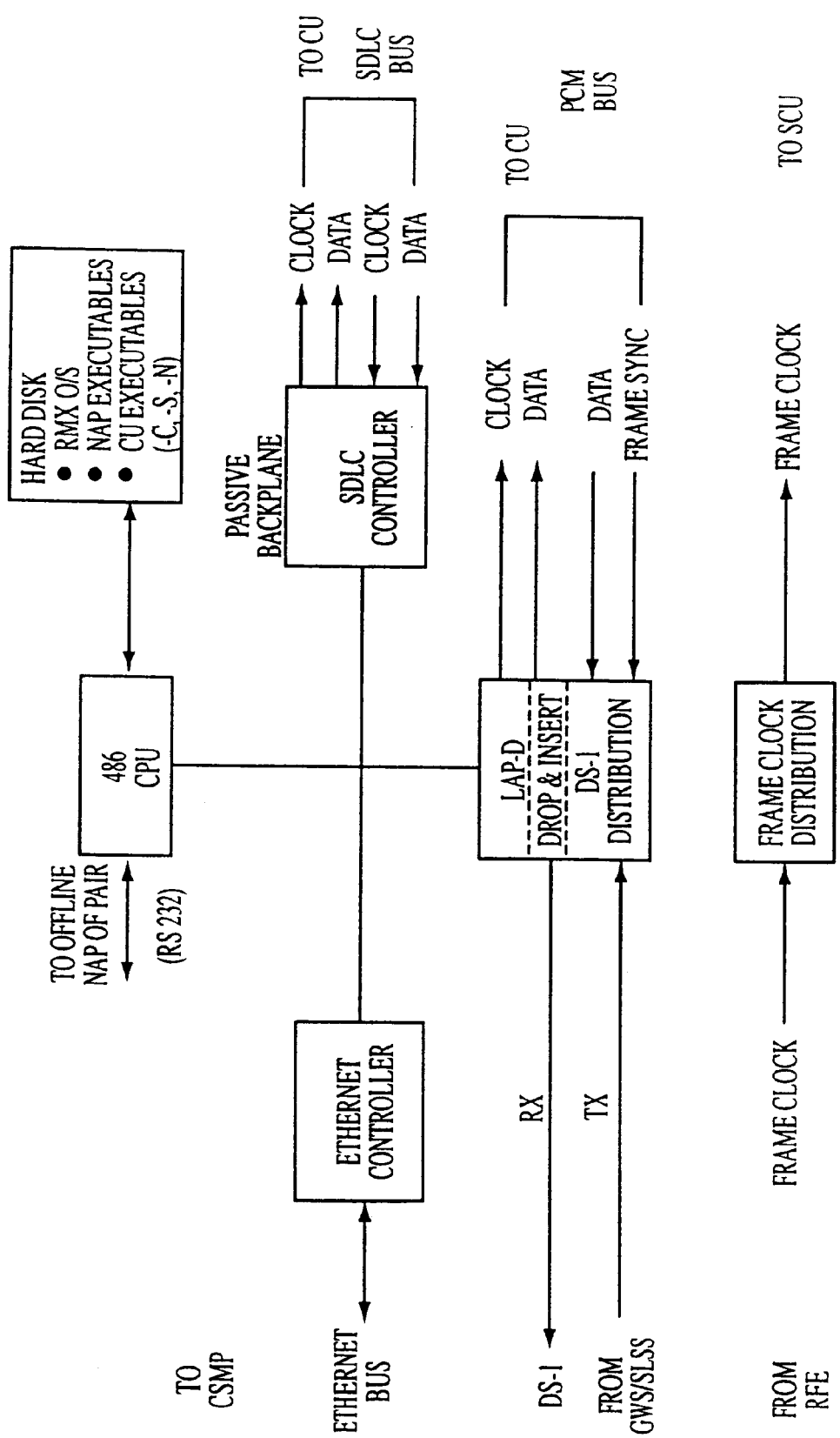
FIG. 30 is a basic block diagram of a circuit switched NAP.

Logically, the NCC is divided into two functional groupings, namely RFE and processing/management functions. Physically, the NCC is similarly divided into RFE and terminal equipment which performs the processing/management functions. The NCC terminal equipment is composed of an integrated set of hardware that is shared with the NOC and FES elements. From the NCC perspective, the hardware is composed of three sets of equipment which include the Circuit Switched Management Processor (CSMP), Network Access Processors (NAPs), and Channel Units (CUs). The NAP functions for the NCC consist of Network Access Processors for Signaling (NAP-S), Network Access Processors for Communications and Testing (NAP-C(Test)), and Bridges Modems for Interstation Signaling Channel Units. Both the NAP-S and NAP-C (Test) have channel units associated with them. The NAPs, Bridges and Channel Units together form the NAP-CU HWCI. There are two styles of NAPS, namely, the Circuit Switched NAP and the Data NAP. The Circuit Switched NAP performs the out-of-band signaling (NAP-S) functions or communications (NAP-C) functions. A block diagram of the circuit switched NAP is shown in FIG. 30.

Figure 31:
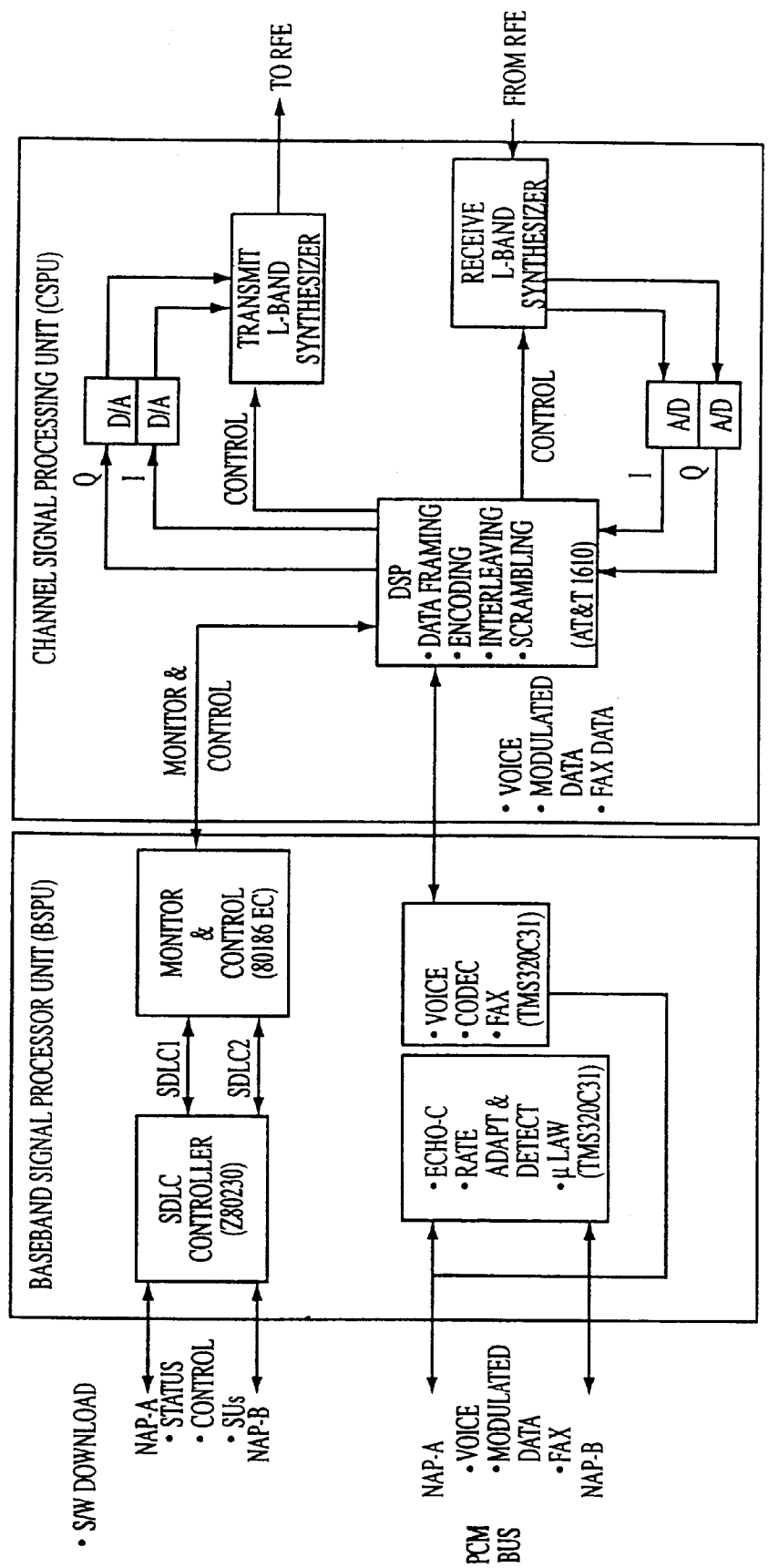
FIG. 31 is a block diagram showing the channel unit (CU) architecture.

The NAP is PC-based and contains a processor card, and SDLC card forming the interface with up to 24 channel units, an ethernet card providing the interface to ethernet B in the CSMP, and a distribution card. The distribution card provides a DS-1 interface between the gateway or base switch in the FES and the communications channel units, and a frame clock distribution function between the RF equipment and the out-of-band signaling channel units. NAPs are used in pairs for redundancy with an on-line and an off-line NAP or NAPs A & B. Each NAP monitors the condition of the other and takes over processing when a failure is detected or by operator (NOC or backup NCC) command via the system common software CSCI Site Manager function. The NAP-S and NAP-C connect to a channel unit of the same type which forms the interface to the RFE for signaling and. communications. The CUs are hardware identical and take on their operational personality (S or C) with a software download when they are initialized. A block diagram of the CU is shown in FIG. 31.

The CUs are composed of two major sections: the Baseband Signal Processor Unit (BSPU) and the Channel Signal Processing Unit (CSPU). The CU interfaces to the NAP are shown on the left and the interfaces to the RFE are shown on the right. The sub-element processor types are noted in the diagram.

The BSPU is composed of three major functions: the SDLC Controller (Z80235), Monitor & Control (80186EC) and the voice/modulated data processing (twin TMS320C31) The SDLC Controller provides the interface between the main and redundant NAPs. The Monitor & Control function provides the central control and status focus. This processor also supports the software downloads to a given CUs set of processor sub-elements. The pair of TMS32OC31 processors provide the functional processing for echo cancellation, rate adapting and detection, mu-law linear decompression, CODEC, voice, voice modulated data, FAX.

The CSPU is composed of a DSP, I/Q channel A/Ds & D/AS, L-Band transmit synthesizer and L-Band receive synthesizer. The major functions performed by the DSP include data framing, encoding/decoding, interleaving, scrambling/descrambling. The DSP operates on digital data from the receive synthesizer A/Ds and supplies digital data to the D/As for transmission via the transmit synthesizer. As noted earlier, there are up to 24 CUs controlled by a single NAP pair (i.e., main/redundant).

NCC Terminal Equipment Software

The NCC element is composed of a GC CSCI hosted on the CSMP, a NAP CSCI hosted on the NAP processor and the CU CSCI hosted on the set of CU processors as shown in FIG. 31. The NCC element also requires some portions of the SCS CSCI which is hosted on the CSMP. Both the NAP CSCI and the CU CSCI require a communications version and a signaling version of these SCS CSCIs. Both versions execute on the same physical H/W configuration type. The functions of the NCC element are implemented by a set of software processes as follows:

| CSCI | Process | Major Function |
|---|---|---|
| GC CSCI | Call | Call Processing |
| | Config | GC Database Configuration Management |
| | Monitor | Call record/statistics manager |
| | ASK Config | ASK Configuration Database manager |
| | Check Field | Check Field Generation |
| | GC Router | GC message router |
| | GC Router Config | GC router DB Configuration Manager |
| | Config Requester | Configuration access by call processing |
| | ASK Requester | ASK database access (AMSC only) |
| SCS CSCI | VAX, NAP message | Distribute NAP oriented messages |
| | VAX, VAX message | Distribute VAX to VAX messages |
| | Process Control | Monitors VAX processes |
| | Site Manager (NR) | Non-real time network management |
| | Site Manager (R) | Real time network management |
| NAP CSCI | BB-PDU | Bulletin board processing |
| | NAP-PM | Collect/report performance data |
| | NAP-I/O | Process I/O in and out of NAP |
| CU CSCI | CU-CM | Perform MT PVT & commissioning tests |
| | CU-SM | Perform signaling channel functions |
| | CU-LIB | Common CU support functions |

Figure 32:
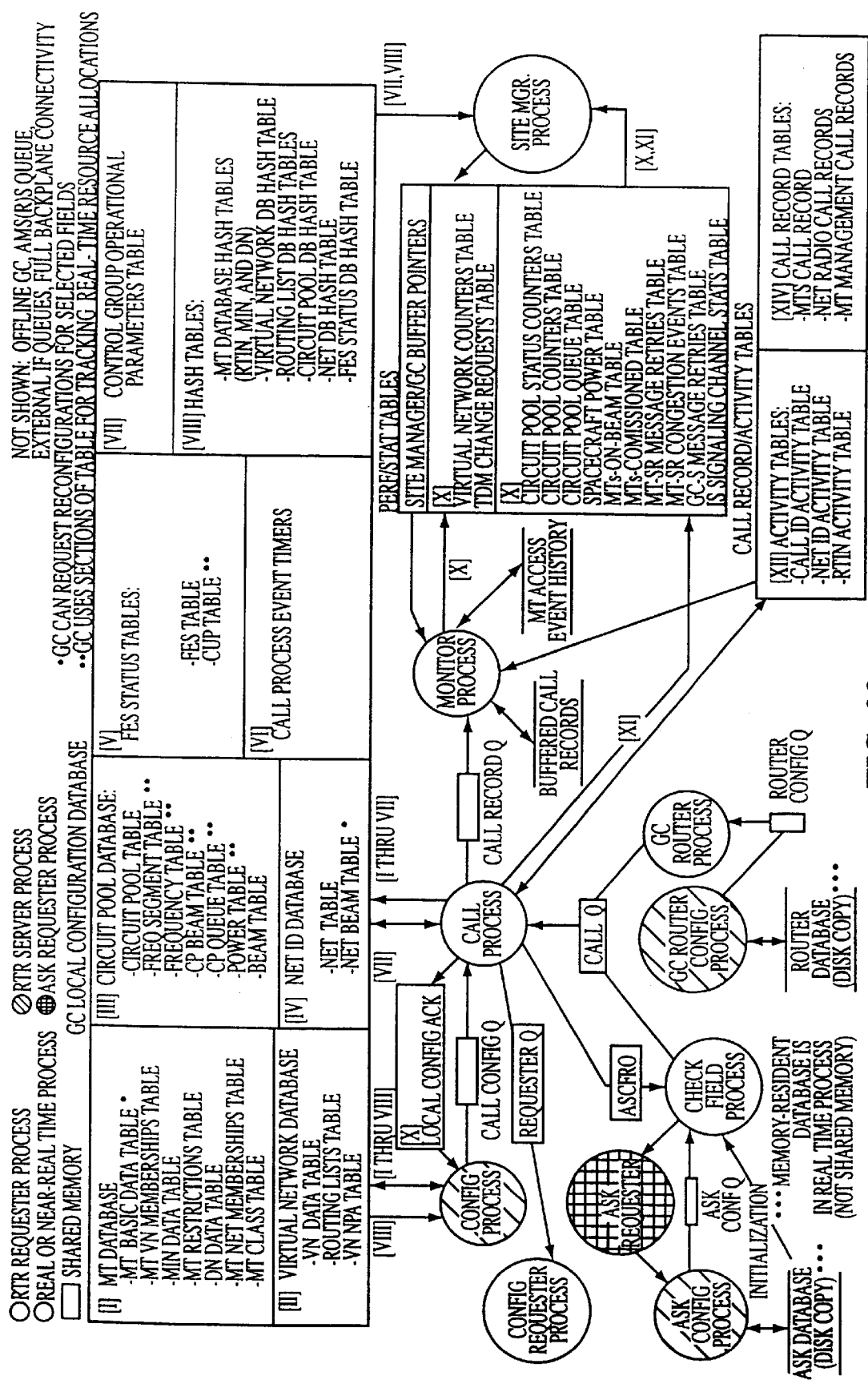
FIG. 32 is a diagram showing the GC CSCI architecture and the GC local configuration database with call monitoring and statistics.

The GC CSCI structure, interfaces, and design are illustrated in FIG. 32.

The SCS CSCI is primarily responsible for network management functions. Software and hardware objects are managed and status and events reported to the NOC.

The NAP CSCI performs both call processing and network management functions. Interaction with the GC is established for receiving the GC-S signaling units for transmission via the SCU to the MTs. The NAP also returns to the GC the SUs received from MTs via the MT-SR and MT-ST channels.

The GC CSCI includes the following databases:
GC Local Configuration Database
  I. MT Database
    MT Basic Data Table
    MT VN Memberships Table
    MINData Table
    MT Restrictions Table
    DN Data Table
    MT Net Memberships Table
    MT Class Table
  II. Virtual Network Database
    VN Data Table
    Routing Lists Table
    VN NPA Table
  III. Circuit Pool Database
    Circuit Pool Table
    Freq. Segment Table
    Frequency Table
    CP Beam Table
    CP Queue Table
    Power Table
    Beam Table IV. Net ID Database
  Net Table
  Net Beam Table
V. FES Status Tables
  FES Table
  CUP Table
VI. Call Process Event Timers
VII. Control Group Operational Parameters Table
VIII. Hash Tables
  MT Database Hash Tables (RTIN, MIN and DN)
  Virtual Network DB Hash Table
  Routing List DB Hash Tables
  Circuit Pool DB Hash Table
  Net DB Hash Table
  FES Status DB Hash Table
PERF/STAT Tables
Site Manager/GC Buffer Pointers
  X. Virtual Network Counters Table
    TDM Change Requests Table
  XI.
    Circuit Pool Status Counters Table
    Circuit Pool Counters Table
    Circuit Pool Queue Table
    Spacecraft Power Table
    MTs-on-Beam Table
    MTs-commissioned Table
    MT-SR Message Retries Table
    MT-SR Congestion Events Table
    GC-S Message Retries Table
    IS Signaling Channel Stats Table
Call Record/Activity Tables
  XII. Activity Tables
    Call ID Activity Table
    Net ID Activity Table
    RTIN Activity Table
  XIII. Call Record Tables
    MTS Call Record
    Net Radio Call Records
    MT Management Call Records
GC Processes and Inter-Process Communications In the preferred system configuration, the Group Controller resides on one VAX ft 810 and executes in multiple concurrent asynchronous VMS processes which timeshare the CPU. The functionality of each GC process is as herein described. The inter-process communications links are identified in the GC Process Diagrams of FIGS. 33A–33E.

GC Process Architecture

The GC is made up of the VMS processes listed below. There are two Process Groups: the GC Controller (GCC) group, and Control Group Management (CGM) group. The GCC and CGM Process Groups are described below.

| Process Name | Priority | Process Group |
|---|---|---|
| Configuration Process | Non-real-time | Control Group Mgmt |
| Call Process | Real-time | Control Group Mgmt |
| Monitor Process | Near real-time | Control Group Mgmt |
| Check Field Generator Process | Real-time | GC Controller |
| ASK Configuration Manager Process | Non-real-time | GC Controller |
| Router Process | Real-time | GC Controller |
| Router Configuration | Non-real-time | GC Controller |

Highest priority is given to the real-time processes for call handling. Second priority is given to near-real-time processes, which support call handling by forwarding call records and supplying call traffic and performance data to the NOC. Third priority is given to the non-real-time processes which support ASK and Control Group reconfiguration at the GC.

The GC processes are event-driven; between events, a process waits for input on a queue. To reduce system load, waits are non-CPU-intensive. The highest priority processes are driven by call events; the lowest priority processes are driven by NOC requests, Call Process requests, and internal timers set to configurable monitoring intervals. In addition to input from its queue, a process may use memory tables or disk files, as shown on the Process Diagrams, for data required to process an event.

Distributed Processing

The GC architecture accommodates a move to multiple processors. The GC is divided into GC Controller (GCC) processes, and Control Group Manager (CGM) processes. In a distributed environment, there would be one GC Controller, consisting of the GC Router and both ASK Manager processes, supporting one to 16 Control Group Managers. CGMs function independently and can be distributed on multiple processors. A CGM can manage 1 to 16 Control Groups, so there can be one CGM for all Control Groups (the current configuration) or up to 16 distributed CGMs (one CGYM for each Control Group). All processes for a CGM must be co-resident. The GCC can share a processor with one or more CGMs, or can reside on a separate processor. The ASK Manager is stand-alone, and can be hosted on a separate processor in any GC configuration.

Figure 33A:
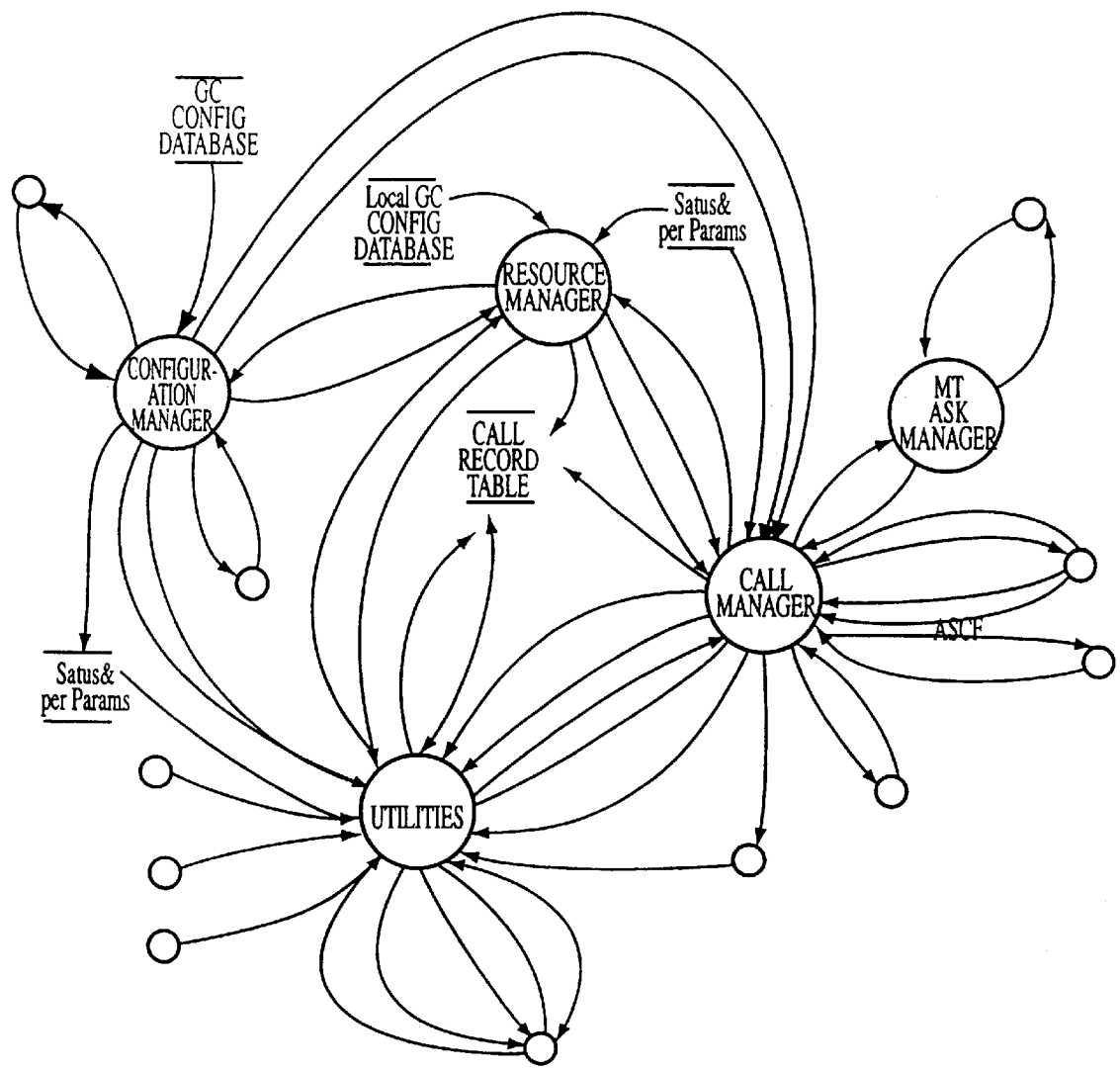
FIGS. 33A–33E illustrate the lower level data flow diagrams.
Figure 33B:
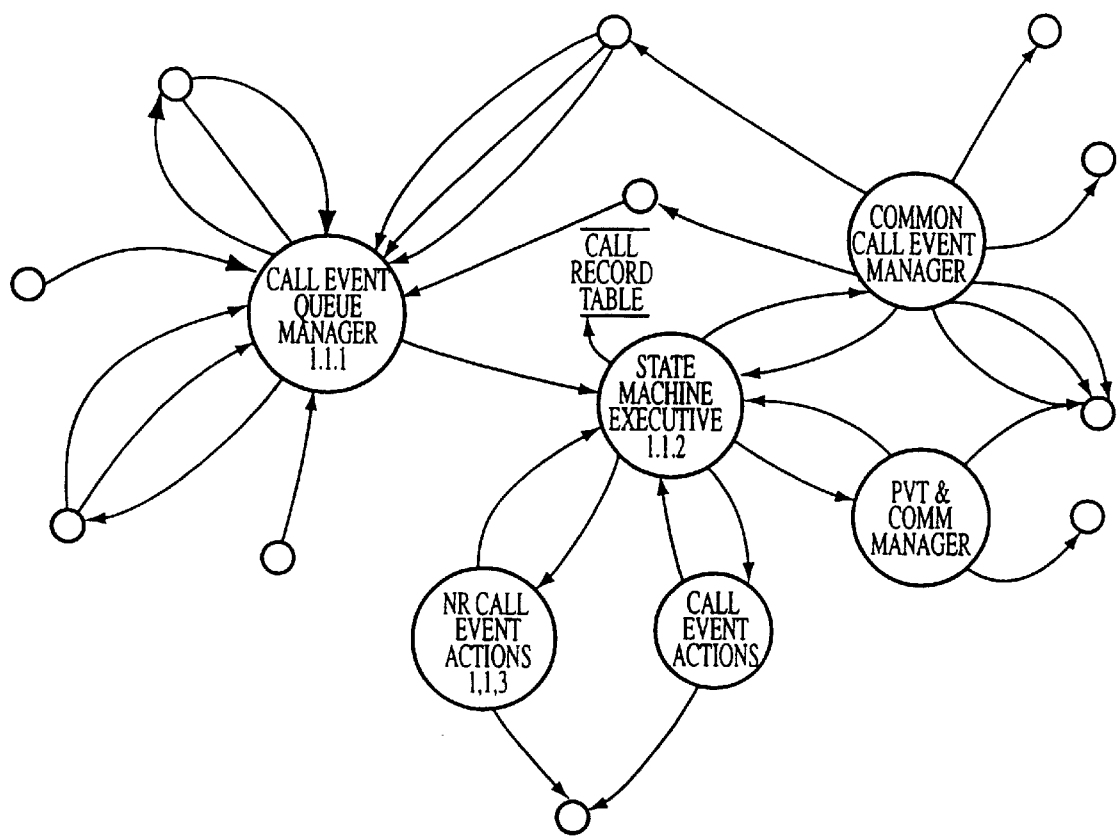
Figure 33C:
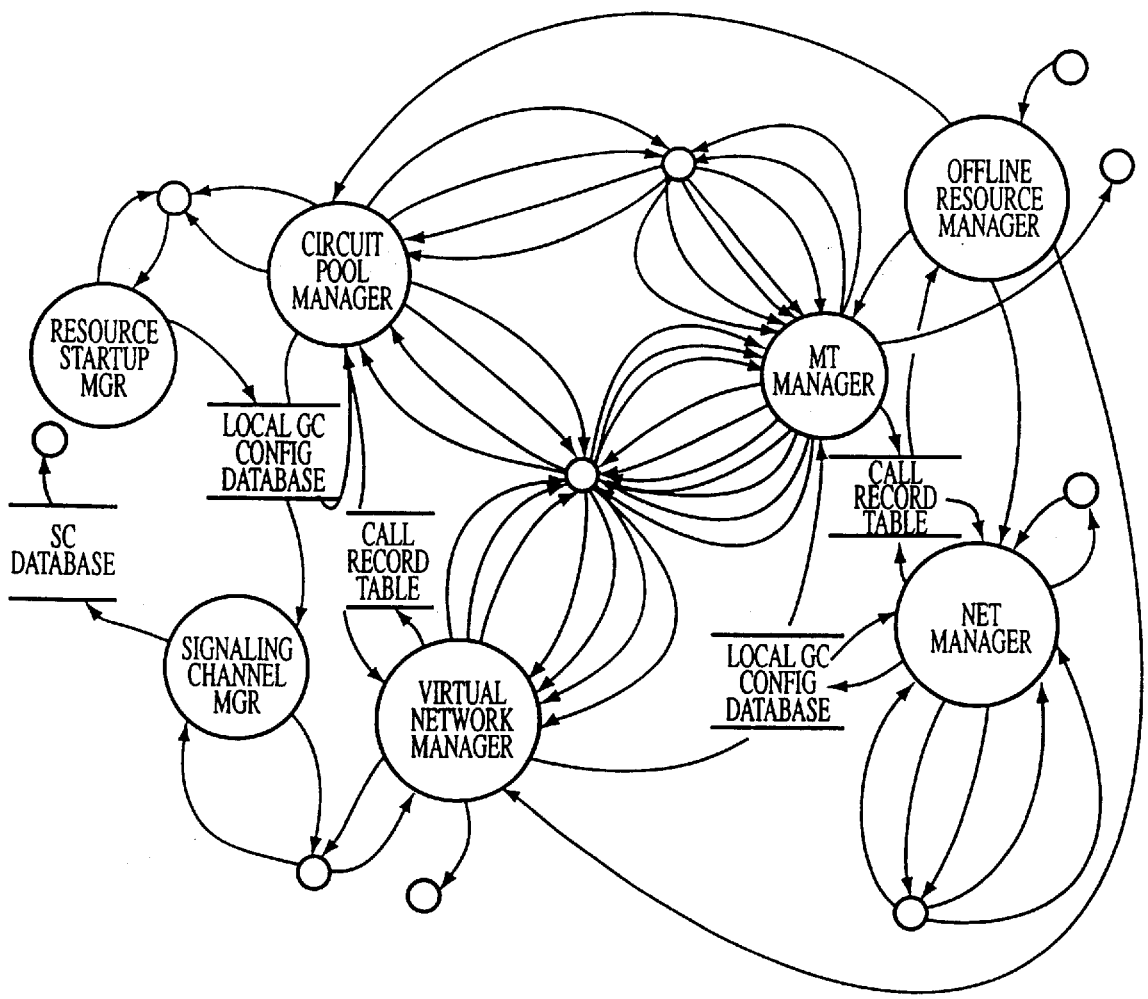
Figure 33D:
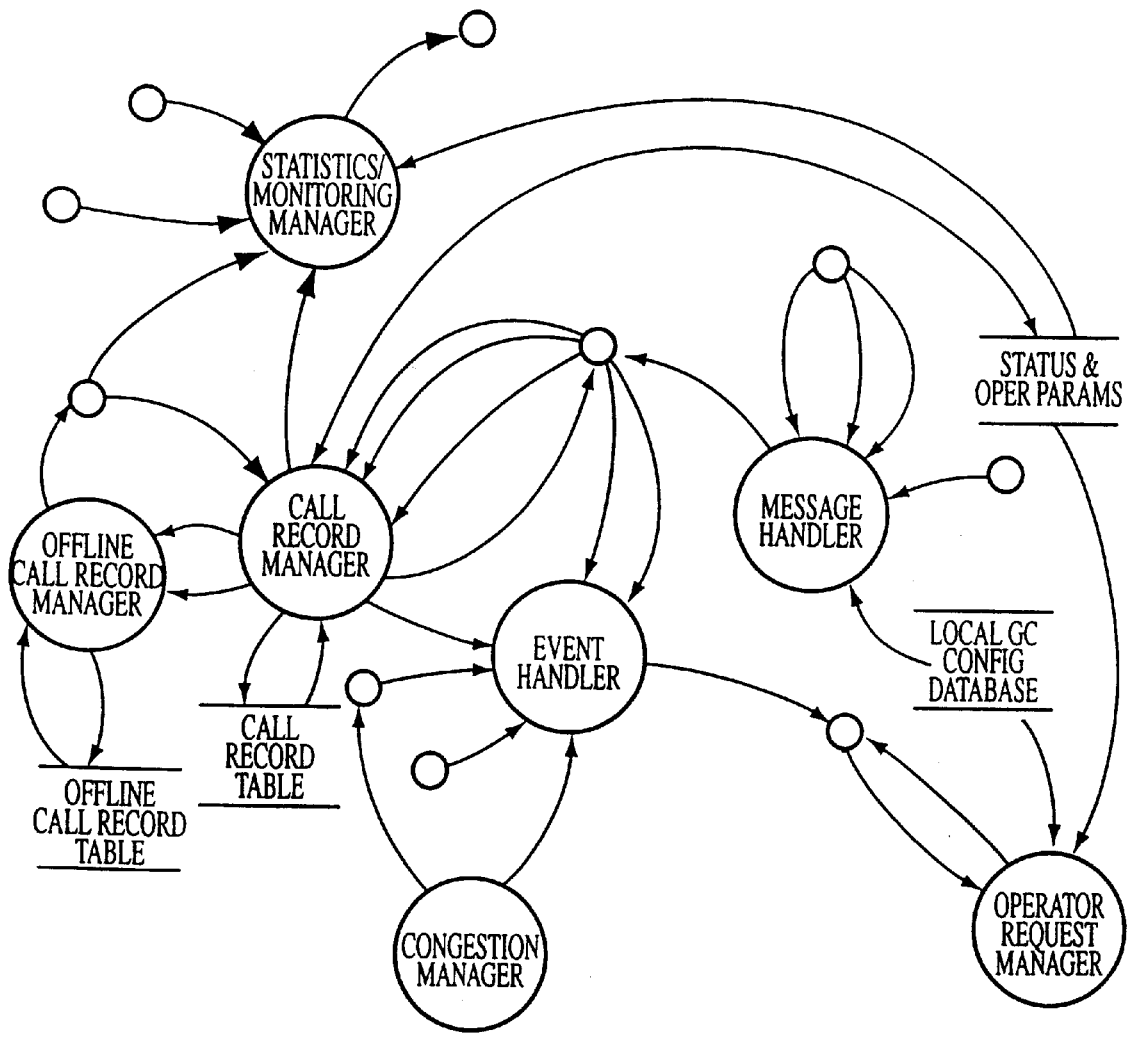
Figure 33E:
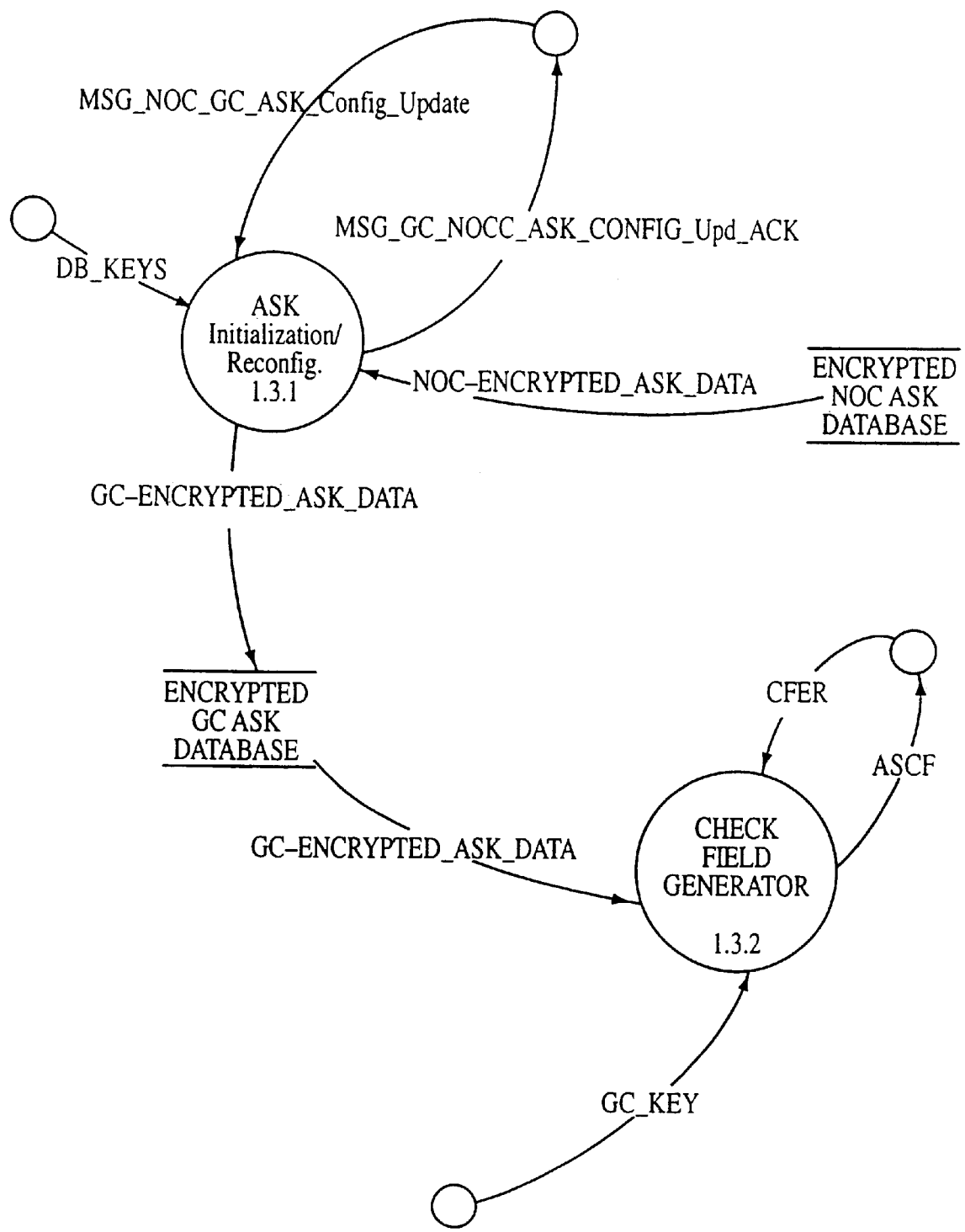
Figure 34:
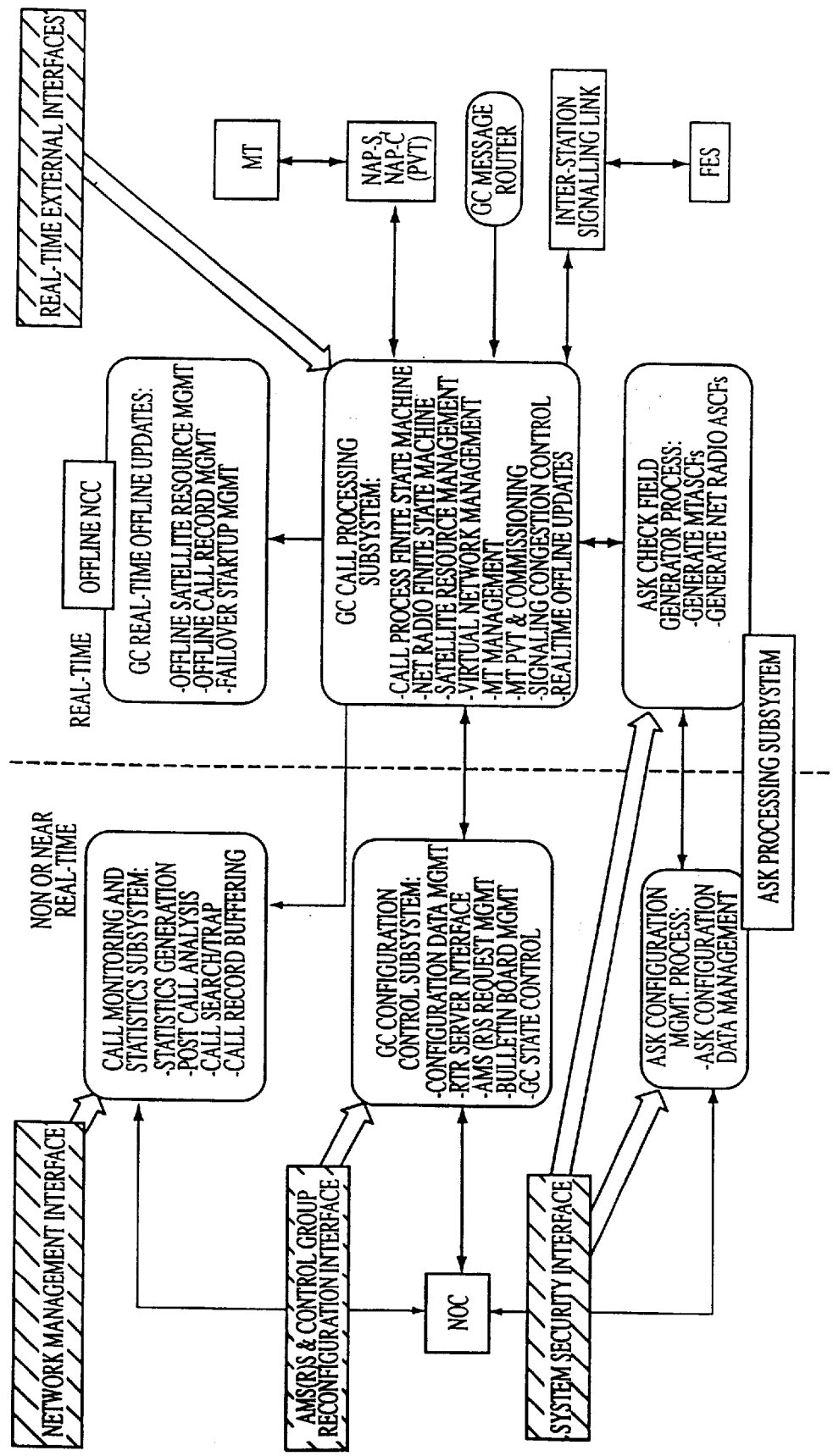
FIG. 34 shows the GC subsystems which manage a call in progress.
Figure 35:
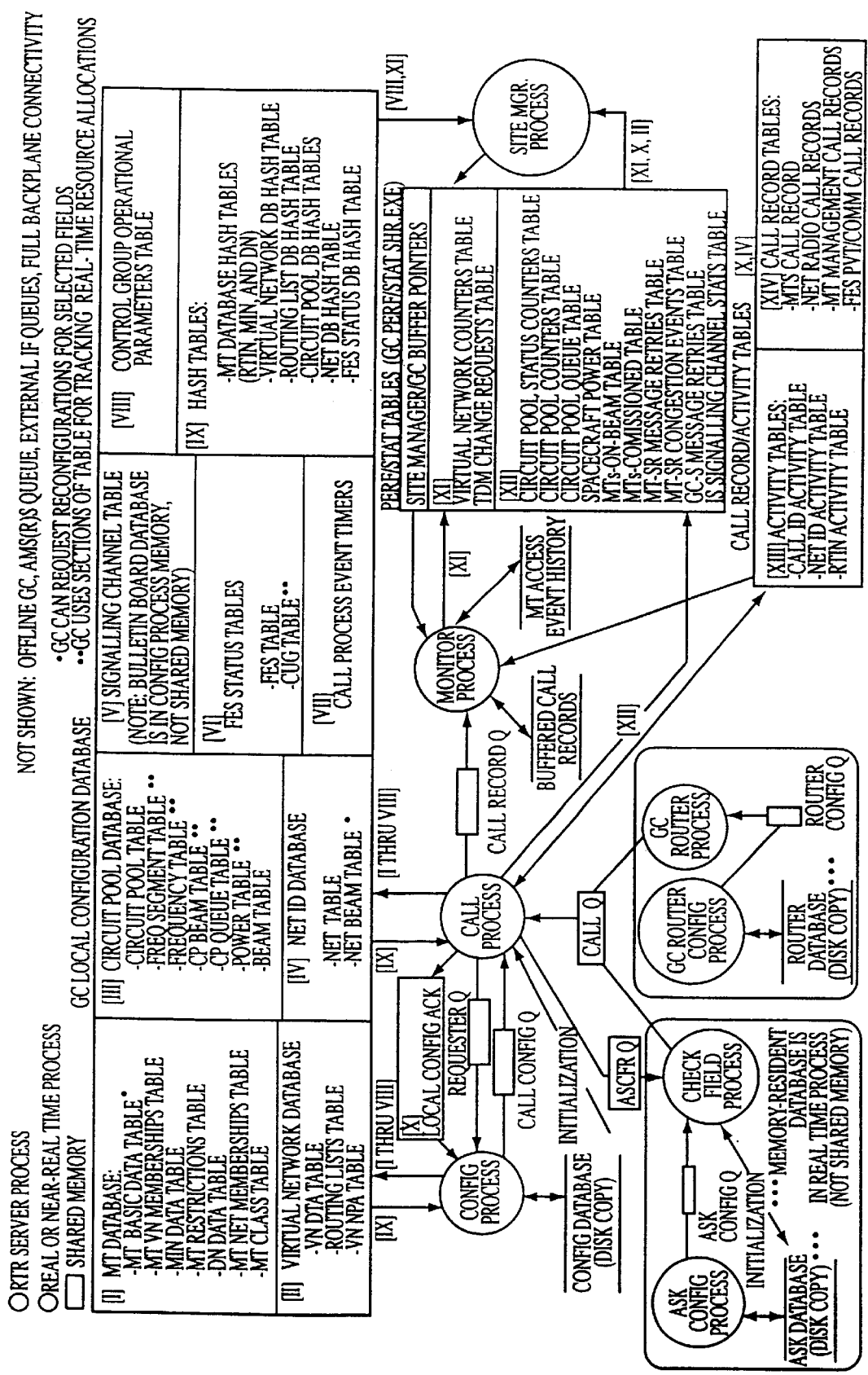
FIG. 35 shows the GC processes and shared memory tables.
Figure 36:
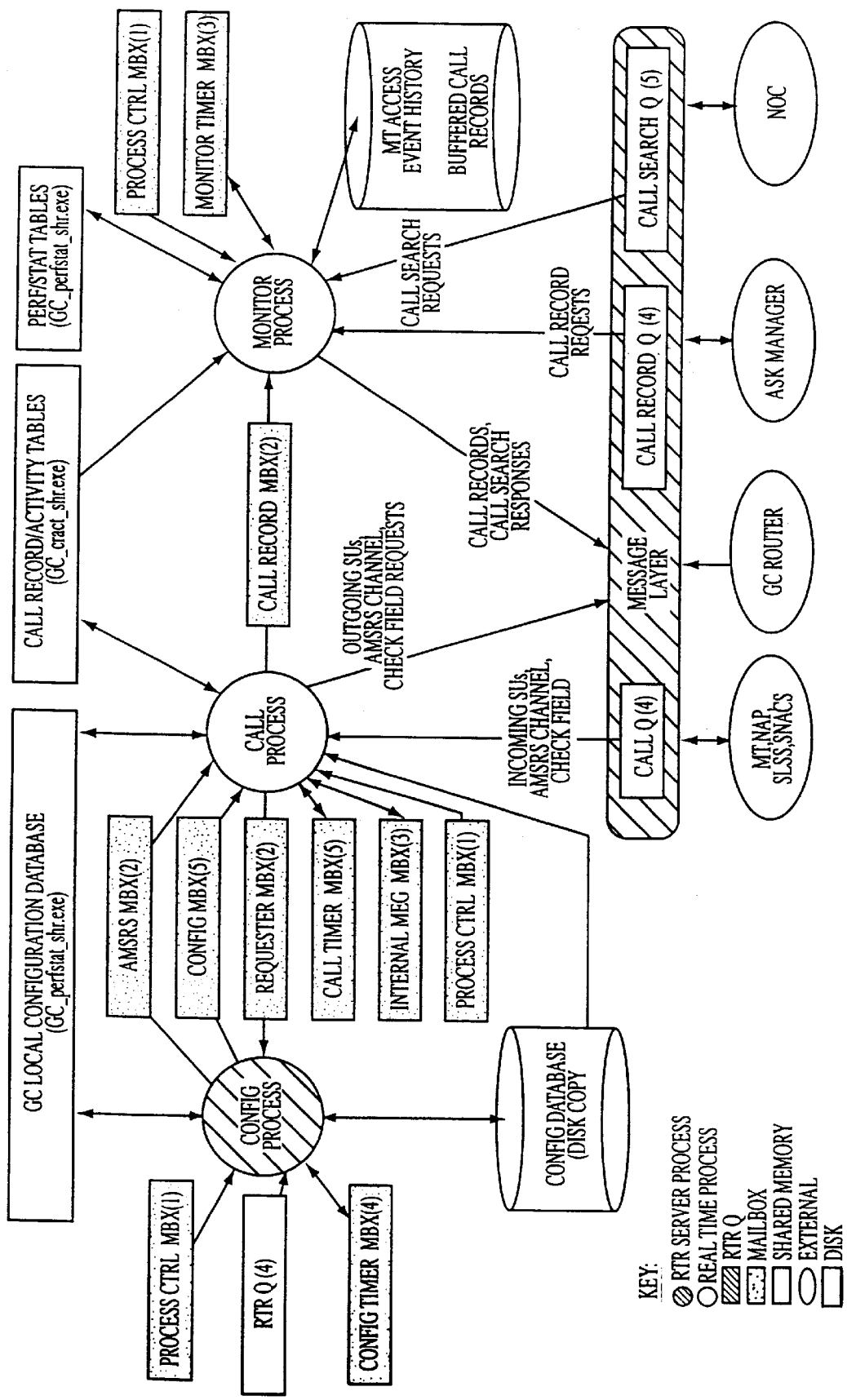
FIG. 36 shows the GC CGM inter-process communications.
Figure 37:
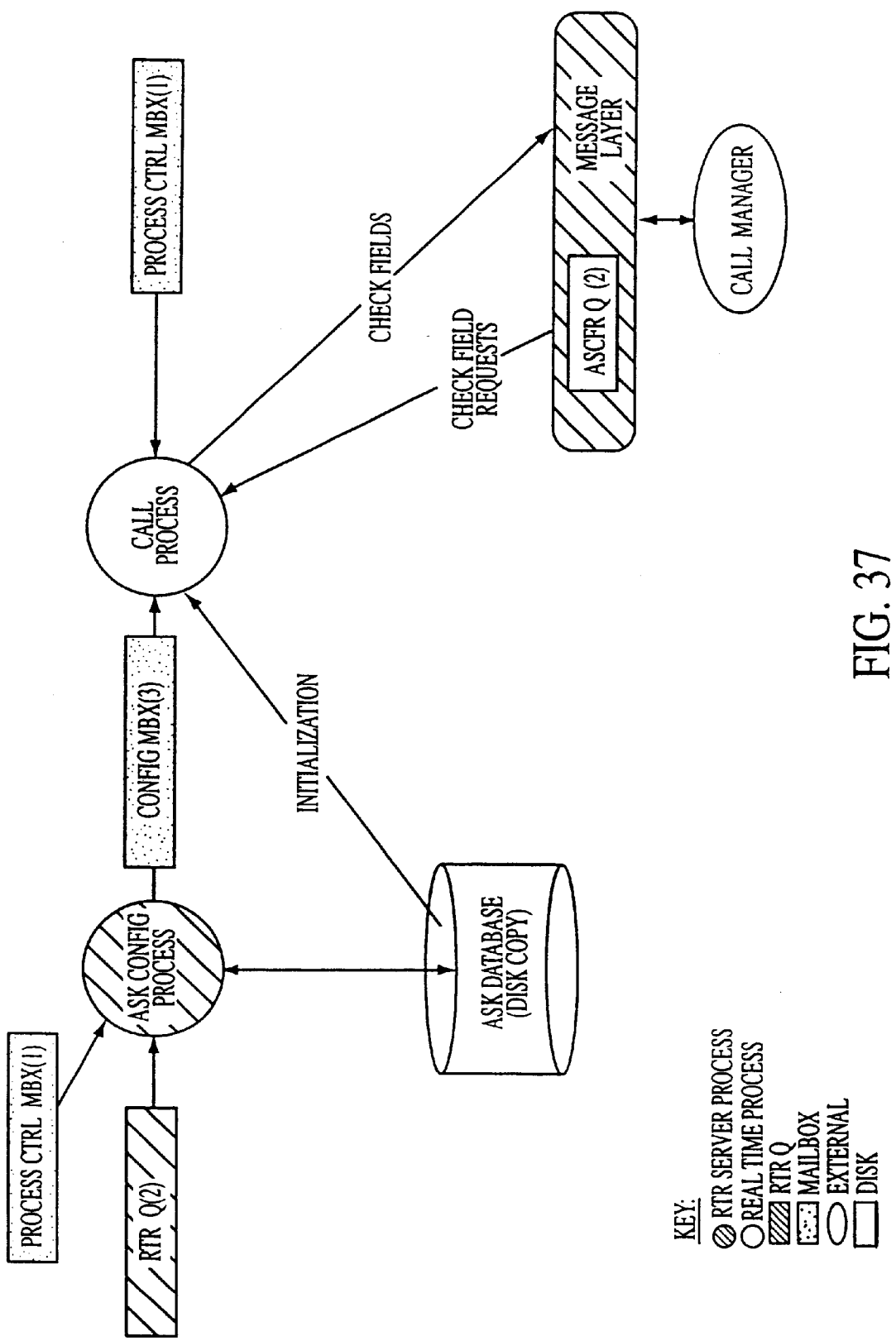
FIG. 37 shows the GC ASK inter-process communications.
Figure 38:
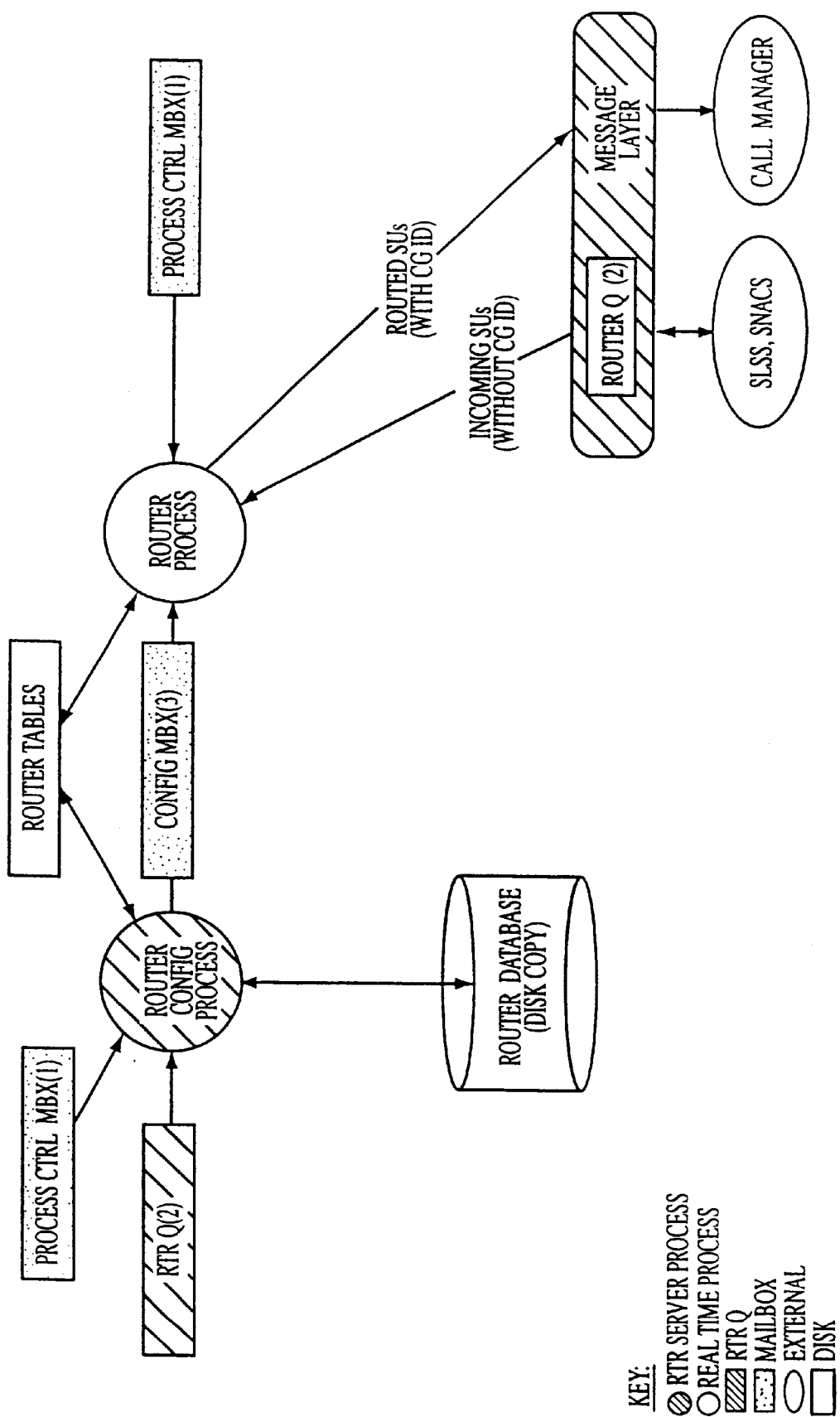
FIG. 38 shows the GC Router inter-process communications.

The GC Process Diagrams in FIGS. 33A–33E illustrate the GC Processes and communications mechanisms. Specifically FIG. 33A presents the GC Level 1 diagrams, FIG. 33B shows the Call Manager Level 2 diagrams, FIG. 33C shows the Resource Manager Level 2 diagrams, FIG. 33D shows the Utilities Level 2 diagrams, and FIG. 33E shows the MT ASK Manager Level 2 diagrams. GC Subsystems illustrated in FIG. 34 comprise the component subsystems in the Group Controller and indicate where call processing and network management interfaces occur. The FIG. 35 diagram of the GC Processes and Shared Memory shows the GC processes and shared memory tables. FIGS. 36, 37 and 38 show the input queues, mailboxes, shared memory areas, and files accessed by the Control Group Management Processes (GC CGM Inter-process Communications), the ASK Manager processes (GC ASK Inter-process Communications), and the GC Router processes (GC Router Inter-process Communications).

Figure 39:
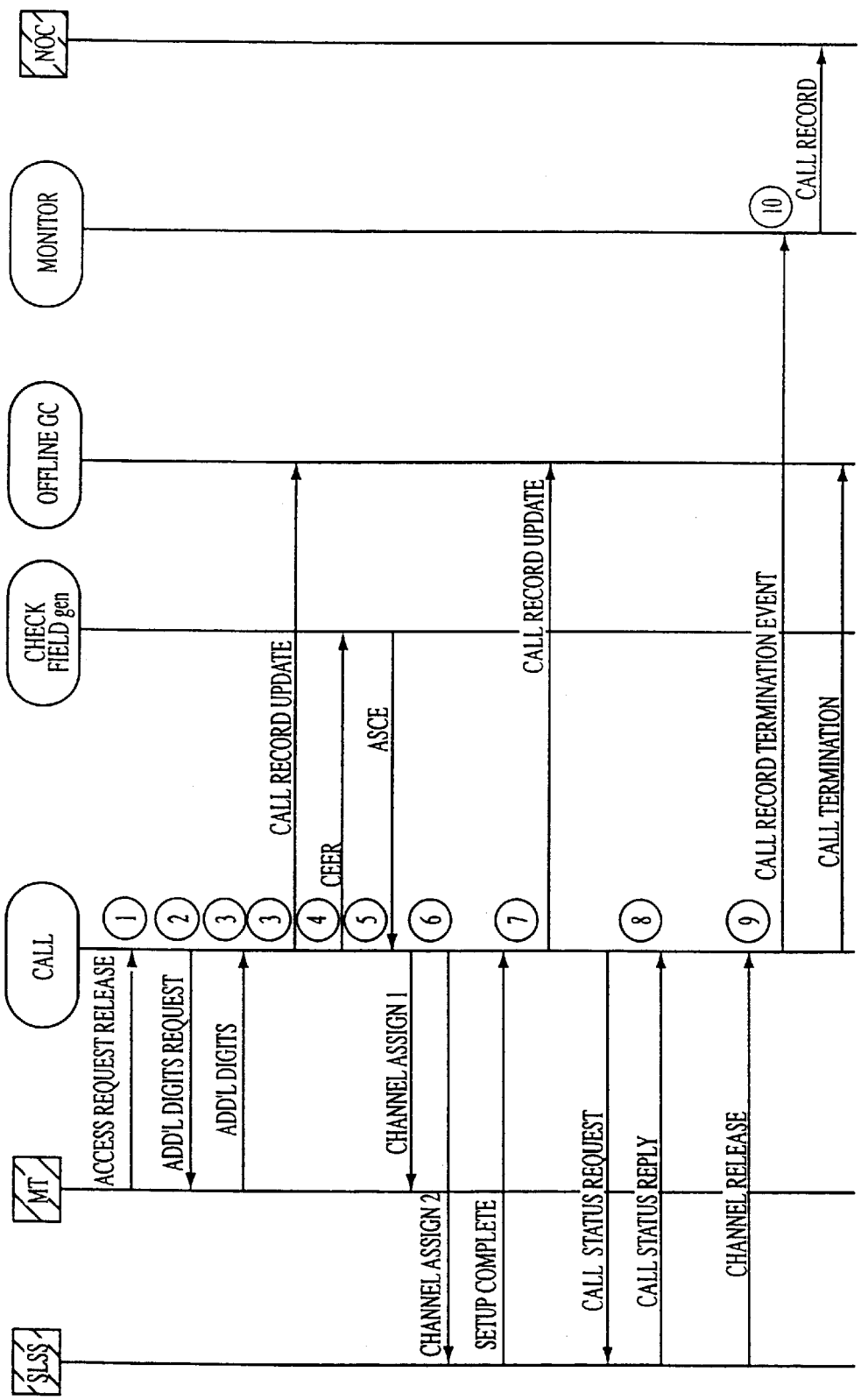
FIG. 39 shows the GC queued inter-process communications sequence for MT-PSTN calls.
Figure 40:
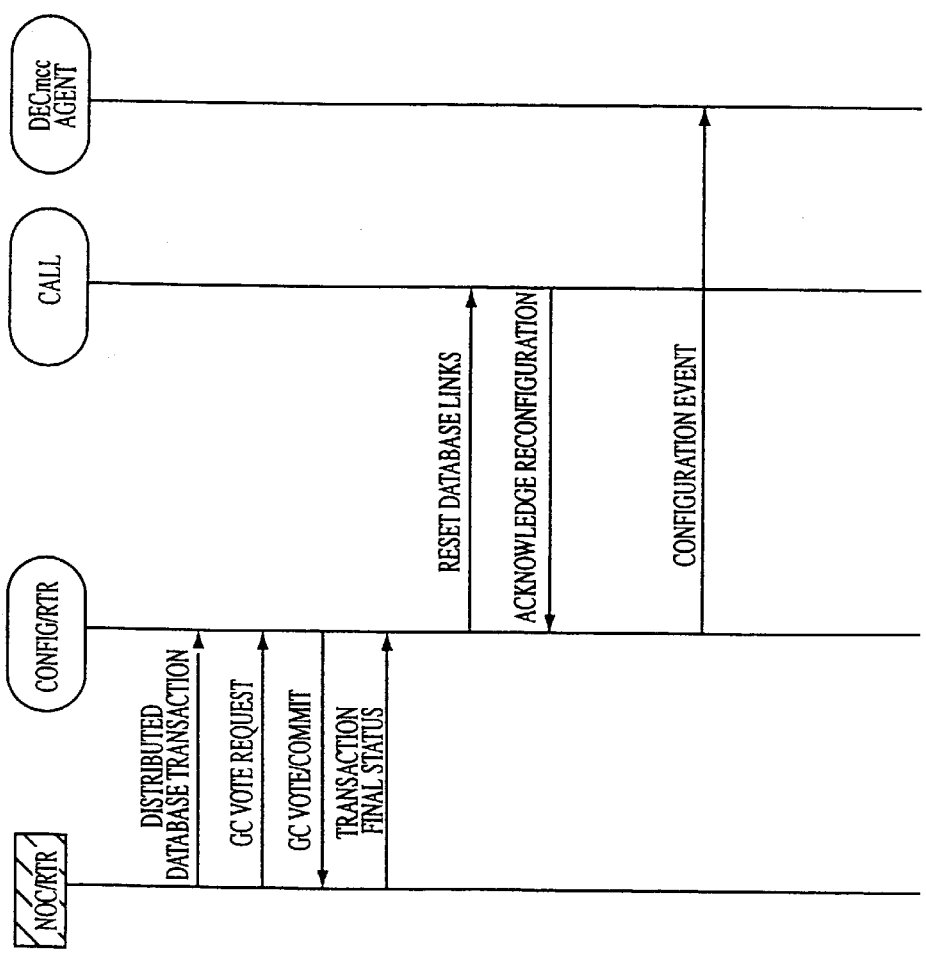
FIG. 40 shows the GC queued inter-process communications example of incremental reconfiguration.

The queued inter-process communications diagrams of FIGS. 39 and 40 show process stimulus and communication for a representative call thread (GC Queued Inter-Process Communications Sequence for MT-PSTN Call), and a representative reconfiguration thread (GC Queued Inter-Process Communications for Incremental Reconfiguration). They trace the paths of messages between the GC processes, showing how one process stimulates another via message queuing, to illustrate the sequence of handoffs in the GC's concurrent processing of call and configuration messages.

Process Descriptions

Configuration Process

The Configuration (Config) Process has multiple configuration control tasks.

1. Updating the local GC Configuration Database

The Config Process controls the GC processing of Control Group reconfigurations. It receives database transactions from the NOC via the DEC COTS product Reliable Transaction Router (RTR), prepares the update, loads the new data into memory, and coordinates with the Call Process to complete the update. The processing and synchronization of the Config and Call processes during a configuration change is designed to minimize interference with active calls. ASK reconfigurations are handled by the ASK Configuration Manager.

2. Distributing GC-initiated database updates

The Config Process performs dual RTR roles. It performs as a server in NOC-initiated updates (#1, above) and a requester (client role) in GC-initiated database updates. As an RTR requester, the GC initiates RTR transactions to distribute changes that originated in the GC Call Process. One example of a GC initiated update is the change of a MT state following commissioning; another is the GC's initiation of a bulletin board update for congestion control.

3. Processing AMS(R)S provisioning requests from the NOC

Config receives AMS(R)S circuit requests, sends circuit blocking commands to the Call Process, and returns the requested circuits to the NOC when they become available.

| CM Process CSCs | |
|---|---|
| GM000__Configuration__Manager | |
| GM1000__CG__Reconfiguration | Control Group reconfiguration MLSCS |
| GM1100__RTR-Agent | RTR Interface manager LLCSC |
| GM1200__AMSRS__Manager | AMS (R) S provisioning management LLCSC |
| GM1300__BB__Manager | Bulletin Board management LLCSC |
| GR0000__Resource__Manager | |
| GR1100__CP__Config__Mgr | Circuit Pool Config Management LLCSC |
| GR1200__VN__Config__Mgr | VN config Management LLCSC |
| GR1300__MT__Config__Mgr | MT configuration Management LLCSC |
| GR3010__MT__DB__Utilities | MT Database Utilities LLCSC |
| GR5100__Net__Config__Mgr | Net Radio Config management LLCSC |

Config Process Input Queues

The Config Process has one RTR queue for reconfiguration messages from the NOC, including AMS(R)S requests. It also has a VMS mailbox for the CGS Software Backplane Process Control interface, and a mailbox for internal timer notification.

Call Process

The Call Process is the heart of the real-time GC processing. It incorporates the Finite State Machines (FSMs) for Call Processing (including Net Radio), MT Management, AMS(R)S Provisioning, and PVT/Commissioning. It also contains resource database access routines, error handlers, timers and utility functions that support the FSMs.

The input queues are prioritized as indicated on the GC CGM Inter-process Communications Diagram. Incoming messages from each queue are processed in order. When an FSM message/event is processed, the Call Process maps the message or event to its state data, performs the state transition processing, and establishes the next state. Errors occurring in a state transition are handled by error routines associated with the current state in the FSM. State data is maintained in the Active Call Record Table, which allows shared read-access for use by support functions in the Monitor process

| Call Process CSCs | |
|---|---|
| GC000__Call__Manager | All Call Manager CSCs are in this process |
| GR0000__Resource__Manager | |
| GR1000__Circuit__Pool__Manager | Circuit Pool Management MLCSC |
| GR1200__Circuit Request__Mgr | Circuit Request Management LLCSC |
| GR1300__Release__Request__Mgr | Circuit Release Management LLCSC |
| GR1400__CP__Queue__Mgr | Call Priority Queue Management LLCSC |
| GR1500__CP__Statistics__Mgr | Circuit Pool Statistics Management LLCSC |
| GR2000__VN__Manager | Virtual Network management MLCSC |
| GR2200__VN__Request__Mgr | Virtual Network Data request Mgmt LLCSC |
| GR2300__Routing__Mgr | Virtual Network Routing Mgmt LLCSC |
| GR2400__FES__Resource__Mgr | Virtual Network FES Resource MGMT LLCSC |
| GR3000__MT__Manager | Database management MLCSC |
| GR3100__MT__Config__Mgr | MT configuration Management LLCSC |
| GR3200__MT__Data__Request__Mgr | MT data request management LLCSC |
| GR4000__SC__Manager | Signaling Channel management MLCSC |
| GR5000__Net__Manager | Net Radio DB management MLSCS |
| GR6000__Resource-Startup__Mgr | Database initialization MLCSC |
| GU000__Utilities | GC Utilities and Reuse TLCSC |
| GU1000__MGSP | MGSP routines MLCSC |
| GU3100__Call__Record__Mgr | Call Record Manager LLCSC |
| GU3100__Call Record-Request | Call Record Request CSUG |
| GU3300__Congestion | Congestion Manager LLCSC |
| GU5000__Timer | Timer utilities MLCSC |
| GU6000__Memory__Management | Memory Management Utilities MLCSC |
| GU7000__Activity__Table__Mgr | Activity Table Utilities MLCSC |

Call Process Input Queues

The Call Process has one input queue established via the CGS Backplane for signaling units, and Access security Check Fields (generated by the ASK Manager). It also has VMS mailboxes for the CGS Software Backplane Process Control interface, internal time notification, internal messages (such as Circuits Available), AMS(R)S requests, and control group reconfiguration requests from the Configuration Process.

Monitor Process

The Monitor Process provides the following Call Process support functions:

1 Forward Call Records to the NOC

2 Buffer Call Records on disk

3 Save the MT Access Event History on disk

4 Generate call traffic statistics

5 Respond to Call Search Requests

6 Respond to Call Record Leftover Requests

Items 1–3 above are performed when a Call record is terminated. The monitor process receives the Call Record from the Call Process, in a Call Termination message. The termination message for Net Radio call records may also include Priority 1 data from the SLSS to be appended to the Call Record. This process forwards the final Call Record data to the NOC, increments counters for call statistics, stores the Call Record on disk for backup in case the NOC goes down, and stores the MT Access Event History on disk. the MT Access Event History buffers that last ten accesses by MT by storing the time stamp of the end of the call, termination reason, and access type (such as MT Management, Call, NR, etc.).

The following CSUGs perform items 1–3 above:

| GU3100_Call_Record_Manager | Call Record Manager LLCSC |
| GU3120_Call_Record_Disk_Request | Call Record Disk Request CSUG |
| GU3140_MT-Access_History_Request | MT Access History request CSUG |

Statistics (Item 4) are generated by the Statistics Manager and polled by the Site Manager (DECmcc Agent) at configurable time intervals. These data are derived from the Call Process (via the terminated Call Records), and stored in shared memory tables for the Site Manager (DECmcc Agent).

Call Search requests (Item 5) are sent by the NOC to request the current Call Record (if one exists) of a specific MT, and its Access Event History. The Monitor has read-access to the Active Call Record Table maintained by the Call Process for retrieving the call ID and call record, if it exists, for a MT.

The following CSC processes Call Search requests:

| GU3100_Call_Record_Manager | Call Record Manager LLCSC |
| GU3140_MT-Access_History-Req. | MT Access History Request CSUG |

Call Record Leftover requests (Item 6) are sent by the NOC when they are back online after some period of down-time. The request contains the ID of the last Call Record received by the NOC. The Monitor Process retrieves later records which it buffered on disk while the NOC was down.

The following CSUG reads the Call Record buffer and sends the Call Records to the NOC:

| GU3100_Call_Record_Manager | Call Record Manager LLCSC |
| GU3120_Call_Record_Disk_Request | Call Record Disk Request CSUG |

The following CSCs are included in the Perf process to provide timers and Active Call Record look-ups:

| GU5000_Timer | Timer utilities MLCSC |
| GU7000_Activity_Table_Manager | Activity Table Utilities MLCSC |

Monitor Process Input Queues

The Monitor process has one input queue, established via the CGS Backplane, to receive Call Record Requests and Call Search Requests requests from the NOC. It has a VMS mailbox to receive terminated call records from the Call Process, a mailbox for the CGS Software Backplane Process Control interface, and a mailbox for internal timer notification.

GC Router Process

This process routes Call Process messages which do not have a Control Group ID.

The GC Message Router contains the following CSC:

| GM2000_GC_Controller | GC Controller Process MLCSC |
| GM2100_Router | GC Message Router LLCSC |

Router Process Input Queues

The GC Message Router Process has one input queue established via the CGS Backplane to receive incoming SUs for internal routing. It also has a VMS mailbox for the CGS Software Backplane Process Control interface, and a mailbox to receive reconfiguration messages from the GC Router Configuration Process.

GC Router Configuration Process

This process is an RTR server process to accept reconfiguration transactions from the NOC. This server is only notified of updates when the change affects the Control Group ID of a MT/MIN,IVDM, or Net Radio MT. It cooperates with the router process in the same manner that the Config Process cooperates with the Call Process to complete a transaction.

The GC Router Configuration Process contains the following CSC:

| GM2000_GC_Controller | GC Controller Process MLCSC |
| GM2200_GC_Router_Config | |

Router

This Process has an RTR input queue. It also has a VMS mailbox for the CGS Software Backplane Process Control interface.

ASK Configuration Manager Process

The ASK Configuration Manager Process configures the ASK database, based on NOC inputs. It has the following CSCs:

| | |
|---|---|
| GA1000_ASK_Reconfiguration | ASK reconfiguration MLCSC |
| GA3000_ASK_Encryption | ASK Encryption algorithms MLCSC |

ASK Config Process Input Queues

The ASK Config Process has one RTR input queue. It also has a VMS mailbox for the CGS Software Backplane Process Control interface.

Check Field Generator Process

The Check Field Generator generates MT and Net Radio Check Fields in response to Call Process requests. It also receives ASK reconfigurations from the ASK Config Process, which it stores in the memory-resident ASK database.

It includes the following CSCs:

| | |
|---|---|
| GA2000_Check_Field_Generator | MT/NET ID Check field generation MLCSC |
| GA3000_ASK_Encryption | ASK Encryption algorithms MLCSC |

Check Field Process Input Queues

This process has one input queue established via the CGS Backplane to receive check field requests from the Call Manager. This interface is via the Message Layer because the ASK Manager may not be co-resident with the Call Process it serves. It also has a VMS mailbox for the CGS Software Backplane Process Control interface, and a mailbox to receive configuration messages from the ASK Config Process.

GC QUEUES INTER-PROCESS COMMUNICATIONS SEQUENCE EXAMPLE

MT-PSTN Call

Processing Description

1. When a MT Access Request is received on the real-time CALL event queue, the CALL process sets up the call record, establishes a MT Activity Table entry for the call and determines whether the dialed digits in the Access Request SU are complete.

2. If additional digits are required, the CALL process sends out a request to the MT (see following Note 1 and the following referenced notes) and sets a timer for the expected response.

3. When the additional digits are received, the CALL process cancels the Additional Digits Request timer. (Note 2)

4. The CALL process validates the MT,l performs address screening, service permission checks, and routing. If all checks succeed, it allocates circuits and updates the OFFLINE GC CALL UPDATES process.

5. The CALL process requests the Access Security Check Field from the CHECK FIELD process. It sets a timer for the expected response (Note 3). When the Check Field is received, the CALL process cancels the timer for the request.

6. The CALL process sends out Channel Assignments to the MT and FES. It sets a timer and waits for the Setup Complete message (Note 3).

7. When the Setup Complete is received from the SLSS, the CALL process cancels the Setup timer, updates the OFFLINE GC CALL UPDATES process, and sets a timer for the Call Status Monitoring interval. (Note 2)

8. When the Call Status Monitoring timer expires, the timer in the CALL Process notifies the Call Manager which sends out a Call Status Request and sets a timer for the response. When the Call Status Reply is received, the CALL process resets the monitoring interval timer. (Note 2)

9. When the Channel Release is received, the CALL process cancels the Monitor timer and closes out the call by releasing resources, clearing the activity table, and sending a call termination event to the MONITOR process.

10. The MONITOR process closes out the call record, updates the OFFLINE GC CALL UP-DATES process, performs any Statistics generation required, sends the call record to the NOC, and Buffers the call record to disk.

Note 1: All messages to/from the MT are sent via the NAP-S.

Note 2: If the response has not been received before the timer expired, the timer in the CALL process would have notified the Call Manager, which would have performed appropriate error handling.

Note 3: The CALL process can process other calls while it awaits for a response from another process on any given call.

GC QUEUED INTER-PROCESS COMMUNICATIONS EXAMPLE

Incremental Reconfiguration

Processing Description:

1. When a distributed database transaction from the NOC is received on the GC's RTR queue, the CONFIG process reads the transaction and prepares an update to the Local GC Configuration database. When the preparation and validation are complete, the CONFIG process waits for a vote request from the NOC. The CALL process cannot access the new data until the distributed transaction is complete.

2. When the CONFIG receives a vote request via RTR, it returns the GC vote. The GC will return VOTE/COMMIT if its local database validation and update preparation were successful, or VOTE/ABORT if an error occurred while processing the update. After casting the GC vote, the CONFIG process waits for a return code from RTR, indicating the final status of the transaction. Final status is determined by RTR from the votes cast by all participants.

3. If the final status of the transaction is COMMIT, then CONFIG sends a message to CALL informing it of the reconfiguration. CALL updates its links to the reconfigured data and acknowledges the completion of the update. CALL can now access the data.

4. When the update is complete, the CONFIG process sends a Reconfiguration Event to the NOC via the DECmcc AGENT process.

Both the Online and Offline GC's participate in a Control Group reconfiguration since the Offline GC serves as another RTR partner in each distributed Control Group transaction. The processing is the same cases.

NCC On/Off Line Switchover Process

As noted earlier, the fully expanded CGS system includes a second NCC or alternate NCC. This separate physical copy of the NCC maintains near real time communication with the active on-line NOC and the active on-line NCC via the MSS Internetwork using-the TCP/IP protocol. The MSS Internetwork communication path allows the alternate NCC to be geographically separated from the on-line NOC and the on-line NCC. The near real time communication allows the off-line NCC to maintain a "hot" standby status such that it could become the active on-line NCC with a minimum amount of elapsed time and "lost processing" once the switch between NCCs is initiated.

In order to maintain an up-to-date status at the off-line NCC, the applicable database updates at the on-line NOC will be issued as RTR transactions to maintain lock-step database concurrence across the two NCCs. The categories of message sent to the off-line NCC include:

MT Customer Configuration
Virtual Network and Routing Configurations
FES Configuration
Channel Unit Pool Configuration
Net Radio Configuration
Satellite Resource Configuration
Control Group Operation Parameters
Bulletin Board Data To maintain lock step with ongoing real time call processing, the off-line NCC receives call processing information from the on-line NCC on a call-by-call basis. The major categories of information moving from the off-line NCC to the on-line include the following:

Call records with frequencies allocated to a call setup
Call records for a call after setup is complete
Call record for a call after the frequencies have been released.

The off-line NCC uses this information to maintain call records and frequency allocations dynamically such that the off-line NCC can immediately assume control of the in-process active call suite and is completely aware of the current in-use frequencies to continue with new call setups and "old" call releases.

The on-line to off-line NCC switch over may occur as scheduled activity (e.g., periodic maintenance, major NCC H/W or S/W configuration upgrade, etc.) or as a result of a failure of the current on-line NCC.

The scheduled switch over process is the following:

The on-line NOC or local NCC operator alerts the on-line NCC to initiate processing phase out and suspend active communication with its associated CGS internal element.

The on-line NCC alerts the off-line NCC that all processing has been suspended and all elements associated with the NCC are waiting for a communication restart.

The off-line NCC commands the on-line NCC to go to passive standby under its own local operator control. At this point the previous off-line NCC is now the new active on-line NCC.

The new on-line NCC begins a communication restart sequence with its associated CGS elements.

This completes the scheduled switch over from an active on-line NCC to the off-line NCC.

The fail over process is initiated by the on-line NOC. The process flow is the following:

The on-line NOC commands the on-line NCC to go to passive standby under local operator control. This is an insurance command to attempt to eliminate the failed NCC from active participation in CGS processing.

The on-line NOC commands the off-line NCC to go active.

The on-line NOC commands all NCC associated elements to suspend communication with the old on-line NCC and wait for an NCC communications restart command.

The on-line NOC commands the new on-line NCC to begin a communications restart with all of its associated elements.

The new on-line NCC begins a communications restart sequence with all of its associated elements.

This completes the fail over sequence. If the original active on-line NCC is not capable of fulfilling its role in the fail over sequence, the switch over will be accomplished via NOC operator to NCC operator communication to suspend the operations of the original on-line NCC and then via NOC MMI to command the on-line NOC MMI to command the on-line NOC to pick up the remainder of the failover sequence.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

DICTIONARY ITEMS AND DEFINITIONS

Actual GSI
Definition: Current GSI based on TDM changes during MET operation. This field is populated by the NOC based on actions on the CGS. The CMIS cannot create or update this field.

Call Barring Inbound/Outbound Flag
Definition: Describes the call barring entry as applying to incoming or outgoing calls. If the Call Barring List is flagged as Inbound, it applies to calls the MET is receiving. If the Call Barring List is flagged as Outbound, it applies to calls the MET is making.

Call Barring Include/Exclude Flag
Definition: Describes the call barring entry as an included (legal) call or an excluded (illegal) call. When a Call Barring List is flagged as Include, the MET may only make calls to the numbers or NPAs on the list. Any other call would be denied. Conversely, if a Call Barring List is flagged as Exclude, the MET may make calls to any number or NPA except those on the list.

Call Barring List Value
Definition: Numbering plan area or phone number in the call barring list. The values that appear in the list are the phone numbers or NPAs that the MET's restriction apply to. The types of restrictions are dictated by the flags for Include/Exclude and Inbound/Outbound Call Barring.

Call Trap Flag
Definition: Indicates call trapping has been initiated for the MET. The GC will trap MET states as they change during MET CGS activity. This information will be provided to the CMIS on a call record.

Call Type
Definition: Service available on the MET. There are four service types: voice data (2400 or 4800 baud), fax, and alternate voice data (avd). For each service the mobile is registered, a service record is created with a single call type indicated. This call type in turn has a unique mobile identification number (min) associated with it.

Carrier
Definition: Name of preferred IXC carrier. This field is a switch field used to support equal access to long distance carriers.

Cellular ESN
Definition: 32 bit ESN that is used by the switch. For dual mode cellular/satellite phones it is the ESN for the cellular portion of the phone and would match the ESN used by

DICTIONARY ITEMS AND DEFINITIONS the home cellular carrier to identify that mobile terminal.

CGS Time Stamp
Definition: Time stamp was created/modified. Part of the notification of success or failure of CGS action. Not created or updated by CMIS.

Channel Spacing
Definition: Multiple of frequency step size. This element is a characteristic of the MET Class. CMIS will only have the MET Class ID that a particular METs equipment maps to. NE originates this and other data that describes the MET Class and sends it to the NOC.

Check String
Definition: Constant used by the GC to validate the encryption/decryption algorithm. This element is related to the ASK.

Commanded GSI
Definition: Set by CMIS this is the original GSI stored as a NVRAM (non-volatile RAM) parameter by the MET. Required for each new MET registered for service. This element is used by the MET to tune to a GC-S channel during commissioning on the CGS. Without the GSI the MET is incapable of logging on to the CGS.

Configuration File
Definition: A file containing the contents of a working configuration that has been saved to disk under a unique name.

Current Configuration
Definition: The set of resources that exist in the configuration most recently sent to or received from the NOC. This is assumed to be the actual configuration of the traffic bearing network at any given time.

Commit a Resource
Definition: Explicit engineer action to add a fully provisioned interim resource to the working configuration.

Control Group ID
Definition: The CGS is divided into Control Groups that contain circuit pools, signaling channels, bulletin boards, METs, and VNs. A MET may only belong to one Control Group. The control Group assignment is based on the virtual network membership. All VNs a MET is a member of must be in the same control group.

Cust Group
Definition: Identifier for a specialized routing information used at the switch (e.g., 1024 available cust groups per MSR). Dialing plans will be implemented for groups of customers through a Customer Group (Cust Group).

Data Hub Id
Definition: Used to route messages during PSTN to IVDM call setup to the proper data hub. This is only applicable for METs that are participating in the Mobile Packet Data Service.

Date Last Tested
Definition: Time stamp of most recent commissioning test. This field is populated by the NOC and cannot be created or updated by CMIS.

Default VN
Definition: VN selected if user does not specify VN during dialing. For METs that belong to only one VN, this can be populated with the VN ID the MET is assigned to by default.

EIRP
Definition: Equivalent Isotropic Radiated Power - power level required for a MET to receive a satellite signal. This element is a characteristic of the MET Class. CMIS will only have the MET Class ID that a particular METs equipment maps to. NE/SE originates this and other data that describes the MET Class and sends it to the NOC.

Event Argument Id
Definition: Part of the Event Record received from the NOC. CMIS has no part in creating or updating events-they arrive unsolicited from the NOC.

Event Argument Type
Definition: Part of the event Record received from the NOC. CMIS has no part in creating or updating events-they arrive unsolicited from the NOC.

Event Argument Value
Definition: Part of the Event Record received from the NOC. CMIS has no part in creating or updating events-they arrive unsolicited from the NOC.

Event Argument VMS Type
Definition: Part of the Event Record received from the NOC. CMIS has no part in creating or updating events-they arrive unsolicited from the NOC.

Event Code
Definition: Part of the Event Record received from the NOC. CMIS has no part in creating or updating events-they arrive unsolicited from the NOC.

Event Severity
Definition: Network impact assessment of the trouble event.

Event Time
Definition: Time the event occurred within the network.

Event Type
Definition: Part of the Event Record received from the NOC. CMIS has no part in creating or updating events-they arrive unsolicited from the NOC.

External Date Time Stamp
Definition: CMIS generated time stamp used for CMIS audit purposes in exchanging messages with the CGS.

External Transaction Id
Definition: CMIS generated transaction id used for CMIS audit purposes in exchanging messages with the CGS.

Feature Set
Definition: Identifies MET features within a specific VN. Fixed features are set up during order processing and require no action by the MET user to invoke a feature. MET activated features must also be set up during order processing but will only be available through some action on the part of the MET use during call process.
FIXED FEATURES include:
Calling Line Id Presentation (CLIP) - display the calling party's number to a MET.
Calling Line Id Restriction (CLIR) - prohibition from displaying the METs number when it is calling another party.
Connected Line Id Presentation (COLP) - display the number the calling MET is connected to.
Connected Line Id Restriction (COLR) - prohibit display of the connected MET's number to the calling party
Sub-addressing (SA) - allows one or more attachments to the MET to be addressed. This is being accomplished through unique phone numbers for service types requiring different

| DICTIONARY ITEMS AND DEFINITIONS |
|---|
| equipment. |
| Call Waiting (CW) - notification to a MET engaged in a call that another call is waiting. MET may accept the other call or ignore it. |
| Call Barring (CB) - restricts the MET user's from making or receiving one or more types of calls. |
| Operator intervention (OI) - allows an operator to break into a call in progress for the MET. |
| Operator Assistance (OA) - allows the MET to access an MSAT operator to receive assistance. |
| Call Priority (CP) - used in conjunction with the system's call queuing function (trunk access priority) presence of this feature gives a MET access to channels at times of congestion ahead of MET's with lower priority. Priority applies only to MET initiated calls. |
| MET ACTIVATED (dynamic) FEATURES include: |
| Call Transfer (CT) - allows sa MET user to transfer an established call to a third party. |
| Call Forwarding Unconditional (CFU) - permits a MET to have all calls forwarded to another MET or PSTN number. |
| Call Forwarding Busy (CFB) - permits a MET to have all incoming calls attempted when the MET is busy to another MET or PSTN number. |
| Call Forward Congestion (CFC) - permits the MET to have all incoming calls attempted when the signaling channels are congested answered with a recorded announcement intercept. |
| Call Forward No Reply (CFN) - permits a MET to have all incoming calls attempted when the MET is not answering to another MET or PSTN number. This applies if the MET is blocked, turned off or not answering. |
| Call Holding (CH) - allows a MET to interrupt call communication on an existing connection and the re-establish communications. |
| Alternate Voice Data Operation (AVD) - allows a MET user to toggle between voice and data mode during a call. Requires that the call be initiated in voice mode. Only the MET user may toggle between voice and data. This requires a special service type in addition to the activation at set-up of the feature. |
| Conference calling (CC) - allows a MET to communicate with multiple-parties including METs and PSTN concurrently. |
| Three Party Service (3PS) - allows a MET to who is active on a call to hold that call, make an additional call to a third party, switch from one call to the other (privacy being provided between the calls) and/or release one call and return to the other. |
| Malicious Call Trace (MCT) - enables an MSAT operator to retreive the complete call record at a MET's request for any terminated call in real-time. The operator can identify the calling party to the MET and take appropriate action. |
| Voice Mail (VM) - allows call forwarding to a voice mail box and retreived of messages by the MET. |
| Alternate Accounts Charging (ACC) - allows the MET user to enter in an account code to charge the call to after entering the dialed digits |
| Fully Provision |
| Definition: Supply values to all attributes of a resource |
| Frequency Step Size |
| Definition: Minimum tuning increment acquired for a MET to tune in an assigned channel. CMIS |

| DICTIONARY ITEMS AND DEFINITIONS |
|---|
| will only have the MET Class ID that a particular MET's equipment maps to. NE originates this and other data that describes the MET Class and sends it to the NOC. |
| From MET Call Barring Flags |
| Definition: Describe actions available to a user originating a call from a MET. These call Barring flags relate to specific types of calls at an aggregate level to indicate if the MET can make or receive a call of a particular type. When this list indicates that an Inclusion or Exclusion to particular numbers or area codes is allowed, the values for those restrictions are indicated on a Call Barring List. |
| FTIN |
| Definition: Forward Terminal Identification Number - Downloaded to MET from NOC during commissioning. Used for MET to GC signaling. |
| Internal Data Time Stamp |
| Definition: NOC generated time stamp used for NOC audit purposes. |
| Internal Transaction Id |
| Definition: NOC generated transaction is used for NOC audit purposes. |
| Interim resource |
| Definition: The resource currently being modified by the engineer. Changes made to an interim resource are not added to the working configuration until the resource is committed to the working configuration |
| L Band Beam |
| Definition: Current beam MET is logged into. Determined by the GC during commissioning. CMIS has no role in creating or updating this field. |
| LCC |
| Definition: Line Class Code - type of phone, required by the switch. |
| MCC Class Id |
| Definition: Part of the Event Record received from the NOC. CMIS has no part in creating or updating events - they arrive unsolicited from the NOC. |
| MCC Instance |
| Definition: Part of the Event Record received from the NOC. CMIS has no part in creating or updating events - they arrive unsolicited from the NOC. |
| MCC Instance Id |
| Definition: Part of the Event Record received from the NOC. CMIS has no part in creating or updating events - they arrive unsolicited from the NOC. |
| MCC Instance Type |
| Definition: Part of the Event Record received from the NOC. CMIS has no part in creating or updating events - they arrive unsolicited from the NOC. |
| Message Status 1 |
| Definition: Used in the message initiated by the NOC to acknowledge success or failure of a previously transmitted CMIS request. Used by the DM. |
| Message Status 2 |
| Definition: Used in the message initiated by the NOC to acknowledge success or failure of a previously transmitted CMIS request. Will be used by the DM. |
| Message Verb |
| Definition: Action required at the NOC on data passed in a message from CMIS. This field is in the message relaying the results of a CMIS request. |

| DICTIONARY ITEMS AND DEFINITIONS |
|---|
| Modulation Scheme |
| Definition: Non-standard modulation schemes. CMIS will only have the MET Class ID that a particular MET's equipment maps to. NE/SE originates this and other data that describes the MET Class and sends it to the NOC. |
| MSA |
| Definition: Mobile Servicing Area - identifies the last call's servicing area. Atomic data element within MSR. Transient data maintained in call processing not on the cellular switch table. Same as MSR. |
| MSR |
| Definition: Mobile Servicing Region id (table) contains multiple MSA assignments for the MET. For a roamer, the operator will input the MSR for temporary assignment. Allows up to 1024 cust groups - At CGS startup there will be 1 MSR. |
| MET ASK |
| Definition: Access Key MET must match during call setup/validation. |
| MET Class ID |
| Definition: Identifies the operating characteristics of the MET. Associated to MET by CMIS during registration from data supplied by NE/SE. The technical characteristics the MET Class ID encompasses are not needed by CMIS. These are stored on a table in the NOC and referenced by having the ID on the MET Information record. This ID applies to MET level regardless of how many services, etc. the MET has tied to it. |
| MET Commanded State |
| Definition: Current CGS status of MET. |
| MET Fraud Flag |
| Definition: Indicates fraud has been detected on the MET. Updated by GC and CMIS only. This field is set at the MET level regardless of the number of services, etc. the MET has. |
| MET ID |
| Definition: CMIS assigned unique MET identifier. This can be a unique random number assigned to each MET registered for service. This is a MET level characteristic set once for the MET regardless of how many services, etc. the MET has. The MET ID is used by the NOC to identify METs. It does not have to be used within CMIS as a key field. MET ID cannot be updated once it has been assigned. A MET that reguires a new MET ID for any reason would have to go through the registration process anew. |
| MET Signaling Code |
| Definition: Dialed digits from MET that identifies VN selection. Signaling codes would be assigned when a MET has multiple Virtual Network memberships. After the MET user enters the destination phone number, the pound key is hit and then the signaling code is entered if the caller wants to associated the outbound call with a particular virtual network. When no signaling code is entered, implies default VN be associated with the call. |
| Net Radio Monitor Code |
| Definition: Controls MET responses to specific channels after hang time limit is exceeded. A NR Net selection is made at the MET by the user. |
| Net Radio MET Directory Number |
| Definition: Net radio MET directory number. Assigned during registration. |

| DICTIONARY ITEMS AND DEFINITIONS |
|---|
| Net Radio Net Id |
| Definition: Net ID |
| Net Radio MET Directory Number |
| Definition: Tag number on the MET equipment that identifies a particular net radio net. |
| Pending NVRAM Init Flag |
| Definition: Instructs the GC to download/initialize parameters for a MET. |
| Pending PVT Flag |
| Definition: This flag indicates that a PVT is required following next MET access. If CMIS requests a PVT to help diagnose customer troubles, an update would be sent to NOC with the Flag set to Perform PVT after Next MET access (1). |
| Picsel |
| Definition: Flag indicating if user has asked for a preferred IXC carrier. Carrier name is contained in CARRIER field. |
| Record Type |
| Definition: Type of record defined by object. Part of the Update Results Record. |
| Remote |
| Definition: Remote user - not required by the switch for MSAT Application. |
| Recent Configuration Event |
| Definition: This is a serial list of events received from the NOC that pertain to configuration database changes. |
| Referential Integrity |
| Definition: Database "key field" relationships that bind record within the databases, and create dependencies for additions and deletions of table instances. |
| RF Pin |
| Definition: Remote feature personal identification number. A user is prompted for a pin when attempting to use a remote feature. |
| Roam |
| Definition: Roam Capable - not required by the switch for MSAT Application. |
| RTIN |
| Definition: Reverse Terminal Identification Number which is also the satellite electronic serial number on satellite only and dual mode cellular/satellite METs. This is a unique identifier assigned by manufacturer for each piece of equipment. Within CGS processing the RTIN is used by the GC to signal the MET. |
| Satellite Id |
| Definition: Satellite Id of current L-band beam. The NOC populates this field based on MET commissioning. CMIS does not ever create or update this field. |
| SCM |
| Definition: Station Class Mark. |
| Secure Disable Flat |
| Definition: Channel Unit security check flag. setting this flag to bypass security would disable ASK verification during call processing for a MET. CMIS cannot change this flag. |
| Signaling Priority |
| Definition: Number of MET signaling requests to the GC during network congestion. Assigned at the MET level - each MET may have only one signaling priority regardless of the number of VN memberships it has. The highest priority level is 0 and the lowest is seven. |
| TDM Change Enable Flat |
| Definition: Restriction on MET from changing TDM (TDM is the GSI) |
| Telephone Number |
| Definition: Phone number associated with a call type (voice, data, fax, avd) in a given |

DICTIONARY ITEMS AND DEFINITIONS -continued virtual network.
Template
Definition: An initial set of default attribute
values for each resource being added.
To MET Call Barring Flags
Definition: Describes actions available to a user
receiving a call at their MET.
Trunk Access Priority
Definition: Satellite trunk queuing priority used
during network congestion. Determines
access to channels.
Virtual Network Id
Definition: Identifies the Virtual Network that the
service and feature profiles relate to.
Within a single VN a MET may have one
voice, data, fax and/or avd service type.
Features and restrictions for those
services are defined on the basis of the
METs membership in that VN. If the MET
required an additional instance of a
service that it already subscribed to,
(e.g. a second voice number), a second
virtual network assignment would be
required. Features and restrictions for
that second membership can be defined
with no relation to the existing VN
membership, but all elements that relate
to the MET level cannot change without a
ripple effect to the other services.
VMS Instance Type
Definition: Part of the Event Message
Vocoder Id
Definition: Vocoder version currently installed in
the MET. CMIS will only have the MET
Class ID that a particular METs equipment
maps to. NE/SE originates this and other
data that describes the MET Class and
sends it to the NOC.
Working Configuration
Definition: The set of resources currently being
modified by the engineer. This may be an
existing, complete configuration which
the engineer is modifying, or may be a
new, partial (or initially empty)
configuration.

GLOSSARY

| | |
|---|---|
| A | Availability |
| AAC | Airline Administrative Communications |
| AARM | Access Authentication Request |
| ABH | Average Busy Hour |
| AC | Alternating Current |
| ACU | Access Channel Unit |
| ACU | Antenna Control Unit |
| AD | Attribute Dictionary |
| AEDC | After Effective Date of Contract |
| AFC | Automatic Frequency Control |
| AFS | Antenna/Front-end Subsystem |
| AGC | Automatic Gain Control |
| AIOD | Automatic Number Identification Outward Dialing |
| AMI | Alternative Mark Inversion |
| AMPS | North American Analog and Digital Cellular Networks |
| AMSC | American Mobile Satellite Corporation |
| AMS (R) S | Aeronautical Mobile Satellite (Route) Service |
| AMSS (R) | Aeronautical Mobile Satellite Services (Reserved) |
| ANI | Automatic Number Identification |
| ANSI | American National Standards Institute |
| ANT | Antenna |
| AOC | Aircraft Operational Communications |
| APC | Airline Passenger Communications |
| API | Applications Program Interface |
| AR | Automatic Roaming |
| ARC | Atlantic Research Corporation |
| ASK | Access Security Key |
| ASN.1 | Abstract Syntax Notation One |
| AT | Command set for a DTE to communicate with asynchronous host |
| ATC | Air Traffic Control |
| AVD | Alternate Voice/Data Calls |
| AWGN | Additive White Gaussian Noise |
| AZ | Azimuth |
| B8ZS | Bipolar with 8 Zeros Substitution |
| BB | Bulletin Board |
| BBS | Bulletin Board Service |
| BER | Bit Error Rate |
| BERT | Bit Error Rate Tester |
| BID | Beam Identifier Code |
| BIT | Built In Test |
| BITE | Built-In Test Equipment |
| BPS | Bits Per Second |
| BS | Base Station |
| BSPU | Baseband Signaling Processing Unit |
| BSS | Base Station Switch |
| C/No | Carrier to Noise Power Density Ratio |
| CAC | Channel Access and Control |
| CAF | Call Failure Message |
| CCCS | Command, Control, and Communications Subsystem |
| CCIR | Consultative Committee International de Radio |
| CCITT | Consultative Committee International Telegraph and Telephone |
| CCU | Communications Channel Unit |
| CD | Call Delivery |
| CDR | Call Detail Record |
| CDR | Critical Design Review |
| CDRL | Contract Data Requirements List |
| CE | Common Equipment |
| CG | Control Group |
| CGID | Control Group Identification Number |
| CGS | Communications Ground Segment |
| CHA | Channel Assignment Message |
| CHREL | Channel Release Message |
| CHREQ | Channel Request Message |
| CI | Configuration Item |
| CIBER | Cellular Intercarrier Billing Exchange Roamer |
| CIC | Carrier Identification Code |
| CM | Configuration Management |
| CMIP | Common Management Information System |
| CMIS | Configuration Management Information System |
| CMIS | Customer Management Information System |
| COTS | Commercial off-the-Shelf |
| CP | Circuit Pool |
| CPD | Call Processing Demonstration |
| CPS | Circuit Pool Segment |
| CPU | Central Processing Unit |
| C/PV | Commissioning/Performance Verification |
| CRC | Cyclic Redundancy Check |
| CS | Communications System |
| CSC | Computer Software Component |
| CSCI | Computer Software Configuration Item |
| CSDT | Channel Switchover Detection Time |
| CSF | Critical System Functionality |
| CSMA/CD | Carrier Sense Multiple Access with Collision Detection |
| CSMP | Circuit Switch Management Processor |
| CSMPCS | Circuit Switch Management Data Processor Equipment Communications System |
| CSPU | Channel Signal Processing Unit |
| CSR | CAC Statistics Request |
| CSREP | Call Status Reply Message |
| CSREQ | Call Status Request Message |
| CSU | Computer Software Unit |
| CSUG | Computer Software Unit Group |
| CTB | Customer Test Bed |
| CTN | Cellular Telephone Network |

-continued

GLOSSARY

| | |
|---|---|
| CTN | Cellular Terrestrial Network |
| CTNI | Cellular Telephone Network Interface |
| CU | Channel Unit |
| CUD | Call User Data |
| CUG | Closed User Group |
| CUP | Channel Unit Pool |
| CUS | Channel Unit Subsystem |
| CVR | Cellular Visitor Registration |
| CVRACK | Cellular Visitor Registration Acknowledge |
| CW | Carrier Wave |
| CWCHA | Call Waiting Channel Assignment Message |
| DAMA | Demand Assignment Multiple Access |
| db | Database |
| dbc | Decibel Relative to Carrier |
| dB | decibels |
| dBi | dB Relative to Isotropic |
| dBm | dB relative to 1 milli watt |
| dBW | decibels relative to 1 watt |
| D bit | 'Data Configuration' bit in X.25 |
| DBMS | DataBase Management System |
| dBw | dB Relative to 1 Watt |
| DC | Direct Current |
| DCE | Data Circuit Terminating Equipment |
| DCE | Data Communications Equipment |
| DCL | Digital Command Language |
| DCN | Down CoNverter |
| DCR# | Document Control Release # |
| DCU | Data Channel Unit |
| DD | Design Document |
| DDCMP | Digital Data Communications Message Protocol |
| DDS | Direct Digital Synthesis |
| DEC | Digital Equipment Corporation |
| DECmcc | Digital's Network Management System |
| DEQPSK | Differential Encoded Quadrature Phase Shift Keying |
| DET | Data Equipment Terminal |
| DFD | Data Flow Diagram |
| DH | Data Hub |
| DH-D | Outbound Time Division Multiplex Channel from Data Hub to Mobile Terminal |
| DHP | Data Hub Processor |
| DHSI | DH-D Selector Identification Code |
| DID | Direct Inward Dialing |
| DIDs | Data Item Descriptions |
| DME | Dial-Up Modem Emulation |
| DMQ | DEC Message Queue |
| DMS | Digital Multiplex System |
| DN | Directory Number |
| DNS | Digital Name Service |
| DOC | Canadian Department Of Communications |
| DOD | Direct Outward Dialing |
| DPSK | Differential Phase Shift Keying |
| DQPSK | Differentially Encoded Quadrature Phase Shift Keying |
| DS0 | Digital Service Level Zero (single 64K b/s channel) |
| DS 1 | Digital Service Level One (twenty four voice channels) |
| DSP | Digital Signal Processing |
| DSSS 1 | Digital Subscriber Signaling System 1 |
| DTC | Digital Trunk Controller |
| DTE | Data Terminal Equipment |
| DTE | Data Terminal Element |
| DTMF | Dual Tone Multiple Frequency |
| DVSI | Digital Voice Systems, Inc. |
| Eb/No | Bit Energy to Noise Power Density Ratio |
| ECN | Engineering Change Notice |
| EFD | EF Data, Inc. |
| EFTIN | Encrypted Forward Terminal Identification Number |
| E-I | Exchange - Interexchange |
| EIA | Electronic Industries Association |
| EICD | Element Interface Control Document |
| EIE | External Interface Equipment |
| EIRP | Equivalent Isotropic Radiated Power |
| El | Elevation |
| EMC | ElectroMagnetic Compatibility |
| EMI | ElectroMagnetic Interference |
| eng | engineer or engineering |
| EO | End Office |
| EO | External Organizations |
| EOD | End of Data |
| ESN | Electronic Serial Number |
| FAX | Facsimile |
| FCA | Functional Configuration Audit |
| FCC | Federal Communications Commission |
| FCS | Fading Channel Simulator |
| FDMA | Frequency Division Multiple Access |
| FEC | Forward Error Correction |
| FES | Feederlink Earth Station |
| FES-C | Inbound Communication channel from Feederlink Earth Station to Mobile Terminal |
| FES-I | Interstation signaling channel from Feederlink Earth Station to Group Controller |
| FES/MT | Feederlink Earth Station/Mobile Terminal |
| FES-RE | Feederlink Earth Station-Radio Frequency Equipment |
| FES-TE | Feederlink Earth Station Terminal Equipment |
| FFT | Fast Fourier Transform |
| FIS | Feederlink Earth Station Interface Simulator |
| FIT | Fault Isolation Tests |
| FIU | Fax Interface Unit |
| FMT | Fixed Mobile Terminal |
| FMA | Field Programmable Gate Array |
| FPMH | Failures per Million Hours |
| FRO | Frequency Reference Oscillator |
| FT | Fault Tolerant |
| FTE | Fax Terminal Equipment |
| FTIN | Forward Terminal Identification Number |
| G/T | Gain to System Noise Ratio |
| GBF | Gateway/Base Function |
| GBS | Gateway Base System |
| GC | Group Controller |
| GC-I | Interstation signaling channel from Group Controller to Feederlink Earth Station |
| GC-S | Time Division Multiplex Signaling channel from Group Controller to Mobile Terminal |
| GCSST | GC-S Search Time |
| GEN | Generator |
| GHz | Giga (1,000,000,000) Hertz (cycles per second) |
| GMACS | Graphical Monitor And Control System |
| GPIB | General Purpose Instrument Bus |
| GPS | Global Positioning System |
| GS | Gateway Station |
| GSI | GC-S Selector Identifier |
| GW | Gateway |
| GWS | Gateway Switch |
| GWS/BSS | Gateway Switch/Base Station Switch |
| H/W | Hardware |
| HCHREQ | Handoff Channel Request |
| HDP | Hardware Development Plan |
| HLR | Home Location Register |
| HMI | Human Machine Interface |
| HOT | Hand-off Test |
| HPA | High Power Amplifier |
| HRS | Hardware Requirements Specification |
| HWCI | Hardware Configuration Item |
| HW/SW | Hardware/Software |
| Hz | Hertz |
| I | In Phase channel |
| IAW | In Accordance With |
| IC | Interexchange Carrier |
| ICD | Interface Control Document |
| ICI | Instrument Control Interface |
| ICP | Intelligent Cellular Peripheral |
| ICU | Interstation Channel Unit |
| ICWG | Interface Control Working Group/Interface Coordination Working Group |
| ID | Identification |
| IEEE | Institute of Electrical and Electronics Engineers |
| IF | Intermediate Frequency |
| IFIS | Intermediate Frequency Subsystem |

GLOSSARY -continued

| | |
|---|---|
| IFL | Interfacility Link |
| IF IFL | Intermediate Frequency Internal Facility Link |
| IHO | Interstation Hand-Off |
| IICD | Internal Interface Control Document |
| IICWG | Internal Interface Control Working Group |
| IM | Intermodulation |
| IMBE | Improved Multiband Excitation |
| IOC | Input/Output Controller |
| IP | Internet Protocol |
| ISCU | Interstation Signaling Channel Unit/Interstation Channel Unit |
| ISDN | Integrated Services Digital Network |
| ISL | Interstation Signaling Link |
| ISO | International Standards Organization |
| IVDCPD | Integrated Voice & Data Call Processing Demonstration |
| IVDM | Integrated Voice/Data Mobile Terminal |
| KBPS | Kilo (1,000) Bits per Second |
| kHz | Kilohertz |
| KLNA | K-band Low Noise Amplifier |
| KP | Key Pulse |
| LAN | Local Area Network |
| LAP | Link Access Procedure |
| LAPB | Link Access Procedure using a balanced mode of operation |
| LATA | Local Access and Transport Area |
| LBP | Local Blocking Probability |
| LCN | Logical Channel Number |
| LLCSC | Lower Level Computer Software Component |
| LLNA | L-band Lowe Noise Amplifier |
| LLS | Lower Level Specification |
| LNA | Low Noise Amplifier |
| LOI | Level of Integration |
| LPP | Link Peripheral Processor |
| LRU | Line Replaceable Unit |
| LRU | Lowest Replaceable Unit |
| LSSGR | Loyal Access and Transport Area Switching Systems Generic Requirements |
| MAP | Maintenance Administrative Position |
| MAP | Mobile Application Part |
| M bit | 'More Data' bit in X.25 |
| M&C | Monitor and Control |
| MCC | Management Control Center |
| MCGID | Mobile Data Service Control Group Identification Number |
| MDLP | Mobile Data Service Data Link Protocol |
| MDS | Mobile Data Service |
| MDSR | MDLP Statistics Request |
| MEA | Failure Modes and Effects Analysis |
| MEF | Minimum Essential Functionality |
| MELCO | Mitsubishi Electronic Company |
| MET | Mobile Earth Terminal (a.k.a. MT) |
| MET-C | Communication Channel Between Mobile Terminal and Feederlink Earth Station |
| MET-DRd | Inbound Slotted Aloha Data Channel |
| MET-DRr | Inbound Slotted Aloha Reservation Channel |
| MET-DT | Inbound Packet Time Division Multiple Access Channel |
| MET-SR | Random Access Signaling Channel from Mobile Terminal to Group Controller |
| MET-ST | Time Division Multiple Access signaling channel from Mobile Terminal to Group Controller |
| MF | Multiple Frequency |
| MFID | Manufacturer Identification |
| MGSP | Mobile Terminal to Group Controller Signaling Protocol |
| MHz | Mega Hertz (cycles per second) |
| MIB | Management Information Base |
| MIR | Management Information Region |
| MIRQ | MT Initialization Request |
| MIS | Mobile Terminal Interface Simulator |
| MIS | Mobile Earth Terminal Interface Simulator |
| ML | Message Layer |
| MLCSC | Mid Level Computer Software Component |
| MLP | Multilink Procedure |
| MMI | Man Machine Interface |

GLOSSARY -continued

| | |
|---|---|
| MMRS | Mobile Road Service |
| MMSS | Maritime Mobile Satellite Services |
| MNMS | Mobile Data Service Network Management Subsystem |
| MNP | Multi Network Protocol |
| MODEM | MODulator/DEModulator |
| MOS | Mean Opinion Score |
| MOV | Method of Verification |
| MPLP | Mobile Data Service Packet Layer Protocol |
| MPR | MPR Teltech Inc. |
| MRI | Minimum Request Interval |
| MRS | Mobile Radio Service |
| MSAT | Mobile Satellite |
| MSC | Mobile Switching Center |
| MSS | Mobile Satellite Service |
| MSSP | Mobile Terminal Specialized Services Protocol |
| ms | millisecond |
| MT | Mobile Terminal |
| MT-C | Communication Channel Between Mobile Terminal and Feederlink Earth Station |
| MT-DRd | Inbound Slotted Aloha Data Channel |
| MT-DRr | Inbound Slotted Aloha Reservation Channel |
| MT-DT | Inbound Packet Time Division Multiple Access Channel |
| MT/NR | Mobile Terminal/Net Radio |
| MT ASK | Mobile Terminal Access Security Key |
| MTBF | Mean-Time Between Failures |
| MTBRA | Mean-Time Between Restoral Actions |
| MTCRS | Mobile Telephone Cellular Roaming Service |
| MT-MET | Mobile Terminal to Mobile Terminal |
| MT-MT | Mobile Terminal to Mobile Terminal |
| MTP | Mobile Data Service Transaction Protocol |
| MT-PSTN | Mobile Terminal/Public Switched Telephone Network |
| MTS | Mobile Telephone Service |
| MT-SR | Random Access Signaling Channel from Mobile Terminal to Group Controller |
| MTSR | MTP Statistics Request |
| MT-ST | Time Division Multiple Access Signaling Channel from Mobile Terminal to Group Controller |
| MTTR | Mean-Time to Repair |
| MTX | Mobile Telephone Exchange |
| MULP | Mobile Data Service Unacknowledged Link Protocol |
| MUSR | MULP Statistics Request |
| NACN | North American Cellular Network |
| NADP | North American Dialing Plan |
| NANP | North American Numbering Plan |
| NAP | Network Access Processor |
| NAP-C | Network Access Processor for the Communications Channel |
| NAP-CU | Network Access Processor-Channel Unit |
| NAP-D | Network Access Processor for the Data Channel |
| NAP-N | Network Access Processor for the Network Radio Channel |
| NAP-S | Network Access Processor for the Signaling Channel |
| NAS | Network Access Subsystem |
| NASP | National Aerospace Plan |
| NCC | Network Communications Controller |
| NCC | Network Control Center |
| NCC-RE | Network Communications Controller Radio frequency Equipment |
| NCC-TE | Network Communications Controller Terminal Equipment |
| NCS | Network Control System |
| NCU | Net Radio Control Unit |
| NCU | Net Radio Channel Unit |
| NE | Network Engineering |
| NEBS | New Equipment Building System |
| NE/SE | Network Engineering/System Engineering |
| NIM | Network Module |
| NM | Network Module |
| NMP | Network Management Process |
| NMS | Network Management System |
| NMS/CMIS | Network Management System/Customer Management |

GLOSSARY -continued

| | |
|---|---|
| | Information System |
| NOC | Network Operations Center |
| NOC-FES | Network Operations Center-Feederlink Earth Station |
| NPA | Numbering Plan Area |
| NR | Net Radio |
| NRCHA | Net Radio Channel Assignment |
| NRCHREL | Net Radio Channel Release |
| NRCHREQ | Net Radio Channel Request |
| NRDVI | Net Radio Dispatcher Voice Interface |
| NRS | Net Radio Service |
| NRZ | Non-Return to Zero |
| NT | Northern Telecom |
| NTL | Northern Telecom Limited |
| NTP | Northern Telecom Practice |
| NVM | Non-Volatile Memory |
| OA&M | Operation, Administration, and Maintenance |
| O&M | Operations and Maintenance |
| OJJ | On the Job Training |
| OM | Operational Measurements (from GWS) |
| OS | Operating System |
| OSF | Open Software Foundation |
| OSI | Open Systems Interconnection |
| OSR | Operational Support Review |
| PA | Product Assurance |
| PAC | Pre-emption Acknowledge Message |
| PAD | Packet Assembler/Disassembler |
| PAP | Product Assurance Plan |
| PBX | Private Branch Exchange |
| PC | Process Control |
| PCM | Pulse Code Modulation |
| PC-RFMCP | PC Based RFM Control Processor |
| PC-SCP | PC Based Systems Control Processor |
| PCSTR | Physical Channel Statistics Request |
| PCT | Provisioning Criteria Table |
| PCU | Pilot Control Unit |
| PCU | Pilot Channel Unit |
| PDAMA | Priority Demand Assignment Multiple Access |
| PDN | Packet Data Network |
| PDR | Preliminary Design Review |
| PDU | Protocol Data Unit |
| PE | Protocol Extension |
| PER | Packet Error Rate |
| PERSP | Packet Error Rate Sample Period |
| PERT | Packet Error Rate Threshold |
| PIP | Program Implementation Plan |
| PLP | Packet Layer Protocol |
| PLT | Pilot |
| PMR | Project Management Review |
| PMT | Pre-emption Message |
| PN | Private Network |
| PN | Pseudo Noise |
| PNIC | Private Network Identification Code |
| PPM | Pulses per Minute |
| PS | Processor Subsystem |
| PSDN | Private Switched Data Network |
| PSDN | Public Switched Data Network |
| PSTN | Public Switched Telephone Network |
| PTT | Push-To-Talk |
| PVC | Performance Virtual Circuit |
| PVT | Permanent Verification Test/Performance Verification Test |
| Q | Quadrature Phased Channel |
| QA | Quality Assurance |
| Q bit | 'Qualified Data' bit in X.25 |
| QPSK | Quadrature Phase Shift Keying |
| RAM | Random Access Memory |
| RAM | Reliability, Availability, Maintainability |
| RDB | Relational DataBase |
| REMS | Remote Environmental Monitoring System |
| Req | Requirement |
| Rev | Revision |
| RF | Radio Frequency |
| RFE | Radio Frequency Equipment |
| RF IFL | Radio Frequency Inter Facility Link |
| RFM | Radio Frequency Monitor |
| RFP | Request For Proposal |
| RFS | Radio Frequency Subsystem |
| RHCP | Right Hand Circularly Polarized |
| RMS | Remote Monitoring Station |
| RMS | Remote Monitor Subsystem |
| RNO | Remote NOC Operator |
| ROM | Read Only Memory |
| RR | Receiver Ready |
| RS | Requirements Specification |
| RS-232C | Electronics Industry Standard for unbalanced data circuits |
| RSP | Radio Standard Procedure |
| RTIN | Reverse Terminal Identification Number |
| RTM | Requirements Traceability Matrix |
| RTP | Reliable Transaction Protocol |
| RTR | Reliable Transaction Router |
| RTS | Reliable Transaction Service |
| RTS | Receiver/Tuner System |
| Rx | receive |
| S/W | Software |
| SCADA | Supervisory Control and Data Acquisition |
| SCCP | Signaline Connection Control Part |
| SCPC | Single Channel Per Carrier |
| SCR | Software Change Request |
| SCS | System Common Software |
| SCU | Signaling Channel Unit |
| SDD | Software Design Description |
| SDID | Seller Data Item Description |
| SDLC | Synchronous Data Link Control |
| SDP | Software Development Plan |
| SDPAP | Software Development Product Assurance Plan |
| SDR | System Design Review |
| SDRL | Seller Data Requirements List |
| SE | Systems Engineering |
| SEC | Setup Complete Message |
| SEDP | Software Engineering Development Plan |
| SEE | Software Engineering Environment |
| SEEP | Software Engineering Environment Plan |
| SID | System Identifier Code |
| SIF | System Integration Facility |
| SIT | Special Information Tones |
| SLOC | Source Lines of Code |
| SLSS | Station Logic and Signaling Subsystem |
| SM | Site Manager |
| SMAC | Station Monitor Alarm and Control Subsystem |
| SMDS | Satellite Mobile Data Service |
| SMP | Software Management Plan |
| SMRS | Satellite Mobile Radio Service |
| SMSC | Satellite Mobile Switching Center |
| SMTS | Satellite Mobile Telephone Service |
| SNA | Systems Network Architecture |
| SNAC | Satellite Network Access Controller |
| SNACS | Satellite Network Access Controller Subsystem |
| SNMP | Simple Network Management Protocol |
| SNR | Signal to Noise Ratio |
| SOC | Satellite Operation Center |
| SOW | Statement of Work |
| SP | Start Pulse |
| SPAP | Software Product Assurance Plan |
| SPP | Satellite Protocol Processor |
| SQL | Software Query Language |
| SRR | Systems Requirements Review |
| SRS | Software Requirements Specification |
| SS7 | Signaling System No. 7 |
| SSA | Sloppy Slotted Aloha |
| SSTS | Satellite Transmission Systems, Inc. |
| STP | Signal Transfer Point |
| STP | System Test Program |
| STS | System Test Station. |
| STSI | Satellite Transmission Systems, Inc. |
| SU | Signaling Unit |
| SUES | Shared-Use Earth Station |
| SVC | Switched Virtual Circuit |
| SVVP | Software Verification and Validation Plan |
| SVVPR | Software Verification and Validation Plan Review |
| S/W | Software |
| [TI] | Top Level Specification |

-continued

GLOSSARY

| | |
|---|---|
| T-1 | Digital Transmission link, 1.544 Mega-bits per second |
| TCP/IP | Transmission Control Protocol/Internet Protocol |
| TCAP | Transactions Capabilities Application Part |
| TCF | Training Check Frame |
| TD | Transmission Demonstration |
| TDM | Time Division Multiplex |
| TDMA | Time Division Multiple Access |
| TDMSI | Time Division Multiplex Selector ID |
| TE | Terminal Equipment |
| Telecom | Telephonic Communications |
| TDM | Time Division Multiplex |
| TDMA | TDM Access |
| TID | Terminal Identification |
| TIM | Timing |
| TIM | Technical Interchange Meeting |
| TIN | Terminal Identification Number |
| TIS | Terrestrial Interface Subsystem |
| TLCSC | Top Level Computer Software Component |
| TLS | Top Level Specification |
| TMI | Telesat Mobile Incorporated |
| TMS | Test and Monitor Station |
| TNI | Terrestrial Network Interface |
| TPP | Test Plan and Procedure |
| TT&C | Telemetry, Tracking and Control |
| Tx | Transmit |
| UCN | Up CoNverter |
| UDS | Unacknowledged Data Delivery Service |
| UIS | User Interface Subsystem |
| UPC | Uplink Power Control |
| UTR | Universal Tone Receiver |
| UW | Unique Words |
| V&V | Verification and Validation |
| VAC | Value-Added Carrier |
| VAX | Model Identification of a Digital Equipment Corporation system |
| VAX | Virtual Address eXtension (proprietary name used by DEC for some of its computer systems) |
| VCN | Virtual Circuit Number |
| VF | Voice Frequency |
| VLR | Visitor Location Register |
| VN | Virtual Network |
| VPN | Virtual Private Network |
| VUP | VAX Unit of Processing |
| V.22bis | Modem Standard for 24()0 Baud Service Over Telephone Lines |
| V.25 | Procedure for setting up a data connection on the Public Switched Telephone Network |
| V.26, V.28 | Electrical specification of interchange circuits at both the Data Terminal Equipment and Data Communications Equipment sides of the interface (similar to RS-232-C) |
| V.32 | High Speed Serial Link, Physical Layer Definition |
| V.35 | X.25 physical layer interface used to access wideband channels (at data rates up to 64kbit/s) |
| WAN | Wide Area Network |
| XCR | X.25 Configuration Request |
| XICD | External Interface Control Document |
| XICWG | External Interface Control Working Group |
| X.3 | Specification for facilities provided by the Packet Assembler/Disassembler |
| X.21 | X.25 physical layer interface for Data Terminal Equipment and Data Communications Equipment using synchronous transmission facilities |
| X.21bis | X.25 physical layer interface for Data Terminal Equipment designed for interfacing to synchronous V-series modems to access data networks |
| X.25 | Specification for interface between Data Terminal Equipment and Data Communications Equipment for terminals operating in packet mode |
| X.28 | Specification for interaction between loval terminal and Packet Assembler/Disassembler |
| X.29 | Specification for interaction between Packet Assembler/Disassembler and remote packet mode terminal |

We claim:

1. In a mobile satellite system including a satellite communication switching office and network system having a satellite antenna for receiving and transmitting a satellite message via a satellite and satellite beams to and from feederlink earth stations (FESs) and mobile earth terminals (METs) using a mobile communication system, a satellite interface system, a central controller receiving and transmitting the satellite message to and from the satellite communication switching office, the mobile satellite system being responsively connected to said mobile communication system and comprising:

a network operations center (NOC) managing and controlling the resources of the satellite network system and carrying out the administrative functions associated with the management of the network system, the NOC communicating with various internal and external entities via a control network;

a first network communications controller (NCC) managing the real time allocation of circuits between METs and FESs for the purposes of supporting communications, available circuits being held in circuit pools managed by group controllers (GCs) within the NCC, the NCC communicating with the NOC via a satellite network internetwork, with FESs via Ku-to-Ku band interstation signaling channels or terrestrial links, and with METs via Ku-to-L band signaling channels;

a FES supporting communications links between METs, the public switched telephone network (PSTN), private networks, and other METs, call completion and service feature management being accomplished via in-band signaling over the communication channel following the establishment of such a channel, the FES including a gateway FES providing mobile telephone service (MTS) and mobile telephone cellular roaming service (MTCRS) services, and a base FES providing mobile radio service (MRS) and net radio (NR) services;

a customer management information system providing customers and service providers with assistance and information including problem resolution, service changes, and billing/usage data, customers including individual MET owners and fleet managers of larger corporate customers;

a network engineering system developing network plans and performing analysis in support of the system including analyzing the requirements of the network, reconciling expected traffic loads with the capability and availability of space and ground resources to produce frequency plans for the different beams within the system, and defining contingency plans for failure situations;

a system engineering system engineering the network subsystems, equipment and software which is needed to expand capacity to meet increases in traffic demands and to provide new features and services;

a remote monitor station (RMS) monitoring L-band RF spectrum and transmission performance in specific L-band beams, said RMS being nominally located in each L-band beam and interfacing with the NOC via either a satellite or terrestrial link;

a system test station (STS) providing an L-band network access capability to support FES commissioning tests and network service diagnostic tests, the STS being collocated with and interfaced to the NOC;

a group controller subsystem (GCS) incorporating one or multiple group controllers (GC), each GC maintaining state machines for every call in progress within its control group and allocating and de-allocating circuits for FES-MET calls within each beam of the system, managing virtual network call processing, MET authentication, and providing certain elements of call accounting, the GC providing satellite bandwidth resources to the NOC for AMS(R)S resource provisioning and monitoring the performance of call processing and satellite circuit pool utilization, and performing MET management, commissioning and periodic performance verification testing and database management.

2. A mobile satellite system according to claim 1 wherein said database management includes management of:

mobile earth station databases;

virtual network databases;

circuit pool databases;

network identification databases;

circuit counters and queue tables; and call record tables.

3. A mobile satellite system according to claim 1 wherein said mobile satellite system includes a second NCC which maintains communication with said NOC and said first NCC and maintains database concurrence across the two NCCs, receives call processing information from said first NCC on a call-by-call basis, and maintains call records and frequency allocations dynamically such that said second NCC can substantially immediately assume control of an in-process call setups and old call releases.

4. A mobile satellite system according to claim 1 wherein the GC supports GC controller (GCC) processes and control group manager (CGM) processes, the CGM processes functioning independently and managing multiple control groups.

5. A mobile satellite system according to claim 1 wherein a GC performs th e following processes:

configuration including processing control group reconfigurations, serving as a server in NOC initiated updates and as a requester in GC initiated database updates;

processing AMS(R)S provisioning requests from the NOC;

call processing; and

GC router configuration.

6. A mobile satellite system according to claim 1 wherein said mobile satellite system includes a second NCC which maintains communication with said NOC and said first NCC and maintains database concurrence across the two NCCs, receives call processing information from said first NCC on a call-by-call basis, and maintains call records and frequency allocations dynamically such that said second NCC may be substituted for said first NCC as a scheduled activity or upon failure of the online NCC.

7. A mobile satellite system according to claim 6 wherein the scheduled substitution of said second NCC includes the following steps:

alerting the online NCC to initiate processing phaseout and suspend active communication with its associated CGS internal element;

the online NCC alerting the off-line NCC that all processing has been suspended and all elements associated with the NCC are waiting for a communication restart;

the off-line NCC commanding the on-line NCC to go to passive standby under its own local operator control;

the new on-line NCC beginning a communication restart sequence with its associated CGS elements.

8. A mobile satellite system according to claim 6 wherein the fail over substitution of said second NCC includes the following steps:

the on-line NOC commanding the on-line NCC to go to passive standby under local operator control;

the on-line NOC commanding the off-line NCC to go active;

the on-line NOC commanding all NCC associated elements to suspend communication with the old on-line NCC and await an NCC communications restart command;

the on-line NOC commanding the new on-line NCC to begin a communications restart with all of its associated elements;

the new on-line NCC beginning a communications restart sequence with all of its associated elements.

9. In a mobile satellite system including a satellite communication switching office and network system having a satellite antenna for receiving and transmitting a satellite message via a satellite to and from a mobile earth station including a mobile communication system, a satellite interface system, a central controller receiving and transmitting the satellite message from the mobile earth station to and from the satellite communication switching office via the satellite and the satellite interface system, the mobile communication system comprising:

a user interface system providing a user interface through which a user has access to services supported by the mobile satellite system;

an antenna system providing an interface between the mobile communication system and the mobile satellite system via the satellite interface system, said antenna system receiving a first satellite message from the satellite and transmitting a second satellite message to the satellite;

said mobile satellite system being responsively connected to said mobile communication system, said mobile satellite system comprising:

a network operations center (NOC) managing and controlling the resources of the satellite network system and conducting the administrative functions associated with the management of the satellite network system, the NOC communicating with various internal and external entities via a control network;

a first network communications controller (NCC) managing the allocation of circuits between said mobile communication system and said satellite switching office for supporting communications, available circuits being held in circuit pools managed by at least one Group Controller (GC) in said NCC, said NCC communicating with said NOC via said control network;

said GC including components which control:

call setup and monitoring;

management of satellite resources during call setup and cleardown;

database management;

call record management;

congestion control;

generation of performance and traffic statistics; and periodic performance verification testing.

10. A mobile satellite system according to claim 9 wherein said database management includes management of:

mobile earth station databases;

virtual network databases;

circuit pool databases;

network identification databases;

circuit counters and queue tables; and call record tables.

11. A mobile satellite system according to claim 9 wherein said mobile satellite system includes a second NCC which maintains communication with said NOC and said first NCC and maintains database concurrence across the two NCCs, receives call processing information from said first NCC on a call-by-call basis, and maintains call records and frequency allocations dynamically such that said second NCC can substantially immediately assume control of an in-process call setups and old call releases.

12. A mobile satellite system according to claim 9 wherein said mobile satellite system includes a second NCC which maintains communication with the NOC and the NCC and maintains database concurrence across the two NCCs, receives call processing information from said first NCC on a call-by-call basis, and maintains call records and frequency allocations dynamically such that said second NCC may be substituted for said first NCC as a scheduled activity or upon failure of the online NCC.

13. A mobile satellite system according to claim 12 wherein the scheduled substitution of said second NCC includes the following steps:

alerting the online NCC to initiate processing phaseout and suspend active communication with its associated CGS internal element;

the online NCC alerting the off-line NCC that all processing has been suspended and all elements associated with the NCC are awaiting a communication restart;

the off-line NCC commanding the on-line NCC to go to passive standby under its own local operator control;

the new on-line NCC beginning a communication restart sequence with its associated CGS elements.

14. A mobile satellite system according to claim 9 wherein the fail over substitution of said second NCC includes the following steps:

the on-line NOC commanding the on-line NCC to go to passive standby under local operator control;

the on-line NOC commanding the off-line NCC to go active;

the-on-line NOC commanding all NCC associated elements to suspend communication with the old on-line NCC awaiting an NCC communications restart command;

the on-line NOC commanding the new on-line NCC to begin a communications restart with all of its associated elements;

the new on-line NCC beginning a communications restart sequence with all of its associated elements.

15. A mobile satellite system according to claim 9 wherein the GC supports GC controller (GCC) processes and control group manager (CGM) processes, the CGM processes functioning independently and managing multiple control groups.

16. A mobile satellite system according to claim 9 wherein a GC performs the following processes:

configuration including processing control group reconfigurations, serving as a server in NOC initiated updates and as a requester in GC initiated database updates;

processing AMS(R)S provisioning requests from the NOC;

call processing; and

GC router configuration.

17. A mobile satellite system, comprising:

a network operations center (NOC) administering the resources of the satellite network system and administrative functions associated with the management of the network system, the NOC communicating with at least one of internal and external entities;

a first network communications controller (NCC) managing allocation of circuits between METs and FESs for the purposes of supporting communications, available circuits being managed by group controllers (GCs) within the NCC;

a FES maintaining communications links between METs, the public switched telephone network (PSTN), optionally private networks, and other METs, call completion and service feature management being accomplished over the communication channel, the FES including at least one of a gateway FES providing mobile telephone service (MTS) and mobile telephone cellular roaming service (MTCRS) services, and a base FES providing mobile radio service (MRS) and net radio (NR) services;

a customer management information system providing at least one of customers and service providers with information including at least one of problem resolution, service changes, and billing/usage data, customers including at least one of individual MET owners and fleet managers of larger corporate customers;

a network engineering system developing at least one of network plans and performing analysis in support of the system including at least one of analyzing the requirements of the network, reconciling expected traffic loads with the capability and availability of space and ground resources to produce frequency plans for the different beams within the system, and defining contingency plans for failure situations;

a system engineering system engineering at least one of the network subsystems, equipment and software to expand capacity to meet increases in traffic demands and to provide new features and services;

an optional remote monitor station (RMS) monitoring spectrum and transmission performance, said RMS being located in each beam and interfacing with the NOC via either a satellite or terrestrial link;

an optional system test station (STS) providing at least one of network access capability to support FES commissioning tests and network service diagnostic tests, the STS being optionally collocated with and interfaced to the NOC;

a group controller subsystem (GCS) incorporating one or multiple group controllers (GC), each GC at least one of managing every call in progress within its control group, allocating and de-allocating circuits for calls, managing virtual network call processing, performing MET authentication, and providing call accounting, the GC optionally providing satellite bandwidth resources to the NOC for AMS(R)S resource provisioning, monitoring the performance of call processing and satellite circuit pool utilization, and performing MET management, commissioning and periodic performance verification testing and database management.

18. A mobile satellite system according to claim 17 wherein said database management includes management of:
mobile earth station databases;
virtual network databases;
circuit pool databases;
network identification databases;
circuit counters and queue tables; and
call record tables.

19. A mobile satellite system according to claim 17 wherein said mobile satellite system includes a second NCC which maintains communication with said NOC and said first NCC and maintains database concurrence across the two NCCs, receives call processing information from said first NCC on a call-by-call basis, and maintains call records and frequency allocations dynamically such that said second NCC can substantially immediately assume control of an in-process call setups and old call releases.

20. A mobile satellite system according to claim 17 wherein the GC supports GC controller (GCC) processes and control group manager (CGM) processes, the CGM processes functioning independently and managing multiple control groups.

21. A mobile satellite system according to claim 17 wherein a GC performs the following processes:
configuration including processing control group reconfigurations, serving as a server in NOC initiated updates and as a requester in GC initiated database updates;
processing AMS(R)S provisioning requests from the NOC;
call processing; and
GC router configuration.

22. A mobile satellite system according to claim 17 wherein said mobile satellite system includes a second NCC which maintains communication with said NOC and said first NCC and maintains database concurrence across the two NCCs, receives call processing information from said first NCC on a call-by-call basis, and maintains call records and frequency allocations dynamically such that said second NCC may be substituted for said first NCC as a scheduled activity or upon failure of the online NCC.

23. A mobile satellite system according to claim 22 wherein the scheduled substitution of said second NCC includes the following steps:
alerting the online NCC to initiate processing phaseout and suspend active communication with its associated CGS internal element;
the online NCC alerting the off-line NCC that all processing has been suspended and all elements associated with the NCC are waiting for a communication restart;
the off-line NCC commanding the on-line NCC to go to passive standby under its own local operator control;
the new on-line NCC beginning a communication restart sequence with its associated CGS elements.

24. A mobile satellite system according to claim 22 wherein the failure substitution of said second NCC includes the following steps:
the on-line NOC commanding the on-line NCC to go to passive standby under local operator control;
the on-line NOC commanding the off-line NCC to go active;
the on-line NOC commanding all NCC associated elements to suspend communication with the old on-line NCC and await an NCC communications restart command;
the on-line NOC commanding the new on-line NCC to begin a communications restart with all of its associated elements;
the new on-line NCC beginning a communications restart sequence with all of its associated elements.

25. A mobile satellite system, comprising:
a network operations center (NOC) means for managing and controlling the resources of the satellite network system and for conducting the administrative functions associated with the management of the mobile satellite system, the NOC means for communicating with at least one of internal and external entities;
a first network communications controller (NCC) means for managing the allocation of circuits for supporting communications, available circuits being managed by at least one Group Controller (GC) means in said NCC means, said NCC means for communicating with said NOC means via said control network, said GC means including components for controlling:
call setup and monitoring;
management of satellite resources during call setup and cleardown;
database management;
call record management;
congestion control;
generation of performance and traffic statistics; and
periodic performance verification testing.

26. A mobile satellite system according to claim 25 wherein said database management includes management of:
mobile earth station databases;
virtual network databases;
circuit pool databases;
network identification databases;
circuit counters and queue tables; and
call record tables.

27. A mobile satellite system according to claim 25 wherein said mobile satellite system includes a second NCC means for maintaining communication with said NOC means and said first NCC means and for maintaining database concurrence across the two NCC means, for receiving call processing information from said first NCC means on a call-by-call basis, and maintaining call records and frequency allocations dynamically such that said second NCC means can substantially immediately assume control of an in-process call setups and old call releases.

28. A mobile satellite system according to claim 25 wherein said mobile satellite system includes a second NCC means for maintaining communication with the NOC means and the NCC means and for maintaining database concurrence across the two NCC means, for receiving call processing information from said first NCC means on a call-by-call basis, and for maintaining call records and frequency allocations dynamically such that said second NCC means may be substituted for said first NCC means as a scheduled activity or upon failure of the online NCC means.

29. A mobile satellite system according to claim 28 wherein the scheduled substitution of said second NCC means includes the following steps:

alerting the online NCC means to initiate processing phaseout and suspend active communication with its associated CGS internal element;

the online NCC means alerting the off-line NCC means that all processing has been suspended and all elements associated with the NCC means are awaiting a communication restart;

the off-line NCC means commanding the on-line NCC means to go to passive standby under its own local operator control;

the new on-line NCC means beginning a communication restart sequence with its associated CGS elements.

30. A mobile satellite system according to claim 25 wherein the fail over substitution of said second NCC means includes the following steps:

the on-line NOC means commanding the on-line NCC means to go to passive standby under local operator control;

the on-line NOC means commanding the off-line NCC means to go active;

the on-line NOC means commanding all NCC means associated elements to suspend communication with the old on-line NCC means awaiting an NCC means communications restart command;

the on-line NOC means commanding the new on-line NCC means to begin a communications restart with all of its associated elements;

the new on-line NCC means beginning a communications restart sequence with all of its associated elements.

31. A mobile satellite system according to claim 25 wherein the GC supports GC controller (GCC) processes and control group manager (CGM) processes, the CGM processes functioning independently and managing multiple control groups.

32. A mobile satellite system according to claim 25 wherein a GC performs the following processes:

configuration including processing control group reconfigurations, serving as a server in NOC initiated updates and as a requester in GC initiated database updates;

processing AMS(R)S provisioning requests from the NOC;

call processing; and

GC router configuration.

33. In a mobile satellite system, including a network operations center (NOC) managing and controlling the resources of the satellite network system and conducting the administrative functions associated with the management of the mobile satellite system, the NOC communicating with at least one of internal and external entities; and a first network communications controller (NCC) managing the allocation of circuits for supporting communications, available circuits being managed by at least one Group Controller (GC) in said NCC, said NCC communicating with said NOC via said control network, a method performed by said GC comprising the sequence independent steps of:

(a) a step for call setup and monitoring;

(b) a step for management of satellite resources during call setup and cleardown;

(c) a step for database management;

(d) a step for call record management;

(e) a step for congestion control;

(f) a step for generation of performance and traffic statistics; and (g) a step for periodic performance verification testing.

34. A mobile satellite system, comprising:

a network operations center (NOC) means for managing and controlling the resources of the satellite network system and carrying out the administrative functions associated with the management of the network system, the NOC means for communicating with at least one of internal and eternal entities;

a first network communications controller (NCC) means for managing the real time allocation of circuits between METs and Feeder Link Earth Stations (FESs) for the purposes of supporting communications, available circuits being managed by group controllers (GCs) within the NCC;

a FES means for supporting communications links between METs, the public switched telephone network (PSTN), private networks, and other METs, call completion and service feature management being accomplished over the communication channel, the FES means for including at least one of a gateway FES means for providing mobile telephone service (MTS) and mobile telephone cellular roaming service (MTCRS) services, and a base FES means for providing mobile radio service (MRS) and net radio (NR) services;

a customer management information means for providing at least one of customers and service providers with assistance and information including at least one of problem resolution, service changes, and billing/usage data, customers including at least one of individual MET owners and fleet managers of larger corporate customers;

a network engineering means for developing at least one of network plans and performing analysis in support of the system including at least one of analyzing the requirements of the network, reconciling expected traffic loads with the capability and availability of space and ground resources to produce frequency plans for the different beams within the system, and defining contingency plans for failure situations;

a system engineering means for engineering at least one of the network subsystems, equipment and software which is needed to expand capacity to meet increases in traffic demands and to provide new features and services;

a group controller subsystem (GCS) means for incorporating one or multiple group controllers (GC) means, each GC means for at least one of managing every call in progress within its control group, allocating and de-allocating circuits for calls, managing virtual network call processing, performing MET authentication, and for providing call accounting, the GC means for optionally providing satellite bandwidth resources to the NOC means for AMS(R)S resource provisioning, monitoring the performance of call processing and satellite circuit pool utilization, and performing MET management, commissioning and periodic performance verification testing and database management.

35. A mobile satellite system, comprising:

a network operations center (NOC) means for managing and controlling the resources of the satellite network system and for conducting the administrative functions associated with the management of the mobile satellite system, the NOC means for communicating with at least one of internal and external entities;

a first network communications controller (NCC) means for managing the allocation of circuits for supporting communications, available circuits being managed by at least one Group Controller (GC) means in said NCC means, said NCC means for communicating with said NOC means via said control network, said GC means including components for controlling:

call setup and monitoring;

management of satellite resources during call setup and cleardown;

database management;

call record management;

congestion control;

generation of performance and traffic statistics; and periodic performance verification testing.

36. In a mobile satellite system, including a network operations center (NOC) means for managing and controlling the resources of the satellite network system and conducting the administrative functions associated with the management of the mobile satellite system, the NOC means for communicating with at least one of internal and external entities; and a first network communications controller (NCC) means for managing the allocation of circuits for supporting communications, available circuits being managed by at least one Group Controller (GC) means in said NCC means, said NCC means for communicating with said NOC means via said control network, a method performed by said GC means comprising the sequence independent steps of:

(a) call setup and monitoring;

(b) management of satellite resources during call setup and cleardown;

(c) database management;

(d) call record management;

(e) congestion control;

(f) generation of performance and traffic statistics; and (g) periodic performance verification testing.

37. A satellite system comprising a network operation center, a network controller, a customer management, a network engineering system, a system engineering system, a remote monitor, a test station and at least one group controller, wherein the each group controller includes component means for maintaining at least one state machine for every call process, channel allocation, call performance and periodic performance verification testing.

38. A mobile communication system for use in a satellite network comprising a network operation center, a user interface system, a network controller, and at least one group controller wherein the each group controller includes component means for controlling call setup and monitoring, management of satellite resources during call setup and cleardown, database management, call record management, congestion control, generation of performance and traffic statistics, and periodic performance verification testing.

* * * * *